(12) United States Patent
Chang et al.

(10) Patent No.: US 10,558,015 B2
(45) Date of Patent: *Feb. 11, 2020

(54) OPTICAL IMAGE CAPTURING SYSTEM

(71) Applicant: ABILITY OPTO-ELECTRONICS TECHNOLOGY CO.LTD., Taichung (TW)

(72) Inventors: Yeong-Ming Chang, Taichung (TW); Chien-Hsun Lai, Taichung (TW); Yao-Wei Liu, Taichung (TW); Nai-Yuan Tang, Taichung (TW)

(73) Assignee: ABILITY OPTO-ELECTRONICS TECHNOLOGY CO. LTD., Taichung (TW)

(*) Notice: Subject to any disclaimer, the term of this patent is extended or adjusted under 35 U.S.C. 154(b) by 208 days.

This patent is subject to a terminal disclaimer.

(21) Appl. No.: 15/586,479

(22) Filed: May 4, 2017

(65) Prior Publication Data
US 2018/0188489 A1    Jul. 5, 2018

(30) Foreign Application Priority Data
Jan. 5, 2017 (TW) .............................. 106100327 A

(51) Int. Cl.
*G02B 13/00* (2006.01)
*G02B 9/62* (2006.01)
*G02B 5/20* (2006.01)
*G02B 13/14* (2006.01)

(52) U.S. Cl.
CPC .......... *G02B 13/0045* (2013.01); *G02B 9/62* (2013.01); *G02B 13/008* (2013.01); *G02B 13/14* (2013.01); *G02B 5/208* (2013.01)

(58) Field of Classification Search
CPC .. G02B 13/0045; G02B 5/208; G02B 13/008; G02B 13/14; G02B 9/62
See application file for complete search history.

(56) References Cited

U.S. PATENT DOCUMENTS

| 9,348,117 B1* | 5/2016 | Chang ................ G02B 13/0045 |
| 9,995,910 B1* | 6/2018 | Hudyma .................. G02B 9/64 |
| 2013/0063829 A1* | 3/2013 | Kang ..................... G02B 13/04 359/753 |
| 2015/0062720 A1* | 3/2015 | Lai .......................... G02B 13/04 359/713 |

(Continued)

FOREIGN PATENT DOCUMENTS

| CN | 107966797 A | 4/2018 |
| TW | 201508313 A | 3/2015 |

*Primary Examiner* — William R Alexander
*Assistant Examiner* — Ephrem Z Mebrahtu
(74) *Attorney, Agent, or Firm* — Muncy, Geissler, Olds & Lowe, P.C.

(57) ABSTRACT

The invention discloses a six-piece optical lens for capturing image and a six-piece optical module for capturing image. In order from an object side to an image side, the optical lens along the optical axis comprises a first lens with refractive power; a second lens with refractive power; a third lens with refractive power; a fourth lens with refractive power; a fifth lens with refractive power; a sixth lens with refractive power; and at least one of the image-side surface and object-side surface of each of the six lenses is aspheric. The optical lens can increase aperture value and improve the imagining quality for use in compact cameras.

24 Claims, 30 Drawing Sheets

(56) References Cited

U.S. PATENT DOCUMENTS

2016/0252709 A1* 9/2016 Lin .................... G02B 13/0045
                                                                        348/335
2017/0371133 A1* 12/2017 Lai ..................... G02B 13/0045

* cited by examiner

OPTICAL IMAGE CAPTURING SYSTEM

CROSS-REFERENCE TO RELATED APPLICATION

This application claims priority from Taiwan Patent Application No. 106100327, filed on Jan. 5, 2017, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly is about a minimized optical image capturing system which can be applied to electronic products.

2. Description of the Related Art

In recent years, as the popularization of portable electronic devices with camera functionalities, it has elevated the demand for optical image capturing systems. The photosensitive element of ordinary optical system is commonly selected from charge coupled device (CCD) or complementary metal-oxide semiconductor sensor (CMOS Sensor). Besides, as the advancement in semiconductor devices manufacturing technology, the pixel size of the photosensitive element is gradually minimized, and the optical systems make a development about the high pixel area by degrees. Therefore, it increases daily the demand of the quality of the image.

Conventional optical systems of portable electronic devices usually adopt four lenses or five lenses structure as main structure. However, since the resolution of the portable electronic devices is continuously raising, and more end-users are demanding for cameras having large aperture, which is equipped with functionalities such as low light mode or night mode, the conventional optical image capturing systems may not be sufficient to meet those advanced photography requirements.

Therefore, it is a important issue about how to effectively increase the amount of light admitted into the optical image capturing system and further improve the image quality thereof.

SUMMARY OF THE INVENTION

The aspect of embodiment of the present disclosure directs to an optical image capturing system and an optical image capturing lens which use combination of refractive powers, convex and concave surfaces of six-piece optical lenses (the convex or concave surface in the disclosure is the change of geometrical shape of an object side or an image side of each lens at different heights from an optical axis) to increase the amount of light admitted into the optical image capturing system, and to improve quality of image formation, so that the optical image capturing system can be disposed in minimized electronic products.

Furthermore, in the certain application of optical imaging, there will be a need to capture image underway for the light of the visible wavelength and the infrared wavelength, for example, IP video surveillance camera. IP video surveillance camera may need to be equipped with the Day & Night function. The main reason is that the visible spectrum for human vision has wavelengths ranging from 400 to 700 nm, but the image formed on the camera sensor includes infrared light, which is invisible to human eyes. Therefore, based on the circumstances, an IR cut filter removable (ICR) is placed in front of the camera lens of the IP video surveillance camera in order to increase the "fidelity" of the image, which can prevent the infrared light and color shift at the daytime; which can also allow the infrared light coming at night to elevate luminance. Nevertheless, the elements of the ICR occupy a significant amount of space and are expensive, which impede to the design and manufacture of miniaturized surveillance cameras in the future.

One aspect of embodiment of the present disclosure directs to an optical image capturing system and an optical image capturing camera lens, which utilize the combination of refractive powers, convex surfaces and concave surfaces of four lens, as well as the selection of materials thereof, to reduce the difference between the imaging focal length of visible light and imaging focal length of infrared light, in order to achieve the near "confocal" effect without the use of ICR.

The terms and their definition for the lens parameters in the embodiment of the present invention are shown as below for further reference.

The Lens Parameters Related to the Magnification of the Optical Image Capturing System and the Optical Image Capturing Camera Lens The optical image capturing system and the optical image capturing camera lens may be designed and applied to the biometric technology, for example, facial recognition. When the embodiment of the present invention is configured to capture image for facial recognition, the infrared light may be selected as the operation wavelength. At the same time a face of about 15 centimeters (cm) wide at a distance of 25-30 cm, at least 30 horizontal pixels can be formed in the horizontal direction of an photosensitive element (pixel size of 1.4 micrometers ($\mu$m)). The linear magnification of the infrared light on the image plane is LM, and it meets the following conditions: LM=(30 horizontal pixels)*(1.4 $\mu$m pixel size)/(15 cm, width of the photographed object); LM≥0.0003. When the visible light is adopted as the operation wavelength, for a face of about 15 cm wide at a distance of 25-30 cm, at least 50 horizontal pixels can be formed in the horizontal direction of a photosensitive element (pixel size of 1.4 micrometers ($\mu$m)).

The Lens Parameter Related to a Length or a Height

For visible spectrum, the present invention may select the wavelength of 555 nm as the primary reference wavelength and the basis for the measurement of focus shift. For infrared spectrum (700 nm-1300 nm), the present invention may select the wavelength of 850 nm as the primary reference wavelength and the basis for the measurement of focus shift.

The optical image capturing system may have a first image plane and a second image plane. The first image plane which is perpendicular to the optical axis is an image plane specifically for the visible light, and the through focus modulation transfer rate (value of MTF) at the first spatial frequency has a maximum value at the central field of view of the first image plane; and the second image plane which is perpendicular to the optical axis is an image plane specifically for the infrared light, and the through focus modulation transfer rate (value of MTF) at the first spatial frequency has a maximum value at the central of field of view of the second image plane. The optical image capturing system may further have a first average image plane and a second average image plane. The first average image plane which is perpendicular to the optical axis is an image plane specifically for the visible light. And the first average image plane may set up at the average position of the defocusing positions, where the values of MTF of the visible light at the central field of view, 0.3 field of view, and the 0.7 field of view are at their respective maximum at the first spatial frequency. The second average image plane which is perpendicular to the optical axis is an image plane specifically for the infrared light. The second average image plane sets up at the average position of the defocusing positions, where the values of MTF of the infrared light at the central field of view, 0.3 field of view, and the 0.7 field of view are at their respective maximum at the first spatial frequency.

The aforementioned first spatial frequency is set to be an half spatial frequency (half frequency) of a photosensitive element (sensor) used in the present invention. For example, the photosensitive element having the pixel size of 1.12 μm or less, of which the quarter spatial frequency, half spatial frequency (half frequency) and full spatial frequency (full frequency) in the characteristic diagram of modulation transfer function are respectively at least 110 cycles/mm, 220 cycles/mm and 440 cycles/mm. Lights of any field of view can be further divided into sagittal ray and tangential ray.

The focus shifts, where the through focus MTF values of the visible sagittal ray at the central field of view, 0.3 field of view, and 0.7 field of view of the optical image capturing system are at their respective maxima, are respectively expressed as VSFS0, VSFS3, and VSFS7 (unit of measurement: mm). The maximum values of the through focus MTF of the visible sagittal ray at the central field of view, 0.3 field of view, and 0.7 field of view are respectively expressed as VSMTF0, VSMTF3, and VSMTF7. The focus shifts, where the through focus MTF values of the visible tangential ray at the central field of view, 0.3 field of view, and 0.7 field of view of the optical image capturing system are at their respective maxima, are respectively expressed as VTFS0, VTFS3, and VTFS7 (unit of measurement: mm). The maximum values of the through focus MTF of the visible tangential ray at the central field of view, 0.3 field of view, and 0.7 field of view are respectively expressed as VTMTF0, VTMTF3, and VTMTF7. The average focus shift (position) of both the aforementioned focus shifts of the visible sagittal ray at three fields of view and focus shifts of the visible tangential ray at three fields of view is expressed as AVFS (unit of measurement: mm), which meets the absolute value |(VSFS0+VSFS3+VSFS7+VTFS0+VTFS3+VTFS7)/6|.

The focus shifts where the through focus MTF values of the infrared sagittal ray at the central field of view, 0.3 field of view, and 0.7 field of view of the optical image capturing system are at their respective maxima are respectively expressed as ISFS0, ISFS3, and ISFS7 (unit of measurement: mm). The average focus shift (position) of the aforementioned focus shifts of the infrared sagittal ray at three fields of view is expressed as AISFS (unit of measurement: mm). The maximum values of the through focus MTF of the infrared sagittal ray at the central field of view, 0.3 field of view, and 0.7 field of view are respectively expressed as ISMTF0, ISMTF3, and ISMTF7. The focus shifts where the through focus MTF values of the infrared tangential ray at the central field of view, 0.3 field of view, and 0.7 field of view of the optical image capturing system are at their respective maxima are respectively expressed as ITFS0, ITFS3, and ITFS7 (unit of measurement: mm). The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are respectively expressed as ITMTF0, ITMTF3, and ITMTF7. The average focus shift (position) of both of the aforementioned focus shifts of the infrared sagittal ray at the three fields of view and focus shifts of the infrared tangential ray at the three fields of view is expressed as AIFS (unit of measurement: mm), which meets the absolute value of |(ISFS0+ISFS3+ISFS7+ITFS0+ITFS3+ITFS7)/6|.

The focus shift between the focal points of the visible light and the focal points of the infrared light at their central fields of view (RGB/IR) of the entire optical image capturing system (i.e. wavelength of 850 nm versus wavelength of 555 nm, unit of measurement: mm) is expressed as FS, which meets the absolute value |(VSFS0+VTFS0)/2−(ISFS0+ITFS0)/2|. The difference (focus shift) between the average focus shift of the visible light in the three fields of view and the average focus shift of the infrared light in the three fields of view (RGB/IR) of the entire optical image capturing system is expressed as AFS (i.e. wavelength of 850 nm versus wavelength of 555 nm, unit of measurement: mm), which meets the absolute value of |AIFS−AVFS|.

The maximum height of an image of the optical image capturing system is expressed as HOI. The height of the optical image capturing system is expressed as HOS. The distance from the object side of the first lens of the optical image capturing system to the image side of the sixth lens of the optical image capturing system is expressed as InTL. The distance from an fixed aperture (stop) of the optical image capturing system to the first image plane of the optical image capturing system is expressed as InS. The distance from the first lens of the optical image capturing system to the second lens of the optical image capturing system is expressed as In12 (example). The thickness of the first lens of the optical image capturing system on the optical axis is expressed as TP1 (example).

The Lens Parameter Related to the Material
A coefficient of dispersion of the first lens in the optical image capturing system is expressed as NA1 (example); a refractive index of the first lens is expressed as Nd1 (example).

The Lens Parameter Related to the View Angle
An angle of view is expressed as AF. Half of the angle of view is expressed as HAF. A angle of a chief ray is expressed as MRA.

The Lens Parameter Related to Exit/Entrance Pupil
An entrance pupil diameter of the optical image capturing system is expressed as HEP. The maximum effective half diameter (EHD) of any surface of a single lens refers to a perpendicular height between the optical axis and an intersection point, where the incident ray at the maximum angle of view passing through the most marginal entrance pupil intersects with the surface of the lens. For example, the maximum effective half diameter of the object side of the first lens is expressed as EHD11. The maximum effective half diameter of the image side of the first lens is expressed as EHD12. The maximum effective half diameter of the object side of the second lens is expressed as EHD21. The maximum effective half diameter of the image side of the second lens is expressed as EHD22. The maximum effective half diameters of any surfaces of other lens in the optical image capturing system are expressed in the similar way.

The Lens Parameter Related to the Arc Length of the Lens Shape and the Outline of Surface
The length of the maximum effective half diameter outline curve at any surface of a single lens refers to an arc length of a curve, which starts from a starting point which is an intersection point on the surface of the lens crossing the optical axis of the optical image capturing system, and ends at the ending point which is the maximum effective half diameter position of the surface along the outline of the surface, and this arc length is expressed as ARS. For example, the length of the maximum effective half diameter outline curve of the object side of the first lens is expressed as ARS11. The length of the maximum effective half diameter outline curve of the image side of the first lens is expressed as ARS12. The length of the maximum effective half diameter outline curve of the object side of the second lens is expressed as ARS21. The length of the maximum effective half diameter outline curve of the image side of the second lens is expressed as ARS22. The lengths of the maximum effective half diameter outline curve of any surface of other lens in the optical image capturing system are expressed in the similar way.

The length of ½ entrance pupil diameter (HEP) outline curve of any surface of a single lens refers to an arc length of curve, which starts from a starting point which is an intersection point on the surface of the lens crossing the optical axis of the optical image capturing system, travels along the outline of the surface of the lens and ends at a coordinate point on the surface where the vertical height from the optical axis to the coordinate point is equivalent to ½ entrance pupil diameter; and the arc length is expressed as ARE. For example, the length of the ½ entrance pupil diameter (HEP) outline curve of the object side of the first lens is expressed as ARE11. The length of the ½ entrance pupil diameter (HEP) outline curve of the image side of the first lens is expressed as ARE12. The length of the ½ entrance pupil diameter (HEP) outline curve of the object side of the second lens is expressed as ARE21. The length of the ½ entrance pupil diameter (HEP) outline curve of the image side of the second lens is expressed as ARE22. The lengths of the ½ entrance pupil diameter (HEP) outline curve of any surfaces of the other lens in the optical image capturing system are expressed in the similar way.

The Lens Parameter Related to the Surface Depth of the Lens

The distance paralleling an optical axis, which is measured from the intersection point where the object side of the sixth lens crosses the optical axis to the terminal point of the maximum effective half diameter outline curve on the object side of the sixth lens is expressed as InRS61 (depth of the EHD). The distance paralleling an optical axis, which is measured from the intersection point where the image side of the sixth lens crosses the optical axis to the terminal point of the maximum effective half diameter outline curve on the image side of the sixth lens is expressed as InRS62 (depth of the EHD). The depths of the EHD (sinkage values) on the object side or the image side of other lens are expressed in similar way.

The Lens Parameter Related to the Shape of the Lens

The critical point C is a point which is tangential to the tangential plane being perpendicular to the optical axis on the specific surface of the lens except that an intersection point which crosses the optical axis on the specific surface of the lens. In addition to the description above, the perpendicular distance between the critical point C51 on the object side of the fifth lens and the optical axis is HVT51 (example). The perpendicular distance between a critical point C52 on the image side of the fifth lens and the optical axis is HVT52 (example). The perpendicular distance between the critical point C61 on the object side of the sixth lens and the optical axis is HVT61 (example). The perpendicular distance between a critical point C62 on the image side of the sixth lens and the optical axis is HVT62 (example). The perpendicular distances between the critical point on the imageside or objectside of other lens elements and the optical axis are expressed in similar way.

The inflection point on the object-side of the sixth lens that is nearest to the optical axis is expressed as IF611, and the sinkage value of that inflection point IF611 is expressed as SGI611 (example). That is, the sinkage value SGI611 is a horizontal distance paralleling the optical axis, which is measured from the intersection point crossing the optical axis on the object side of the sixth lens to the inflection point nearest to the optical axis on the object side of the sixth lens. The distance perpendicular to the optical axis between the inflection point IF611 and the optical axis is HIF611 (example). The inflection point on the image side of the sixth lens that is nearest to the optical axis is expressed as IF621, and the sinkage value of that inflection point IF621 is expressed as SGI621 (example). That is, the sinkage value SGI621 is a horizontal distance paralleling the optical axis, which is measured from the intersection point crossing the optical axis on the image side of the sixth lens to the inflection point nearest to the optical axis on the image side of the sixth lens. The distance perpendicular to the optical axis between the inflection point IF621 and the optical axis is HIF621 (example).

The inflection point on object side of the sixth lens that is second nearest to the optical axis is expressed as IF612, and the sinkage value of that inflection point IF612 is expressed as SGI612 (example). That is, the sinkage value SGI612 is a horizontal distance paralleling the optical axis, which is measured from the intersection point crossing the optical axis on the object side of the sixth lens to the inflection point nearest to the optical axis on the object side of the sixth lens. The distance perpendicular to the optical axis between the inflection point IF612 and the optical axis is HIF612 (example). The inflection point on image side of the sixth lens that is second nearest to the optical axis is expressed as IF622, and the sinkage value of that inflection point IF622 is expressed as SGI622 (example). That is, the sinkage value SGI622 is a horizontal distance paralleling the optical axis, which is measured from the intersection point crossing the optical axis on the image side of the sixth lens to the inflection point second nearest to the optical axis on the image side of the sixth lens. The distance perpendicular to the optical axis between the inflection point IF622 and the optical axis is HIF622 (example).

The inflection point on object side of the sixth lens that is third nearest to the optical axis is expressed as IF613, and the sinkage value of that inflection point IF613 is expressed as SGI613 (example). The sinkage value SGI613 is a horizontal distance paralleling the optical axis, which is measured from the intersection point crossing the optical axis on the object side of the sixth lens to the inflection point third nearest to the optical axis on the object side of the sixth lens. The distance perpendicular to the optical axis between the inflection point IF613 and the optical axis is HIF613 (example). The inflection point on image side of the sixth lens that is third nearest to the optical axis is expressed as IF623, and the sinkage value of that inflection point IF623 is expressed as SGI623 (example). That is, the sinkage value SGI623 is a horizontal distance paralleling the optical axis, which is measured from the intersection point crossing the optical axis on the image side of the sixth lens to the inflection point third nearest to the optical axis on the image side of the sixth lens. The distance perpendicular to the optical axis between the inflection point IF623 and the optical axis is HIF623 (example).

The inflection point on object side of the sixth lens that is fourth nearest to the optical axis is expressed as IF614, and the sinkage value of the inflection point IF614 is expressed as SGI614 (example). That is, the sinkage value SGI614 is a horizontal distance paralleling the optical axis, which is measured from the intersection point crossing the optical axis on the object side of the sixth lens to the inflection point fourth nearest to the optical axis on the object side of the sixth lens. The distance perpendicular to the optical axis between the inflection point IF614 and the optical axis is HIF614 (example). The inflection point on image side of the sixth lens that is fourth nearest to the optical axis is expressed as IF624, and the sinkage value of that inflection point IF624 is expressed as SGI624 (example). That is, the sinkage value SGI624 is a horizontal distance paralleling the optical axis, which is measured from the intersection point crossing the optical axis on the image side of the sixth lens to the inflection point fourth nearest to the optical axis on the image side of the sixth lens. The distance perpendicular to the optical axis between the inflection point IF624 and the optical axis is HIF624 (example).

The inflection points on the object side or the image side of the other lens and the perpendicular distances between them and the optical axis, or the sinkage values thereof are expressed in the similar way described above.

The Lens Element Parameter Related to the Aberration

Optical distortion for image formation in the optical image capturing system is expressed as ODT. TV distortion for image formation in the optical image capturing system is expressed as TDT. Furthermore, the degree of aberration offset within the range of 50% to 100% field of view of the formed image can be further illustrated. The offset of the spherical aberration is expressed as DFS. The offset of the coma aberration is expressed as DFC.

The transverse aberration of the margin of the aperture is expressed as STA and it evaluates the function of the specific optical image capturing system. The transverse aberration at any field of view can be calculated by utilizing the tangential fan and the sagittal fan. Specifically, calculating the transverse aberration of the longest operation wavelength (for instance, the wavelength is 650 nm) and the shortest operation wavelength (for instance, the wavelength is 470 nm) respectively passing through the margin of the aperture is taken as the standard of the function. The aforementioned coordinate direction of the tangential fan can be further divided into the positive direction (the upper ray) and the negative direction (the lower ray). The transverse aberration at the longest operation wavelength passing through the margin of the aperture defines the distance difference between the image position at the specific field of view where the longest operation wavelength passes through the margin of the aperture and strikes on the image plane and the image position at the specific field of view where the chief ray of the reference wavelength (for instance, the wavelength is 555 nm) strikes on the image plane. The transverse aberration at the shortest operation wavelength passing through the margin of the aperture defines the distance difference between the image position at the specific field of view where the shortest operation wavelength passes through the margin of the aperture and strikes on the image plane and the image position at the specific field of view where the chief ray of the reference wavelength (for instance, the wavelength is 555 nm) strikes on the image plane. To evaluates the function of the specific optical image capturing system, it can utilize that the transverse aberration at the 0.7 field of view (i.e., the 0.7 height of an image HOI) where the longest operation wavelength passes through the margin of the aperture and strikes on the image plane and the transverse aberration at the 0.7 field of view (i.e., the 0.7 height of an image HOI) where the shortest operation wavelength passes through the margin of the aperture and strikes on the image plane both are less than 100 µm as a way of the examination. Even the transverse aberration at the 0.7 field of view (i.e., the 0.7 height of an image HOI) where the longest operation wavelength passes through the margin of the aperture and strikes on the image plane and the transverse aberration at the 0.7 field of view (i.e., the 0.7 height of an image HOI) where the shortest operation wavelength passes through the margin of the aperture and strikes on the image plane both are less than 80 µm can further take as a way of the examination.

There is a maximum image height HOI of the optical image capturing system on the first image plane which is vertical to the optical axis. A lateral aberration of the longest operation wavelength of a visible light of a positive direction tangential fan of the optical image capturing system passing through a margin of the entrance pupil and striking on the image plane by 0.7 HOI is expressed as PLTA, and a lateral aberration of the shortest operation wavelength of a visible light of the positive direction tangential fan of the optical image capturing system passing through the margin of the entrance pupil and striking on the image plane by 0.7 HOI is expressed as PSTA. A lateral aberration of the longest operation wavelength of a visible light of a negative direction tangential fan of the optical image capturing system passing through the margin of the entrance pupil and striking on the image plane by 0.7 HOI is expressed as NLTA, and a lateral aberration of the shortest operation wavelength of a visible light of a negative direction tangential fan of the optical image capturing system passing through the margin of the entrance pupil and striking on the image plane by 0.7 HOI is expressed as NSTA. A lateral aberration of the longest operation wavelength of a visible light of a sagittal fan of the optical image capturing system passing through the margin of the entrance pupil and striking on the image plane by 0.7 HOI is expressed as SLTA, and a lateral aberration of the shortest operation wavelength of a visible light of the sagittal fan of the optical image capturing system passing through the margin of the entrance pupil and striking on the image plane by 0.7 HOI is expressed as SSTA.

The present invention provides the the optical image capturing system. The object side or the image side of the sixth lens can be provided with the inflection point which can adjust each angle of view striking the sixth lens and conduct amendment for the optical distortion and TV distortion. Besides, the surface of the sixth lens can be provided with the function of the preferable adjustment about the optical path so as to elevate the quality of the image.

An optical image capturing system is provided in accordance with the present invention. In the order from an object side to an image side, the optical image capturing system includes a first lens, a second lens, a third lens, a fourth lens, a fifth lens, a sixth lens, a first image plane, and a second image plane. A first image plane is an image plane specifically for visible light and perpendicular to an optical axis and a through focus modulation transfer rate (value of MTF) of central field of view of the first image plane having a maximum value at a first spatial frequency; a second image plane is an image plane specifically for infrared light and perpendicular to the optical axis and the through focus modulation transfer rate (value of MTF) of central field of view of the second image plane having a maximum value at the first spatial frequency. The first lens to the fifth lens each has a refractive power. The focal lengths of the six lenses are respectively f1, f2, f3, f4, f5 and f6. A focal length of the optical image capturing system is f. An entrance pupil diameter of the optical image capturing system is HEP. There is a distance HOS on the optical axis from an object side of the first lens to the first image plane. A half maximum angle of view of the optical image capturing system is HAF. The optical image capturing system has a maximum image height HOI perpendicular the optical axis on the first image plane. A distance on the optical axis between the first image plane and the second image plane is FS. There is at least one lens made of the plastic material among the first lens to the sixth lens, and the optical image capturing system meets the following condition: 1.0≤f/HEP≤10.0, 0 deg<HAF≤150 deg, and |FS|≤60 μm.

Another optical image capturing system is further provided in accordance with the present invention. In the order from an object side to an image side, the optical image capturing system includes a first lens, a second lens, a third lens, a fourth lens, a fifth lens, a sixth lens, a first image plane, and a second image plane. A first image plane is an image plane specifically for visible light and perpendicular to an optical axis and a through focus modulation transfer rate (value of MTF) of central field of view of the first image plane having a maximum value at a first spatial frequency; a second image plane is an image plane specifically for infrared light and perpendicular to the optical axis and the through focus modulation transfer rate (value of MTF) of central field of view of the second image plane having a maximum value at the first spatial frequency. The first lens has refractive power and the object side of the first lens near the optical axis can be a convex surface. The second lens has a refractive power. The third lens has a refractive power. The fourth lens has a refractive power. The fifth lens has a refractive power. The sixth lens has a refractive power. The optical image capturing system has a maximum image height HOI perpendicular the optical axis on the first image plane. There is at least one lens having positive refractive power among the first lens to the sixth lens. The focal lengths of the six lenses are respectively f1, f2, f3, f4, f5 and f6. A focal length of the optical image capturing system is f. An entrance pupil diameter of the optical image capturing system is HEP. There is a distance HOS on the optical axis from an object side of the first lens to the first image plane. A half maximum angle of view of the optical image capturing system is HAF. The optical image capturing system has a maximum image height HOI perpendicular the optical axis on the first image plane. A distance on the optical axis between the first image plane and the second image plane is FS. The point on the any surface of any one of the six len which crosses the optical axis is a starting point, a length of an outline curve from the starting point to a coordinate point of vertical height with a distance from the optical axis to the half entrance pupil diameter on the surface along an outline of the surface is ARE. And there are at least two lenses made of the plastic material among the first lens to the sixth lens. The optical image capturing system meets the following condition: 1≤f/HEP≤10; 0 deg<HAF≤150 deg; 0.9≤2(ARE/HEP)≤2.0 and |FS|≤40 μm.

Yet another optical image capturing system is further provided in accordance with the present invention. In the order from an object side to an image side, the optical image capturing system includes a first lens, a second lens a third lens, a fourth lens, a first average image plane, and a second average image plane. A first average image plane is an image plane specifically for visible light and perpendicular to an optical axis and the first average image plane sets up at the average position of the defocusing positions, where through focus modulation transfer rates (values of MTF) of the visible light at central field of view, 0.3 field of view, and 0.7 field of view of the optical image capturing system are respectively at corresponding maximum value at a first spatial frequency; a second average image plane is an image plane specifically for infrared light and perpendicular to the optical axis, and the second average image plane sets up at the average position of the defocusing positions, where through focus modulation transfer rates of the infrared light (values of MTF) at central field of view, 0.3 field of view, and 0.7 field of view of the optical image capturing system are at their respective maximum at the first spatial frequency. The optical image capturing system has six lenses with refractive powers. The optical image capturing system has a maximum image height HOI on the first average image plane that is perpendicular to the optical axis. There is at least one lens made of the glass among the first lens to the sixth lens. The first lens has a refractive power. The second lens has a refractive power. The third lens has a refractive power. The fourth lens has a refractive power. The fifth lens has a refractive power. The sixth lens has a refractive power. The focal lengths of the six lenses are respectively f1, f2, f3, f4, f5 and f6. A focal length of the optical image capturing system is f. An entrance pupil diameter of the optical image capturing system is HEP. There is a distance HOS on the optical axis from an object side of the first lens to the first average image plane. A half maximum angle of view of the optical image capturing system is HAF. The optical image capturing system has a maximum image height HOI perpendicular the optical axis on the first average image plane. The point on the any surface of any one of the six len which crosses the optical axis is a starting point, a length of an outline curve from the starting point to a coordinate point of vertical height with a distance from the optical axis to the half entrance pupil diameter on the surface along an outline of the surface is ARE. A distance on the optical axis between the first average image plane and the second average image plane is AFS. There is at least two lens made of the plastic material among the first lens to the sixth lens, which meets the following condition: 1≤f/HEP≤10; 0 deg<HAF≤150 deg; 0.9≤2(ARE/HEP)≤2.0 and |AFS|≤60 μm.

The length of outline curve of any surface of a single lens in the range of the maximum effective half diameter influences the function of the surface aberration correction and the optical path difference at each field of view. The length of outline curve is longer that can elevate the function of the surface aberration correction, but it increases difficulty in the production. Therefore, the length of outline curve of any surface of a single lens must be controlled in the range of the maximum effective half diameter. Specifically, the ratio (ARS/TP) of the length of outline curve of the surface in the range of the maximum effective half diameter (ARS) to the thickness of the lens on the optical axis (TP) must be controlled. For example, the length of the outline curve of the maximum effective half diameter position of the object side of the first lens is expressed as ARS11, and the thickness of the first lens on the optical axis is TP1, and the ratio between both of them is ARS11/TP1. The length of the outline curve of the maximum effective half diameter position of the image side of the first lens is expressed as ARS12, and the ratio between ARS12 and TP1 is ARS12/TP1. The length of the outline curve of the maximum effective half diameter position of the object side of the second lens is expressed as ARS21, and the thickness of the second lens on the optical axis is TP2, and the ratio between both of them is ARS21/TP2. The length of the outline curve of the maximum effective half diameter position of the image side of the second lens is expressed as ARS22, and the ratio between ARS22 and TP2 is ARS22/TP2. The ratio of the lengths of the outline curve of the maximum effective half diameter position of any surface of the other lens to the thicknesses of the lens on the optical axis (TP) in the optical image capturing system are expressed in the similar way.

The length of outline curve of any surface of a single lens in the range of the height which is half entrance pupil diameter (HEP) especially influences the function of the surface aberration correction at the shared area of each field of view of ray and the optical path difference at each field of view. The length of outline curve is longer that can elevate the function of the surface aberration correction, but it increases difficulty in the production. Therefore, the length of outline curve of any surface of a single lens must be controlled in the range of the height which is half entrance pupil diameter (HEP). Specifically, the ratio (ARE/TP) of the length of outline curve of the surface (ARE) in the range of the height which is half entrance pupil diameter (HEP) to the thickness of the lens on the optical axis (TP) must be controlled. For example, the length of outline curve of the height which is half entrance pupil diameter (HEP) of the object side of the first lens is expressed as ARE11, and the thickness of the first lens on the optical axis is TP1, and the ratio thereof is ARE11/TP1. The length of outline curve of the height which is half entrance pupil diameter (HEP) of the image side of the first lens is expressed as ARE12, and the thickness of the first lens on the optical axis is TP1, and the ratio thereof is ARE12/TP1. The length of outline curve of the height which is half entrance pupil diameter (HEP) of the object side of the first lens is expressed as ARE21, and the thickness of the second lens on the optical axis is TP2, and the ratio thereof is ARE21/TP2. The length of outline curve of the height which is half entrance pupil diameter (HEP) of the image side of the second lens is expressed as ARE22, and the thickness of the second lens on the optical axis is TP2, and the ratio thereof is ARE22/TP2. The ratio of the length of outline curve of the height which is half entrance pupil diameter (HEP) of the surface of the other lens to the thickness of the lens on the optical axis in the optical image capturing system are expressed in the similar way.

The height of optical system (HOS) may be reduced to achieve the minimization of the optical image capturing system when the absolute value of f1 is larger than f6 ($|f1|>|f6|$).

When $|f2|+|f3|+|f4|+|f5|$ and $|f1|+|f6|$ meet the aforementioned conditions, at least one lens among the second lens to the fifth lens may have a weak positive refractive power or a weak negative refractive power. The weak refractive power indicates that an absolute value of the focal length of a specific lens is greater than 10. When at least one lens among the second lens to the fifth has the weak positive refractive power, the positive refractive power of the first lens can be shared by it, such that the unnecessary aberration will not appear too early. On the contrary, when at least one lens among the second lens to the fifth lens has the weak negative refractive power, the aberration of the optical image capturing system can be slightly corrected.

Besides, the sixth lens may have negative refractive power, and the image side thereof may be a concave surface. With this configuration, the back focal distance of the optical image capturing system may be shortened and the system may be minimized. Moreover, at least one surface of the sixth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DESCRIPTION OF THE PREFERRED EMBODIMENTS

Figure 1A:
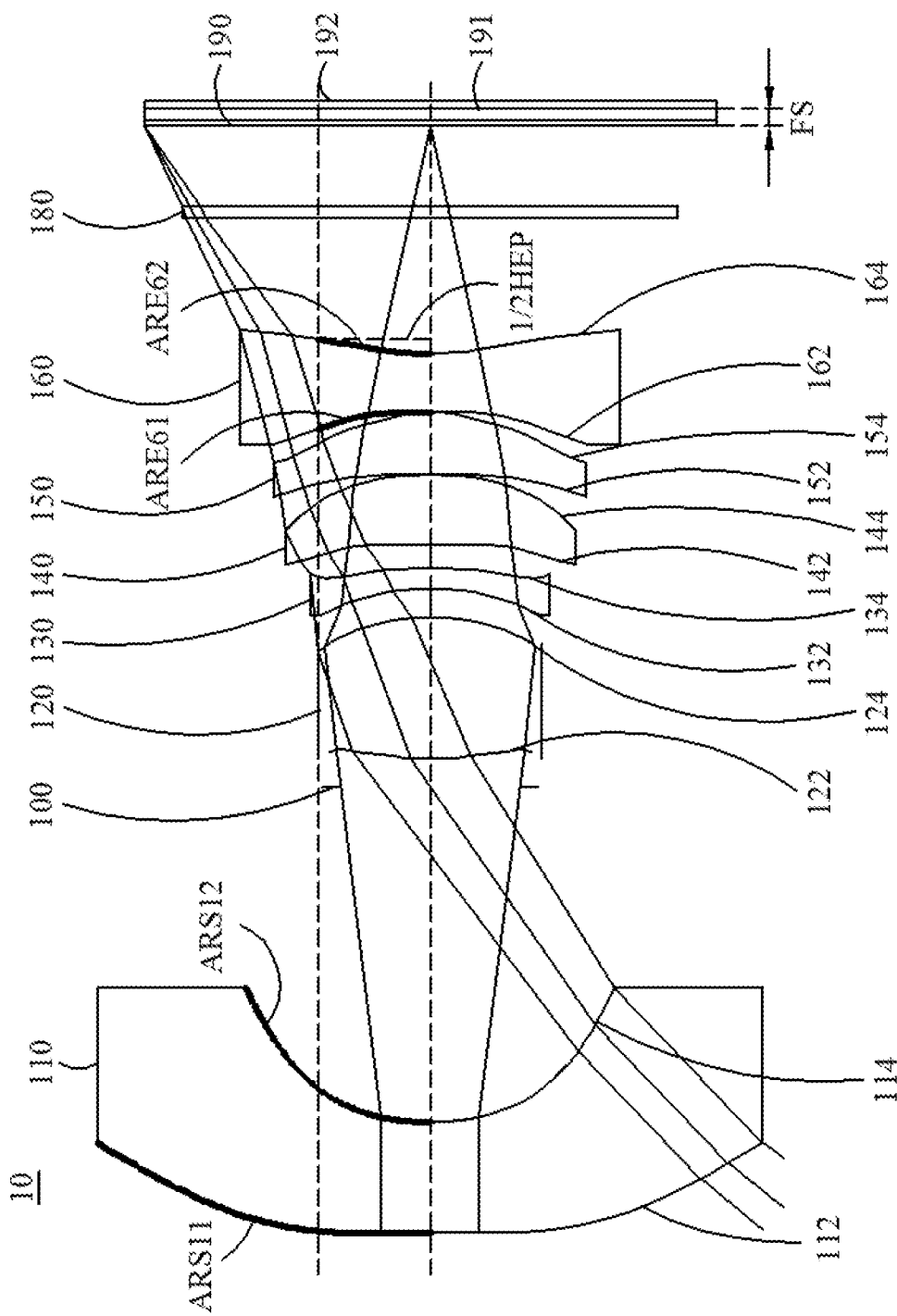
FIG. 1A is a schematic view of the optical image capturing system according to the first embodiment of the present invention.

The present invention has been described with some preferred embodiments thereof and it is understood that many changes and modifications in the described embodiments can be carried out without departing from the scope and the spirit of the invention that is intended to be limited only by the appended claims.

An optical image capturing system is provided, which includes, in the order from an object side to an image side, a first lens, a second lens, a third lens, a fourth lens, a fifth lens, and a sixth lens with the refractive power and an image plane. The optical image capturing system may further include an image sensing device, which is disposed on an image plane.

The optical image capturing system may use three sets of operation wavelengths, which are respectively 486.1 nm, 587.5 nm and 656.2 nm, and 587.5 nm is served as the primary reference wavelength and a reference wavelength to obtain technical features of the optical image capturing system. The optical image capturing system may also use five sets of wavelengths which are respectively 470 nm, 510 nm, 555 nm, 610 nm and 650 nm, and 555 nm is served as the primary reference wavelength and a reference wavelength to obtain technical features of the optical system.

The ratio of the focal length f of the optical image capturing system to a focal length fp of each lens with positive refractive power is PPR. The ratio of the focal length f of the optical image capturing system to a focal length fn of each lens with negative refractive power is NPR. The sum of the PPR of all lenses with positive refractive powers is $\Sigma PPR$. The sum of the NPR of all lenses with negative refractive powers is $\Sigma NPR$. The total refractive power and the total length of the optical image capturing system can be controlled easily when meeting following conditions: $0.5 \leq \Sigma PPR/|\Sigma NPR| \leq 15$. Preferably, the following condition may be satisfied: $1 \leq \Sigma PPR/|\Sigma NPR| \leq 3.0$.

The optical image capturing system may further include an image sensing device which is disposed on an image plane. Half of a diagonal of an effective detection field of the image sensing device (imaging height or the maximum image height of the optical image capturing system) is HOI. The distance on the optical axis from the object-side of the first lens to the image plane is HOS. They meet the following conditions: $HOS/HOI \leq 50$ and $0.5 \leq HOS/f \leq 150$. Preferably, the following conditions may be satisfied: $1 \leq HOS/HOI \leq 40$ and $1 \leq HOS/f \leq 140$. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and elevate the imaging quality.

In the optical image capturing system of the disclosure, the aperture may be a front or middle aperture. Wherein, the front aperture is the aperture between a photographed object and the first lens and the middle aperture is the aperture between the first lens and the image plane. In the case that the aperture is the front aperture, it can make the optical image capturing system generate a longer distance between the exit pupil and the image plane thereof, such that the optical image capturing system can accommodate more optical elements and the efficiency of the image sensing device in receiving image can be increased; In the case that the aperture is the middle aperture, it can expand the angle of view of the optical image capturing system, such that the optical image capturing system has an advantage of the wide angle camera lens. The distance from the aperture to the image plane is InS. It meets following condition: $0.1 \leq \text{InS}/\text{HOS} \leq 1.1$. Therefore, the optical image capturing system can be kept small with the character of wide angle of view at the same time.

In the optical image capturing system of the present invention, the distance from the object-side of the first lens to the image-side of the sixth lens is InTL. The sum of thicknesses of all lenses with refractive power on the optical axis is ETP. They meet the following condition: $0.1 \leq \Sigma TP/\text{InTL} \leq 0.9$. Therefore, it can keep the contrast ratio of the optical image capturing system and the yield rate about manufacturing lens at the same time, and provide the proper back focal length so as to accommodate other elements.

The curvature radius of the object-side of the first lens is R1. The curvature radius of the image-side of the first len is R2. They meet the following condition: $0.001 \leq |R1/R2| \leq 25$. Therefore, the first lens may have a suitable magnitude of positive refractive power, so as to prevent the spherical aberration from increasing too fast. Preferably, the following condition may be satisfied: $0.01 \leq |R1/R2| < 12$.

The curvature radius of the object-side of the sixth lens is R11. The curvature radius of the image side of the sixth lens is R12. They meet the following condition: $-7 < (R11-R12)/(R11+R12) < 50$. Hereby, this configuration is beneficial to the correction of the astigmatism generated by the optical image capturing system.

The distance between the first lens and the second lens on the optical axis is IN12. It meets the following condition: $\text{IN12}/f \leq 60$. Thereby, this configuration is helpful to improve the chromatic aberration of the lens in order to elevate their performance.

The distance between the fifth lens and the sixth lens on the optical axis is IN56. It meets the following condition: $\text{IN56}/f \leq 3.0$. Therefore, this configuration is helpful to improve the chromatic aberration of the lens in order to elevate their performance.

The thicknesses of the first lens and the second lens on the optical axis are TP1 and TP2, respectively. They meet the following condition: $0.1 \leq (TP1+IN12)/TP2 \leq 10$. Therefore, this configuration is helpful to control the sensitivity of the optical image capturing system, and improve their performance.

The thicknesses of the fifth lens and the sixth lens on the optical axis are TP5 and TP6, respectively, and the distance between the foregoing two lens on the optical axis is IN56. They meet the following condition: $0.1 \leq (TP6+IN56)/TP5 \leq 15$. Therefore, this configuration is helpful to control the sensitivity of the optical image capturing system, and decrease the total height of the optical image capturing system.

The thicknesses of the second, third and fourth lens on the optical axis are TP2, TP3 and TP4, respectively. The distance between the second lens and the third lens on the optical axis is IN23. The distance between the third lens and the fourth lens on the optical axis is IN34. The distance between the fourth lens and the fifth lens on the optical axis is IN45. The distance between the object side of the first lens and the image side of the sixth lens is InTL. They meet the following condition: $0.1 \leq TP4/(IN34+TP4+IN45) < 1$. Therefore, this configuration is helpful to slightly correct the aberration of the propagating process of the incident light layer by layer, and decrease the total height of the optical image capturing system.

In the optical image capturing system of the present invention, a distance perpendicular to the optical axis between a critical point C61 on an object-side of the sixth lens and the optical axis is HVT61. A distance perpendicular to the optical axis between a critical point C62 on an image side of the sixth lens and the optical axis is HVT62. A distance in parallel with the optical axis from an intersection point on the object side of the sixth lens crossing the optical axis to the critical point C61 is SGC61. A distance in parallel with the optical axis from an intersection point on the image side of the sixth lens crossing the optical axis to the critical point C62 is SGC62. They may meet the following conditions: $0 \text{ mm} \leq HVT61 \leq 3 \text{ mm}$; $0 \text{ mm} < HVT62 \leq 6 \text{ mm}$; $0 \leq HVT61/HVT62$; $0 \text{ mm} \leq |SGC61| \leq 0.5 \text{ mm}$; $0 \text{ mm} < |SGC62| \leq 2 \text{ mm}$, and $0 < |SGC62|/(|SGC62|+TP6) \leq 0.9$. Therefore, this configuration is helpful to correct the off-axis aberration effectively.

The optical image capturing system of the present invention meets the following condition: $0.2 \leq HVT62/HOI \leq 0.9$. Preferably, it may meet the following condition: $0.3 \leq HVT62/HOI \leq 0.8$. Therefore, this configuration is helpful to correct the aberration of surrounding field of view for the optical image capturing system.

The optical image capturing system of the present invention may meet the following condition: $0 \leq HVT62/HOS \leq 0.5$. Preferably, it may meet the following condition: $0.2 \leq HVT62/HOS \leq 0.45$. Therefore, this configuration is helpful to correct the aberration of surrounding field of view for the optical image capturing system.

In the optical image capturing system of the present invention, the distance in parallel with an optical axis from an inflection point on the object side of the sixth lens that is nearest to the optical axis to an intersection point on the object-side of the sixth lens crossing the optical axis is expressed as SGI611. The distance in parallel with an optical axis from an inflection point on the image side of the sixth lens that is nearest to the optical axis to an intersection point on the image-side of the sixth lens crossing the optical axis is expressed as SGI621. They meet the following conditions: $0 < SGI611/(SGI611+TP6) \leq 0.9$ and $0 < SGI621/(SGI621+TP6) \leq 0.9$. Preferably, It may meet the following conditions: $0.1 \leq SGI611/(SGI611+TP6) \leq 0.6$ and $0.1 \leq SGI621/(SGI621+TP6) \leq 0.6$.

The distance in parallel with the optical axis from the inflection point on the object-side of the sixth lens that is second nearest to the optical axis to an intersection point on the object side of the sixth lens crossing the optical axis is expressed as SGI612. The distance in parallel with an optical axis from an inflection point on the image side of the sixth lens that is second nearest to the optical axis to an intersection point on the image side of the sixth lens crossing the optical axis is expressed as SGI622. They meet the following conditions: $0 < SGI612/(SGI612+TP6) \leq 0.9$ and $0 < SGI622/(SGI622+TP6) \leq 0.9$. Preferably, the following conditions may be satisfied: $0.1 \leq SGI612/(SGI612+TP6) \leq 0.6$ and $0.1 \leq SGI622/(SGI622+TP6) \leq 0.6$.

The distance perpendicular to the optical axis between the inflection point on the object side of the sixth lens that is the nearest to the optical axis and the optical axis is expressed as HIF611. The distance perpendicular to the optical axis between an intersection point on the image side of the sixth lens crossing the optical axis and an inflection point on the image side of the sixth lens that is the nearest to the optical axis is expressed as HIF621. It may meet the following conditions: 0.001 mm≤|HIF611|≤5 mm and 0.001 mm≤|HIF621|≤5 mm. Preferably, the following conditions may be satisfied: 0.1 mm≤|HIF611|≤3.5 mm and 1.5 mm≤|HIF621|≤3.5 mm.

The distance perpendicular to the optical axis between the inflection point on the object side of the sixth lens that is second nearest to the optical axis and the optical axis is expressed as HIF612. The distance perpendicular to the optical axis between an intersection point on the image side of the sixth lens crossing the optical axis and an inflection point on the image side of the sixth lens that is second nearest to the optical axis is expressed as HIF622. It may meet the following conditions: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The distance perpendicular to the optical axis between the inflection point on the object side of the sixth lens that is third nearest to the optical axis and the optical axis is expressed as HIF613. The distance perpendicular to the optical axis between an intersection point on the image side of the sixth lens crossing the optical axis and an inflection point on the image side of the sixth lens that is third nearest to the optical axis is expressed as HIF623. They may meet the following conditions: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|≤3.5 mm.

The distance perpendicular to the optical axis between the inflection point on the object side of the sixth lens that is fourth nearest to the optical axis and the optical axis is expressed as HIF614. The distance perpendicular to the optical axis between an intersection point on the image side of the sixth lens and an inflection point on the image side of the sixth lens that is fourth nearest to the optical axis is expressed as HIF624. They may meet the following conditions: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present invention, it can be helpful to correct the chromatic aberration of the optical image capturing system by arranging the lens with high coefficient of dispersion and low coefficient of dispersion in a staggered manner.

The equation for the aforementioned aspheric surface is:

$$z = ch^2/[1+[1-(k+1)c^2h^2]^{0.5}] + A_4 h^4 + A_6 h^6 + A_8 h^8 + A_{10} h^{10} + A_{12} h^{12} + A_{14} h^{14} + A_{16} h^{16} + A_{18} h^{18} + A_{20} h^{20} + \ldots \quad (1),$$

where z is a position value of the position along the optical axis and at the height h which refers to the surface apex; k is the cone coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

In the optical image capturing system provided by the present invention, the lens may be made of glass or plastic material. If the lens is made of the plastic material, it can reduce the cost of manufacturing as well as the weight of the lens effectively. If lens is made of glass, it can control the heat effect and increase the design space of the configuration of the lens with refractive powers in the optical image capturing system. Besides, the object side and the image side of the first lens through sixth lens may be aspheric, which can gain more control variables and even reduce the number of the used lens in contrast to traditional glass lens in addition to the use of reducing the aberration. Thus, the total height of the optical image capturing system can be reduced effectively.

Furthermore, in the optical image capturing system provided by the present disclosure, when the surface of lens is a convex surface, the surface of that lens basically is a convex surface in the vicinity of the optical axis. When the surface of lens is a concave surface, the surface of that lens basically is a concave surface in the vicinity of the optical axis.

The optical image capturing system of the present invention can be applied to the optical image capturing system with automatic focus based on the demand and have the characters of a good aberration correction and a good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the shooting.

In the optical image capturing system of the present invention, at least one lens element among the first lens, second lens, third lens, fourth lens, fifth lens and sixth lens may further be a light filtering element for light with wavelength of less than 500 nm based on the design requirements. The light filtering element may be made by coating film on at least one surface of that lens with certain filtering function, or forming that lens with material that can filter light with short wavelength.

The image plane of the optical image capturing system of the present invention may be a plane or a curved surface based on the design requirement. When the image plane is a curved surface (e.g. a spherical surface with curvature radius), it is helpful to decrease the required incident angle that make the rays focus on the image plane. In addition to the aid of the miniaturization of the length of the optical image capturing system (TTL), it is helpful to elevate the relative illumination at the same time.

According to the foregoing implementation method, the specific embodiments with figures are presented in detail as below.

The First Embodiment

Figure 1B:
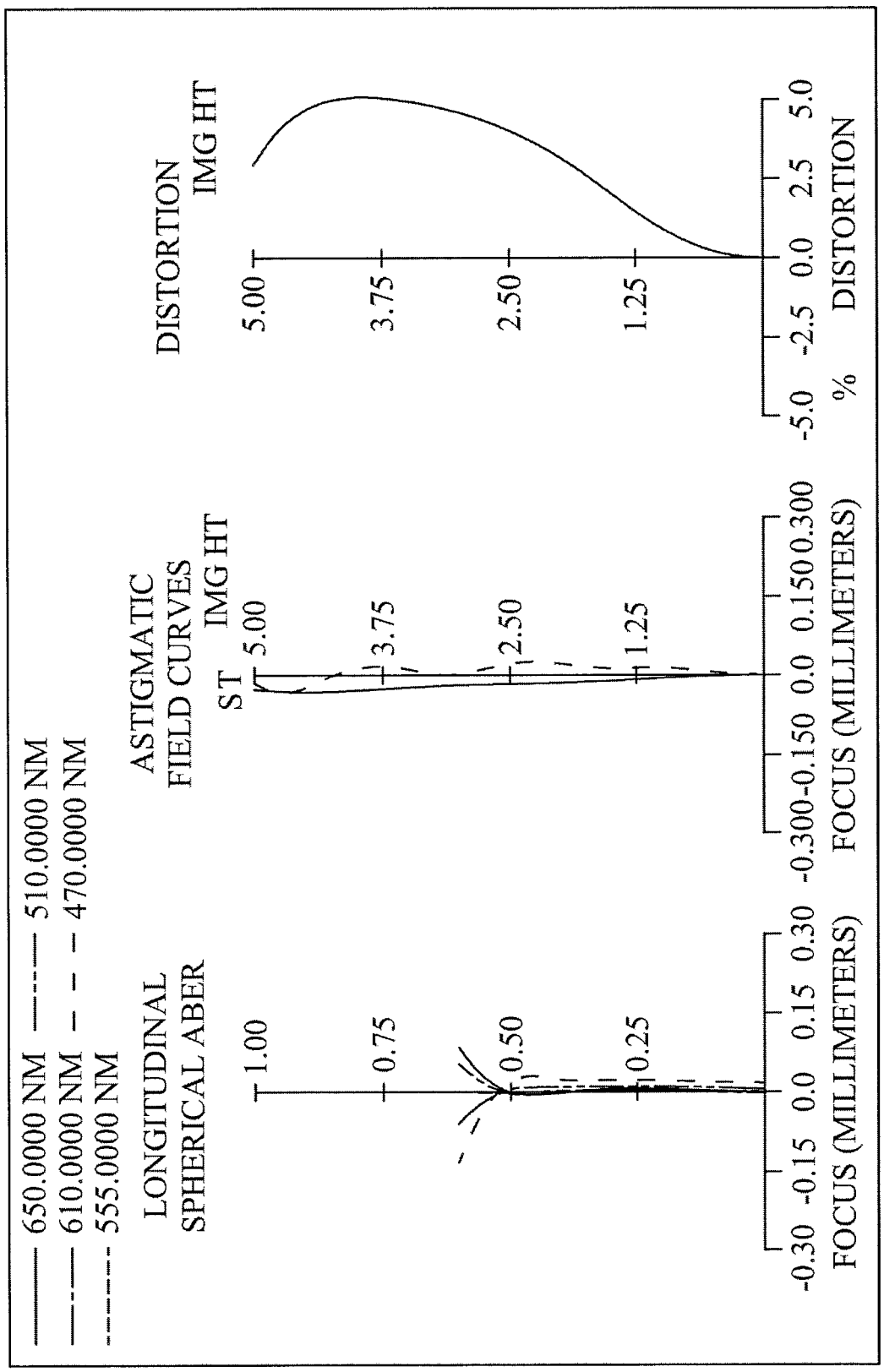
FIG. 1B shows the longitudinal spherical aberration curves, astigmatic field curves, and optical distortion curve of the optical image capturing system in the order from left to right according to the first embodiment of the present invention.
Figure 1C:
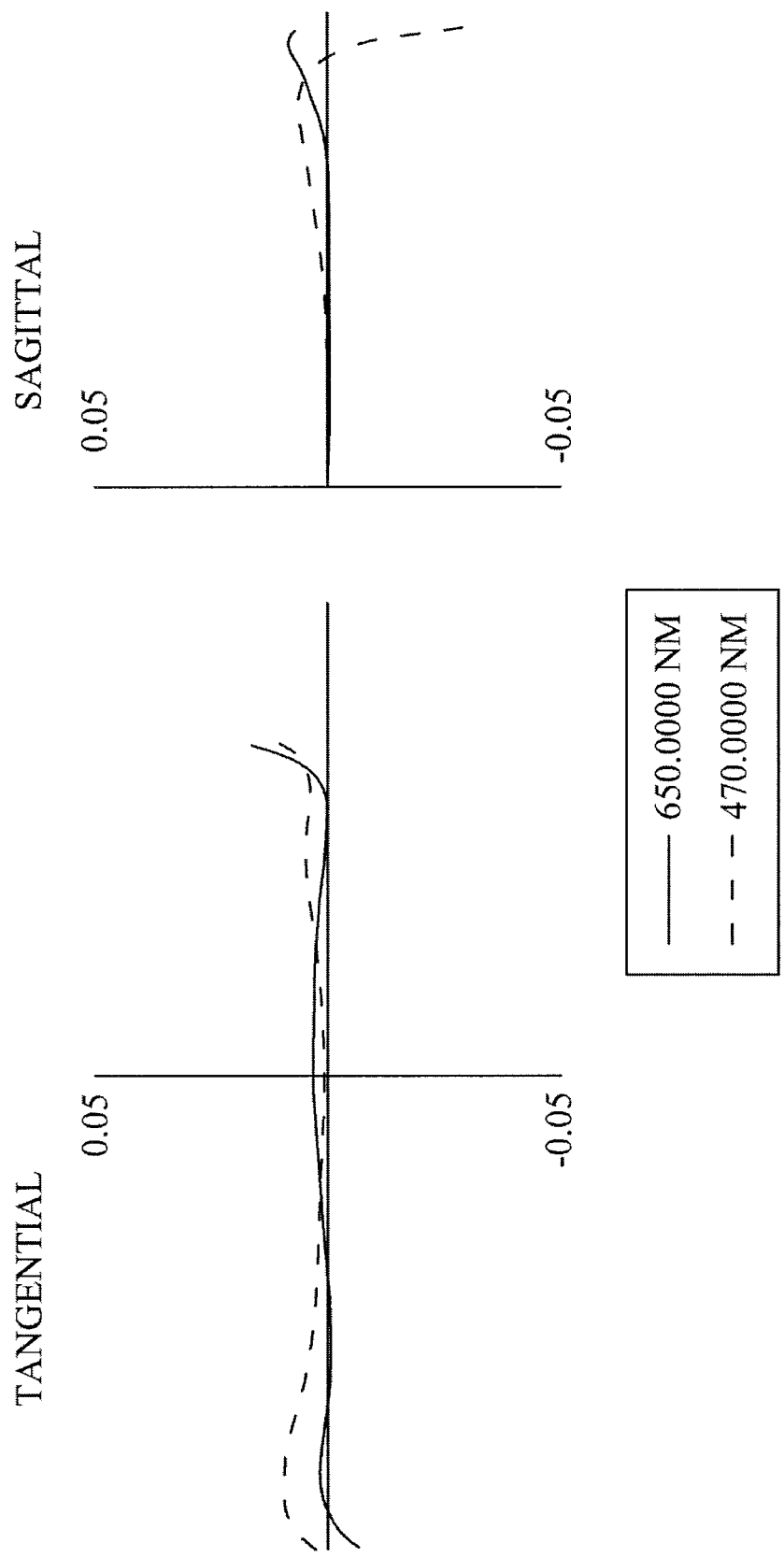
FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention.
Figure 1D:
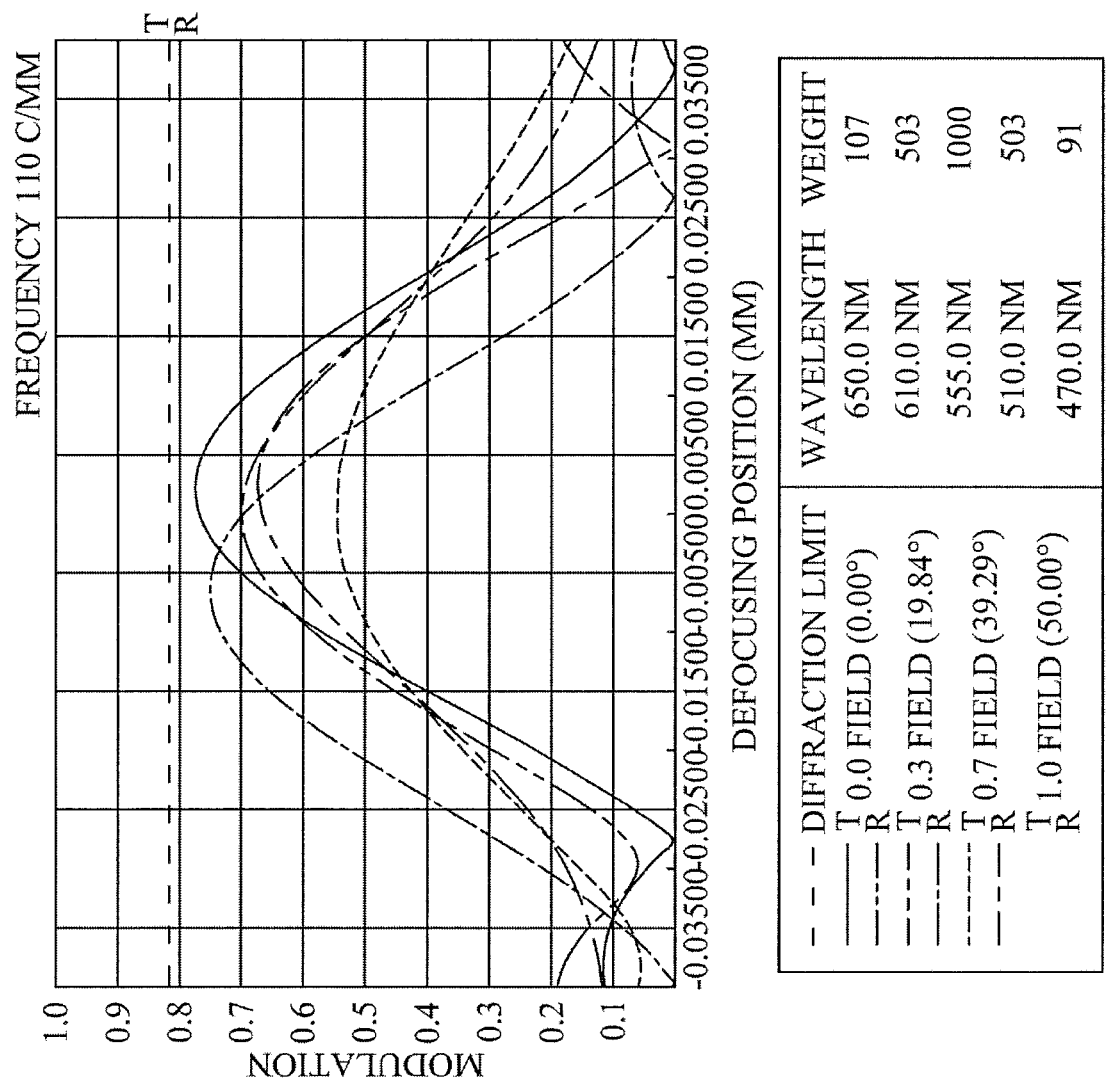
FIG. 1D is a diagram showing the through focus MTF values (Through Focus MTF) of the visible light spectrum at the central field of view, 0.3 field of view, and 0.7 field of view of the first embodiment of the present invention.
Figure 1E:
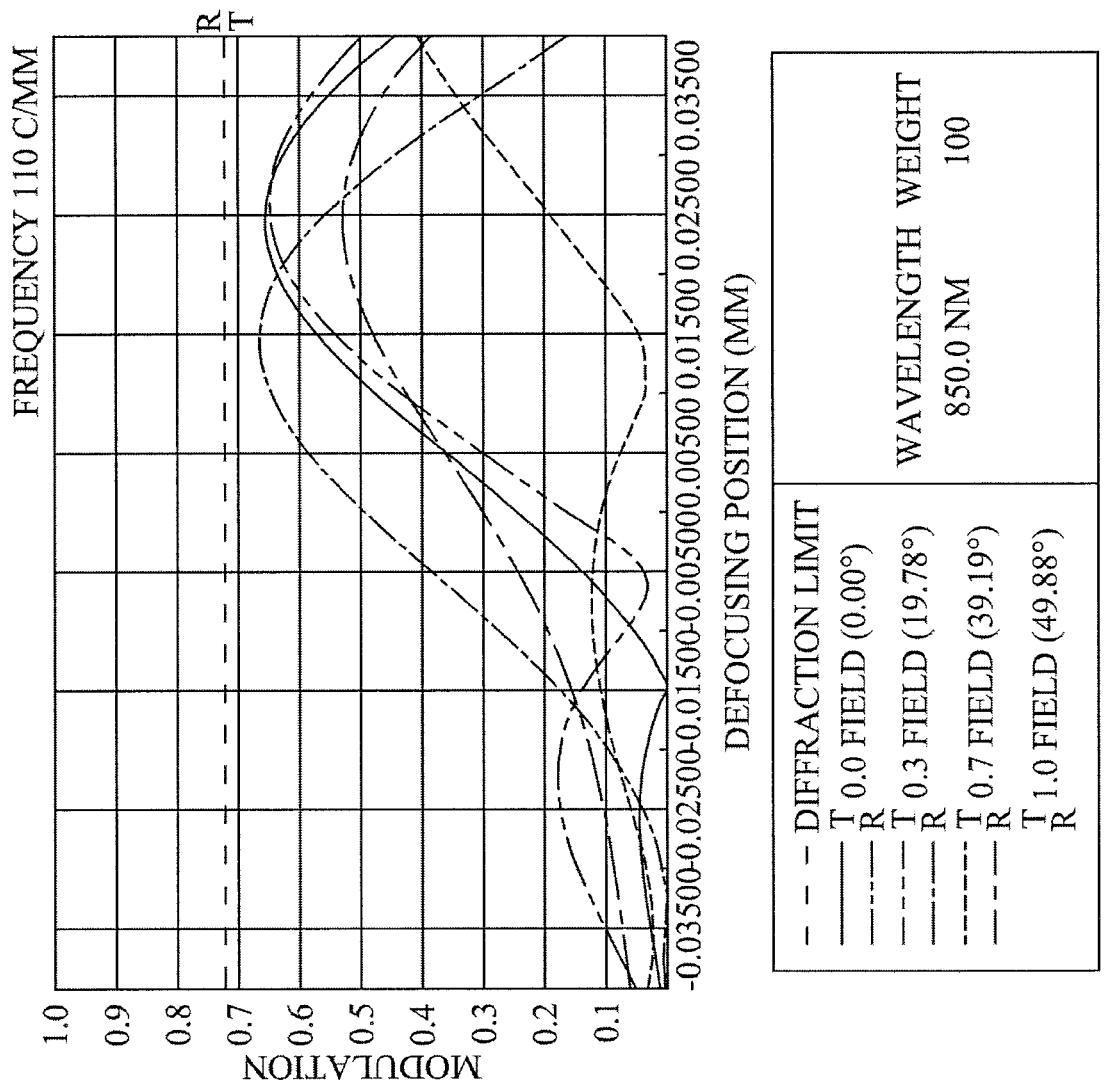
FIG. 1E is a diagram showing the through focus MTF values of the infrared light spectrum at the central field of view, 0.3 field of view, and 0.7 field of view of the first embodiment of the present invention.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention. FIG. 1D is a diagram showing the through focus MTF values (Through Focus MTF) of the visible light spectrum at the central field of view, 0.3 field of view, and 0.7 field of view of the first embodiment of the present invention; FIG. 1E is a diagram showing the through focus MTF values of the infrared light spectrum at the central field of view, 0.3 field of view, and 0.7 field of view of the first embodiment of the present invention. As shown in FIG. 1A, in the order from the object side to the image side, the optical image capturing system 10 includes a first lens 110, an aperture 100, a second lens 120, a third lens 130, a fourth lens 140, a fifth lens 150, a sixth lens 160, an IR-bandstop filter 180, a first image plane 190, a second image plane 191, and an image sensing device 192.

The first lens 110 has negative refractive power and it is made of plastic material. An object side 112 of the first lens 110 is a concave surface and an image side 114 of the first lens 110 is a concave surface, and both of the object side 112 and the image side 114 are aspheric. The object side 112 thereof has two inflection points. The length of the maximum effective half diameter outline curve of the object-side of the first lens is expressed as ARS11. The length of the maximum effective half diameter outline curve of the image-side of the first lens is expressed as ARS12. The length of the ½ entrance pupil diameter (HEP) outline curve of the object-side of the first lens is expressed as ARE11. The length of the ½ entrance pupil diameter (HEP) outline curve of the image-side of the first lens is expressed as ARE12. The thickness of the first lens on the optical axis is TP1.

The distance paralleling an optical axis from an inflection point on the object side of the first lens which is nearest to the optical axis to an intersection point on the object side of the first lens crossing the optical axis is expressed as SGI111. The distance paralleling an optical axis from an inflection point on the image-side of the first lens which is nearest to the optical axis to an intersection point on the image-side of the first lens is crossing the optical axis expressed as SGI121. They meet the following conditions: SGI111=−0.0031 mm, and |SGI111|/(|SGI111|+TP1)=0.0016.

The distance in parallel with an optical axis from an inflection point on the object side of the first lens that is second nearest to the optical axis to an intersection point on the object side of the first lens crossing the optical axis is expressed as SGI112. The distance in parallel with an optical axis from an inflection point on the image side of the first lens that is second nearest to the optical axis to an intersection point on the image side of the first lens crossing the optical axis is expressed as SGI122. They meet the following conditions: SGI112=1.3178 mm and |SGI112|/(|SGI112|+TP1)=0.4052.

The distance perpendicular to the optical axis from the inflection point on the object side of the first lens that is nearest to the optical axis to an optical axis is expressed as HIF111. The distance perpendicular to the optical axis from the inflection point on the image side of the first lens that is nearest to the optical axis to an intersection point on the image side of the first lens crossing the optical axis is expressed as HIF121. They meet the following conditions: HIF111=0.5557 mm and HIF111/HOI=0.1111.

The distance perpendicular to the optical axis from the inflection point on the object side of the first lens that is second nearest to the optical axis to an optical axis is expressed as HIF112. The distance perpendicular to the optical axis from the inflection point on the image side of the first lens that is second nearest to the optical axis to an intersection point on the image side of the first lens crossing the optical axis is expressed as HIF122. They meet the following conditions: HIF112=5.3732 mm and HIF112/HOI=1.0746.

The second lens 120 has positive refractive power and it is made of plastic material. An object side 122 of the second lens 120 is a convex surface and an image side 124 of the second lens 120 is a convex surface, and both of the object side 122 and the image side 124 are aspheric. The object side 122 of the second lens 120 has one inflection point. The length of the maximum effective half diameter outline curve of the object side of the second lens is expressed as ARS21. The length of the maximum effective half diameter outline curve of the image side of the second lens is expressed as ARS22. The length of the ½ entrance pupil diameter (HEP) outline curve of the object side of the second lens is expressed as ARE21. The length of the ½ entrance pupil diameter (HEP) outline curve of the image side of the second lens is expressed as ARE22. The thickness of the second lens element on the optical axis is TP2.

The distance in parallel with an optical axis from an inflection point on the object side of the second lens that is nearest to the optical axis to the intersection point on the object side of the second lens crossing the optical axis is expressed as SGI211. The distance in parallel with an optical axis from an inflection point on the image side of the second lens that is nearest to the optical axis to the intersection point on the image side of the second lens crossing the optical axis is expressed as SGI221. They meet the following conditions: SGI211=0.1069 mm, |SGI211|/(|SGI211|+TP2)=0.0412, SGI221=0 mm and |SGI221|/(|SGI221|+TP2)=0.

The distance perpendicular to the optical axis from the inflection point on the object side of the second lens that is nearest to the optical axis to the optical axis is expressed as HIF211. The distance perpendicular to the optical axis from the inflection point on the image side of the second lens that is nearest to the optical axis to the intersection point on the image side of the second lens crossing the optical axis is expressed as HIF221. They meet the following conditions: HIF211=1.1264 mm, HIF211/HOI=0.2253, HIF221=0 mm and HIF221/HOI=0.

The third lens 130 has negative refractive power and it is made of plastic material. An object side 132 of the third lens 130 is a concave surface and an image-side 134 of the third lens 130 is a convex surface, and both of the object side 132 and the image-side 134 are aspheric. The object side 132 and the image side 134 both have an inflection point. The length of the maximum effective half diameter outline curve of the object side of the third lens is expressed as ARS31. The length of the maximum effective half diameter outline curve of the image side of the third lens is expressed as ARS32. The length of the ½ entrance pupil diameter (HEP) outline curve of the object side of the third lens is expressed as ARE31. The length of the ½ entrance pupil diameter (HEP) outline curve of the image side of the third lens is expressed as ARE32. The thickness of the third lens on the optical axis is TP3.

The distance in parallel with an optical axis from an inflection point on the object side of the third lens that is nearest to the optical axis to an intersection point on the image side of the third lens crossing the optical axis is expressed as SGI311. The distance in parallel with an optical axis from an inflection point on the image-side of the third lens that is nearest to the optical axis to an intersection point on the image side of the third lens crossing the optical axis is expressed as SGI321. They meet the following conditions: SGI311=−0.3041 mm, |SGI311|/(|SGI311|+TP3)=0.4445, SGI321=−0.1172 mm and |SGI321|/(|SGI321|+TP3)=0.2357.

The distance perpendicular to the optical axis between the inflection point on the object side of the third lens that is nearest to the optical axis and the optical axis is expressed as HIF311. The distance perpendicular to the optical axis between the inflection point on the image side of the third lens that is nearest to the optical axis and the intersection point on the image side of the third lens crossing the optical axis is expressed as HIF321. They meet the following conditions: HIF311=1.5907 mm, HIF311/HOI=0.3181, HIF321=1.3380 mm and HIF321/HOI=0.2676.

The fourth lens 140 has positive refractive power and it is made of plastic material. An object side 142 of the fourth lens 140 is a convex surface and an image side 144 of the fourth lens 140 is a concave surface, and both of the object-side 142 and the image-side 144 are aspheric. The object side 142 thereof has two inflection points, and the image side 144 thereof has one inflection point. The length of the maximum effective half diameter outline curve of the object side of the fourth lens is expressed as ARS41. The length of the maximum effective half diameter outline curve of the image side of the fourth lens is expressed as ARS42. The length of the ½ entrance pupil diameter (HEP) outline curve of the object side of the fourth lens is expressed as ARE41. The length of the ½ entrance pupil diameter (HEP) outline curve of the image side of the fourth lens is expressed as ARS42. The thickness of the fourth lens on the optical axis is TP4.

The distance in parallel with the optical axis from an inflection point on the object side of the fourth lens that is nearest to the optical axis to the intersection point on the object side of the fourth lens crossing the optical axis is expressed as SGI411. The distance in parallel with the optical axis from an inflection point on the image side of the fourth lens that is nearest to the optical axis to the intersection point on the image side of the fourth lens crossing the optical axis is expressed as SGI421. They meet the following conditions: SGI411=0.0070 mm, |SGI411|/(|SGI411|+TP4)=0.0056, SGI421=0.0006 mm and |SGI421|/(|SGI421|+TP4)=0.0005.

The distance in parallel with an optical axis from an inflection point on the object side of the fourth lens that is second nearest to the optical axis to the intersection point on the object side of the fourth lens crossing the optical axis is expressed as SGI412. The distance in parallel with an optical axis from an inflection point on the image side of the fourth lens that is second nearest to the optical axis to the intersection point on the object side of the fourth lens crossing the optical axis is expressed as SGI422. They meet the following conditions: SGI412=−0.2078 mm and |SGI412|/(|SGI412|+TP4)=0.1439.

The perpendicular distance between the inflection point on the object side of the fourth lens that is nearest to the optical axis and the optical axis is expressed as HIF411. The perpendicular distance on the optical axis between the inflection point on the image side of the fourth lens that is nearest to the optical axis and the intersection point on the image side of the fourth lens crossing the optical axis is expressed as HIF421. They meet the following conditions: HIF411=0.4706 mm, HIF411/HOI=0.0941, HIF421=0.1721 mm and HIF421/HOI=0.0344.

The distance perpendicular to the optical axis between the inflection point on the object side of the fourth lens that is second nearest to the optical axis and the optical axis is expressed as HIF412. The distance perpendicular to the optical axis between the inflection point on the image side of the fourth lens that is second nearest to the optical axis and the intersection point on the image side of the fourth lens crossing the optical axis is expressed as HIF422. They meet the following conditions: HIF412=2.0421 mm and HIF412/HOI=0.4084.

The fifth lens 150 has positive refractive power and it is made of plastic material. An object side 152 of the fifth lens 150 is a convex surface and an image-side 154 of the fifth lens 150 is a convex surface, and both of the object side 152 and the image-side 154 are aspheric. The object side 152 thereof has two inflection points and the image side 154 thereof has one inflection point. The length of the maximum effective half diameter outline curve of the object side of the fifth lens is expressed as ARS51. The length of the maximum effective half diameter outline curve of the image side of the fifth lens is expressed as ARS52. The length of the ½ entrance pupil diameter (HEP) outline curve of the object side of the fifth lens is expressed as ARE51. The length of the ½ entrance pupil diameter (HEP) outline curve of the image side of the fifth lens is expressed as ARE52. The thickness of the fifth lens on the optical axis is TP5.

The distance in parallel with an optical axis from an inflection point on the object side of the fifth lens that is nearest to the optical axis to the intersection point on the object side of the fifth lens crossing the optical axis is expressed as SGI511. The distance in parallel with an optical axis from an inflection point on the image-side of the fifth lens that is nearest to the optical axis to the intersection point on the image side of the fifth lens crossing the optical axis is expressed as SGI521. They meet the following conditions: SGI511=0.00364 mm, |SGI511|/(|SGI511|+TP5)=0.00338, SGI521=−0.63365 mm and |SGI521|/(|SGI521|+TP5)=0.37154.

The distance in parallel with an optical axis from an inflection point on the object side of the fifth lens that is second nearest to the optical axis to the intersection point on the object side of the fifth lens crossing the optical axis is expressed as SGI512. The distance in parallel with an optical axis from an inflection point on the image side of the fifth lens that is second nearest to the optical axis to the intersection point on the image side of the fifth lens crossing the optical axis is expressed as SGI522. They meet the following conditions: SGI512=−0.32032 mm and |SGI512|/(|SGI512|+TP5)=0.23009.

The distance in parallel with an optical axis from an inflection point on the object side of the fifth lens that is third nearest to the optical axis to the intersection point on the object side of the fifth lens crossing the optical axis is expressed as SGI513. The distance in parallel with an optical axis from an inflection point on the image side of the fifth lens that is third nearest to the optical axis to the intersection point on the image side of the fifth lens crossing the optical axis is denoted by SGI523. They meet the following conditions: SGI513=0 mm, |SGI513|/(|SGI513|+TP5)=0, SGI523=0 mm and |SGI523|/(|SGI523|+TP5)=0.

The distance in parallel with an optical axis from an inflection point on the object side of the fifth lens that is fourth nearest to the optical axis to the intersection point on the object side of the fifth lens crossing the optical axis is expressed as SGI514. The distance in parallel with an optical axis from an inflection point on the image side of the fifth lens that is fourth nearest to the optical axis to the intersection point on the image side of the fifth lens crossing the optical axis is expressed as SGI524. They meet the following conditions: SGI514=0 mm, |SGI514|/(|SGI514|+TP5)=0, SGI524=0 mm and |SGI524|/(|SGI524|+TP5)=0.

The perpendicular distance between the optical axis and the inflection point on the object side of the fifth lens that is nearest to the optical axis is expressed as HIF511. The perpendicular distance between the optical axis and the inflection point on the image side of the fifth lens that is nearest to the optical axis is expressed as HIF521. They meet the following conditions: HIF511=0.28212 mm, HIF511/HOI=0.05642, HIF521=2.13850 mm and HIF521/HOI=0.42770.

The distance perpendicular to the optical axis between the inflection point on the object side of the fifth lens that is second nearest to the optical axis and the optical axis is expressed as HIF512. The distance perpendicular to the optical axis between the inflection point on the image side of the fifth lens that is second nearest to the optical axis and the optical axis is expressed as HIF522. They meet the following conditions: HIF512=2.51384 mm and HIF512/HOI=0.50277.

The distance perpendicular to the optical axis between the inflection point on the object side of the fifth lens that is third nearest to the optical axis and the optical axis is expressed as HIF513. The distance perpendicular to the optical axis between the inflection point on the image side of the fifth lens that is third nearest to the optical axis and the optical axis is expressed as HIF523. They meet the following conditions: HIF513=0 mm, HIF513/HOI=0, HIF523=0 mm and HIF523/HOI=0.

The distance perpendicular to the optical axis between the inflection point on the object side of the fifth lens that is fourth nearest to the optical axis and the optical axis is expressed as HIF514. The distance perpendicular to the optical axis between the inflection point on the image side of the fifth lens that is fourth nearest to the optical axis and the optical axis is expressed as HIF524. They meet the following conditions: HIF514=0 mm, HIF514/HOI=0, HIF524=0 mm and HIF524/HOI=0.

The sixth lens 160 has negative refractive power and it is made of plastic material. An object side 162 of the sixth lens 160 is a concave surface and an image side 164 of the sixth lens 160 is a concave surface, and the object side 162 thereof has two inflection points and the image side 164 thereof has one inflection point. Therefore, the incident angle of each field of view on the sixth lens can be effectively adjusted and the spherical aberration can thus be improved. The length of the maximum effective half diameter outline curve of the object side of the sixth lens is expressed as ARS61. The length of the maximum effective half diameter outline curve of the image side of the sixth lens is expressed as ARS62. The length of the ½ entrance pupil diameter (HEP) outline curve of the object-side of the sixth lens is expressed as ARE61. The length of the ½ entrance pupil diameter (HEP) outline curve of the image side of the sixth lens is expressed as ARS62. The thickness of the sixth lens on the optical axis is TP6.

The distance in parallel with an optical axis from an inflection point on the object side of the sixth lens that is nearest to the optical axis to the intersection point on the object side of the sixth lens crossing the optical axis is expressed as SGI611. The distance in parallel with an optical axis from an inflection point on the image side of the sixth lens that is nearest to the optical axis to the intersection point on the image-side of the sixth lens crossing the optical axis is expressed as SGI621. They meet the following conditions: SGI611=−0.38558 mm, |SGI611|/(|SGI611|+TP6)=0.27212, SGI621=0.12386 mm and |SGI621|/(|SGI621|+TP6)=0.10722.

The distance in parallel with an optical axis from an inflection point on the object side of the sixth lens that is second nearest to the optical axis to an intersection point on the object side of the sixth lens crossing the optical axis is expressed as SGI612. The distance in parallel with an optical axis from an inflection point on the image side of the sixth lens that is second nearest to the optical axis to the intersection point on the image side of the sixth lens crossing the optical axis is expressed as SGI622. They meet the following conditions: SGI612=−0.47400 mm, |SGI612|/(|SGI612|+TP6)=0.31488, SGI622=0 mm and |SGI622|/(|SGI622|+TP6)=0.

The distance perpendicular to the optical axis between the inflection point on the object side of the sixth lens that is nearest to the optical axis and the optical axis is expressed as HIF611. The distance perpendicular to the optical axis between the inflection point on the image side of the sixth lens that is nearest to the optical axis and the optical axis is expressed as HIF621. They meet the following conditions: HIF611=2.24283 mm, HIF611/HOI=0.44857, HIF621=1.07376 mm and HIF621/HOI=0.21475.

The distance perpendicular to the optical axis between the inflection point on the object side of the sixth lens that is second nearest to the optical axis and the optical axis is expressed as HIF612. The distance perpendicular to the optical axis between the inflection point on the image side of the sixth lens that is second nearest to the optical axis and the optical axis is expressed as HIF622. They meet the following conditions: HIF612=2.48895 mm and HIF612/HOI=0.49779.

The distance perpendicular to the optical axis between the inflection point on the object side of the sixth lens that is third nearest to the optical axis and the optical axis is expressed as HIF613. The distance perpendicular to the optical axis between the inflection point on the image side of the sixth lens that is third nearest to the optical axis and the optical axis is expressed HIF623. They meet the following conditions: HIF613=0 mm, HIF613/HOI=0, HIF623=0 mm and HIF623/HOI=0.

The distance perpendicular to the optical axis between the inflection point on the object side of the sixth lens that is fourth nearest to the optical axis and the optical axis is expressed as HIF614. The distance perpendicular to the optical axis between the inflection point on the image side of the sixth lens that is fourth nearest to the optical axis and the optical axis is expressed as HIF624. They meet the following conditions: HIF614=0 mm, HIF614/HOI=0, HIF624=0 mm and HIF624/HOI=0.

The IR-bandstop filter 180 is made of glass material. The IR-bandstop filter 180 is disposed between the sixth lens 160 and the first image plane 190, and it does not affect the focal length of the optical image capturing system.

In the optical image capturing system of the first embodiment, the focal length of the optical image capturing system is f, the entrance pupil diameter of the optical image capturing system is HEP, and a half maximum view angle of the optical image capturing system is HAF. The detailed parameters are shown as below: f=4.075 mm, f/HEP=1.4, HAF=50.001° and tan(HAF)=1.1918.

In the optical image capturing system of the first embodiment, the focal length of the first lens 110 is f1 and the focal length of the sixth lens 160 is f6. They meet the following conditions: f1=−7.828 mm, |f/f1|=0.52060, f6=−4.886 and |f1|>|f6|.

In the optical image capturing system of the first embodiment, focal lengths of the second lens 120 to the fifth lens 150 are f2, f3, f4 and f5, respectively. They meet the following conditions: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each of lens with positive refractive power is PPR. The ratio of the focal length f of the optical image capturing system to a focal length fn of each of lens with negative refractive power is NPR. In the optical image capturing system of the first embodiment, the sum of the PPR of all lenses with positive refractive power is ΣPPR=f/f2+f/f4+f/f5=1.63290. The sum of the NPR of all lenses with negative refractive powers is ΣNPR=|f/f1|+|f/f3|+|f/f6|=1.51305, ΣPPR/|ΣNPR|=1.07921. Simultaneously, they also meet the following conditions: |f/f2|=0.69101, |f/f3|=0.15834, |f/f4|=0.06883, |f/f5|=0.87305 and |f/f6|=0.83412.

In the optical image capturing system of the first embodiment, the distance from the object side 112 of the first lens to the image side 164 of the sixth lens is InTL. The distance from the object side 112 of the first lens to the first image plane 190 is HOS. The distance from an aperture 100 to the first image plane 190 is InS. Half of a diagonal length of an effective detection field of the image sensing device 192 is HOI. The distance from the image side 164 of the sixth lens to the first image plane 190 is BFL. They meet the following conditions: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total thickness of all lenses with refractive power on the optical axis is ΣTP. It meets the following conditions: ΣTP=8.13899 mm and ΣTP/InTL=0.52477. Therefore, it can keep the contrast ratio of the optical image capturing system and the yield rate about manufacturing lens at the same time, and provide the proper back focal length so as to accommodate other elements.

In the optical image capturing system of the first embodiment, the curvature radius of the object side 112 of the first lens is R1. The curvature radius of the image side 114 of the first lens is R2. They meet the following conditions: |R1/R2|=8.99987. Therefore, the first lens may have a suitable magnitude of positive refractive power, so as to prevent the longitudinal spherical aberration from increasing too fast.

In the optical image capturing system of the first embodiment, the curvature radius of the object side 162 of the sixth lens is R11. The curvature radius of the image side 164 of the sixth lens is R12. They meet the following conditions: (R11−R12)/(R11+R12)=1.27780. Therefore, it is beneficial to correct the astigmatism generated by the optical image capturing system.

In the optical image capturing system of the first embodiment, the sum of focal lengths of all lenses with positive refractive power is ΣPP. It meets the following conditions: ΣPP=f2+f4+f5=69.770 mm and f5/(f2+f4+f5)=0.067. Hereby, this configuration is helpful to distribute the positive refractive power of a single lens to other lens with positive refractive powers in an appropriate way, so as to suppress the generation of noticeable aberrations in the propagating process of the incident light in the optical system.

In the optical image capturing system of the first embodiment, the sum of focal lengths of all lenses with negative refractive power is ΣNP. It meets the following conditions: ΣNP=f1+f3+f6=−38.451 mm and f6/(f1+f3+f6)=0.127. Hereby, this configuration is helpful to distribute the sixth lens with negative refractive power to other lens with negative refractive powers in an appropriate way, so as to suppress the generation of noticeable aberrations in the propagating process of the incident light in the optical system.

In the optical image capturing system of the first embodiment, the distance between the first lens 110 and the second lens 120 on the optical axis is IN12. It meets the following conditions: IN12=6.418 mm and IN12/f=1.57491. Therefore, it is helpful to improve the chromatic aberration of the lens in order to elevate their performance.

In the optical image capturing system of the first embodiment, a distance between the fifth lens 150 and the sixth lens 160 on the optical axis is IN56. It meets the following conditions: IN56=0.025 mm and IN56/f=0.00613. Therefore, it is helpful to improve the chromatic aberration of the lens in order to elevate their performance.

In the optical image capturing system of the first embodiment, the thicknesses of the first lens 110 and the second lens 120 on the optical axis are TP1 and TP2, respectively. They meet the following conditions: TP1=1.934 mm, TP2=2.486 mm and (TP1+IN12)/TP2=3.36005. Therefore, it is helpful to control the sensitivity generated by the optical image capturing system and elevate their performance.

In the optical image capturing system of the first embodiment, central thicknesses of the fifth lens 150 and the sixth lens 160 on the optical axis are TP5 and TP6, respectively, and the distance between the aforementioned two lens on the optical axis is IN56. They meet the following conditions: TP5=1.072 mm, TP6=1.031 mm and (TP6+IN56)/TP5=0.98555. Therefore, it is helpful to control the sensitivity generated by the optical image capturing system and reduce the total height of the optical image capturing system.

In the optical image capturing system of the first embodiment, a distance between the third lens 130 and the fourth lens 140 on the optical axis is IN34. The distance between the fourth lens 140 and the fifth lens 150 on the optical axis is IN45. It meets the following conditions: IN34=0.401 mm, IN45=0.025 mm and TP4/(IN34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, a distance in parallel with an optical axis from a maximum effective half diameter position to an intersection point on the object side 152 of the fifth lens crossing the optical axis is InRS51. The distance in parallel with an optical axis from a maximum effective half diameter position to an intersection point on the image side 154 of the fifth lens crossing the optical axis is InRS52. The thickness of the fifth lens 150 is TP5. They meet the following conditions: InRS51=−0.34789 mm, InRS52=−0.88185 mm, |InRS51|/TP5=0.32458 and |InRS52|/TP5=0.82276. Hereby, this configuration is favorable to the manufacturing and forming of lens and keeping the miniaturization of the optical image capturing system effectively.

In the optical image capturing system of the first embodiment, the distance perpendicular to the optical axis between a critical point C51 on the object side 152 of the fifth lens and the optical axis is HVT51. The distance perpendicular to the optical axis between a critical point C52 on the image side 154 of the fifth lens and the optical axis is HVT52. They meet the following conditions: HVT51=0.515349 mm and HVT52=0 mm.

In the optical image capturing system of the first embodiment, a distance in parallel with an optical axis from a maximum effective half diameter position to an intersection point on the object side 162 of the sixth lens crossing the optical axis is InRS61. A distance in parallel with an optical axis from a maximum effective half diameter position to an intersection point on the image side 164 of the sixth lens is InRS62. The thickness of the sixth lens 160 is TP6. They meet the following conditions: InRS61=−0.58390 mm, InRS62=0.41976 mm, |InRS61|/TP6=0.56616 and |InRS62|/TP6=0.40700. Hereby, this configuration is favorable to the manufacturing and forming of lens and keeping the miniaturization of the optical image capturing system effectively.

In the optical image capturing system of the first embodiment, the distance perpendicular to the optical axis between a critical point C61 on the object side 162 of the sixth lens and the optical axis is HVT61. The distance perpendicular to the optical axis between a critical point C62 on the image side 164 of the sixth lens and the optical axis is HVT62. It meets the following conditions: HVT61=0 mm and HVT62=0 mm.

In the optical image capturing system of the first embodiment, it meets the following condition: HVT51/HOI=0.1031. Therefore, it is helpful to correct the aberration of surrounding field of view of the optical image capturing system.

In the optical image capturing system of the first embodiment, it meets the following condition: HVT51/HOS=0.02634. Therefore, it is helpful to correct the aberration of surrounding field of view.

In the optical image capturing system of the first embodiment, the second lens 120, the third lens 130 and the sixth lens 160 have negative refractive powers. The coefficient of dispersion of the second lens is NA2. The coefficient of dispersion of the third lens is NA3. The coefficient of dispersion of the sixth lens is NA6. They meet the following condition: NA6/NA2≤1. Therefore, it is helpful to correct the chromatic aberration of the optical image capturing system.

In the optical image capturing system of the first embodiment, TV distortion and optical distortion for image formation in the optical image capturing system are TDT and ODT, respectively. They meet the following condition: |TDT|=2.124% and |ODT|=5.076%.

In the first embodiment of the present invention, the rays of any field of view can be further divided into sagittal ray and tangential ray, and the spatial frequency of 110 cycles/mm serves as the benchmark for evaluating the focus shifts and the values of MTF. The focus shifts where the through focus MTF values of the visible sagittal ray at the central field of view, 0.3 field of view, and 0.7 field of view of the optical image capturing system are at their respective maxima are expressed as VSFS0, VSFS3, and VSFS7 (unit of measurement: mm), respectively. The values of VSFS0, VSFS3, and VSFS7 equal to 0.000 mm, −0.005 mm, and 0.000 mm, respectively. The maximum values of the through focus MTF of the visible sagittal ray at the central field of view, 0.3 field of view, and 0.7 field of view are expressed as VSMTF0, VSMTF3, and VSMTF7, respectively. The values of VSMTF0, VSMTF3, and VSMTF7 equal to 0.886, 0.885, and 0.863, respectively. The focus shifts where the through focus MTF values of the visible tangential ray at the central field of view, 0.3 field of view, and 0.7 field of view of the optical image capturing system are at their respective maxima are expressed as VTFS0, VTFS3, and VTFS7 (unit of measurement: mm), respectively. The values of VTFS0, VTFS3, and VTFS7 equal to 0.000 mm, 0.001 mm, and −0.005 mm, respectively. The maximum values of the through focus MTF of the visible tangential ray at the central field of view, 0.3 field of view, and 0.7 field of view are expressed as VTMTF0, VTMTF3, and VTMTF7, respectively. The values of VTMTF0, VTMTF3, and VTMTF7 equal to 0.886, 0.868, and 0.796, respectively. The average focus shift (position) of both the aforementioned focus shifts of the visible sagittal ray at three fields of view and focus shifts of the visible tangential ray at three fields of view is expressed as AVFS (unit of measurement: mm), which meets the absolute value |(VSFS0+VSFS3+VSFS7+VTFS0+VTFS3+VTFS7)/6|=|0.000 mm|.

The focus shifts where the through focus MTF values of the infrared sagittal ray at the central field of view, 0.3 field of view, and 0.7 field of view of the optical image capturing system are at their respective maxima, are expressed as ISFS0, ISFS3, and ISFS7 (unit of measurement: mm), respectively. The values of ISFS0, ISFS3, and ISFS7 equal to 0.025 mm, 0.020 mm, and 0.020 mm, respectively. The average focus shift (position) of the aforementioned focus shifts of the infrared sagittal ray at three fields of view is expressed as AISFS (unit of measurement: mm). The maximum values of the through focus MTF of the infrared sagittal ray at the central field of view, 0.3 field of view, and 0.7 field of view are expressed as ISMTF0, ISMTF3, and ISMTF7, respectively. The values of ISMTF0, ISMTF3, and ISMTF7 equal to 0.787, 0.802, and 0.772, respectively. The focus shifts where the through focus MTF values of the infrared tangential ray at the central field of view, 0.3 field of view, and 0.7 field of view of the optical image capturing system are at their respective maxima are expressed as ITFS0, ITFS3, and ITFS7 (unit of measurement: mm), respectively. The values of ITFS0, ITFS3, and ITFS7 equal to 0.025, 0.035, and 0.035, respectively. The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are expressed as ITMTF0, ITMTF3, and ITMTF7, respectively. The values of ITMTF0, ITMTF3, and ITMTF7 equal to 0.787, 0.805, and 0.721, respectively. The average focus shift (position) of both of the aforementioned focus shifts of the infrared sagittal ray at the three fields of view and focus shifts of the infrared tangential ray at the three fields of view is expressed as AIFS (unit of measurement: mm), which equals to the absolute value of |(ISFS0+ISFS3+ISFS7+ITFS0+ITFS3+ITFS7)/6|=|0.02667 mm|.

The focus shift (difference) of the focal points of the visible light and the focus shift (difference) of the focal points of the infrared light at their respective central fields of view (RGB/IR) of the entire optical image capturing system (i.e. wavelength of 850 nm versus wavelength of 555 nm, unit of measurement: mm) is expressed as FS, which meets the absolute value |(VSFS0+VTFS0)/2−(ISFS0+ITFS0)/2|=|0.025 mm|; The difference (focus shift) between the average focus shift of the visible light in the three fields of view and the average focus shift of the infrared light in the three fields of view (RGB/IR) of the entire optical image capturing system is expressed as AFS (i.e. wavelength of 850 nm versus wavelength of 555 nm, unit of measurement: mm), which may meet the absolute value of |AIFS−AVFS|=|0.02667 mm|.

In the optical image capturing system of the first embodiment, a lateral aberration of the longest operation wavelength of a visible light of a positive direction tangential fan diagram passing through a margin of the aperture and striking on the image plane at 0.7 field of view is expressed as PLTA and its values is 0.006 mm. A lateral aberration of the shortest operation wavelength of a visible light of the positive direction tangential fan diagram passing through the margin of the entrance pupil and striking on the image plane at 0.7 field of view is expressed as PSTA and its value is 0.005 mm. A lateral aberration of the longest operation wavelength of a visible light of a negative direction tangential fan diagram passing through the margin of the aperture and striking on the image plane at 0.7 field of view is expressed as NLTA and its value is 0.004 mm. A lateral aberration of the shortest operation wavelength of a visible light of a negative direction tangential fan diagram passing through the margin of the entrance pupil and striking on the image plane at 0.7 field of view is expressed as NSTA and its value is −0.007 mm. A lateral aberration of the longest operation wavelength of a visible light of a sagittal fan diagram passing through the margin of the entrance pupil and striking on the image plane at 0.7 field of view is expressed as SLTA and its value is −0.003 mm. A lateral aberration of the shortest operation wavelength of a visible light of the sagittal fan diagram passing through the margin of the entrance pupil and striking on the image plane by 0.7 HOI is expressed as SSTA and its value is 0.008 mm.

Table 1 and Table 2 below should be incorporated into the reference of the present embodiment.

TABLE 1

Lens Parameters for the First Embodiment
f(focal length) = 4.075 mm; f/HEP = 1.4; HAF(half angle of view) = 50.000 deg

| Surface No | | Curvature Radius | Thickness (mm) | Material | Refractive Index | Coefficient of Dispersion | Focal Length |
|---|---|---|---|---|---|---|---|
| 0 | Object | Plane | Plane | | | | |
| 1 | Lens 1 | −40.99625704 | 1.934 | Plastic | 1.515 | 56.55 | −7.828 |
| 2 | | 4.555209289 | 5.923 | | | | |
| 3 | Aperture | Plane | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |
| 14 | IR-bandstop Filter | Plane | 0.200 | | 1.517 | 64.13 | |
| 15 | | Plane | 1.420 | | | | |
| 16 | Image Plane | Plane | | | | | |

Reference Wavelength = 555 nm; Shield Position: The 1st surface with effective aperture radius = 5.800 mm; The 3rd surface with effective aperture radius = 1.570 mm; the 5th surface with the effective aperture radius = 1.950 mm

TABLE 2

Aspheric Coefficients of the First Embodiment
Table 2: Aspheric Coefficients

| | Surface No | | | | | | |
|---|---|---|---|---|---|---|---|
| | 1 | 2 | 4 | 5 | 6 | 7 | 8 |
| k | 4.310876E+01 | −4.707622E+00 | 2.616025E+00 | 2.445397E+00 | 5.645686E+00 | 2.117147E+01 | 5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−03 | −1.502232E−04 | −1.835068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| | Surface No | | | | |
|---|---|---|---|---|---|
| | 9 | 10 | 11 | 12 | 13 |
| k | 6.200000E+01 | 2.114008E+01 | 7.699904E+00 | 6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The values pertaining to the length of the outline curves are obtainable from the data in Table 1 and Table 2

| First Embodiment (Primary Reference Wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |
| ARS | EHD | ARS value | ARS − EHD | (ARS/EHD) % | TP | ARS/TP (%) |
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structural data for the first embodiment in FIG. 1A, of which the unit for the curvature radius, the central thickness, the distance, and the focal length is millimeters (mm). Surfaces 0-16 illustrate the surfaces from the object side to the image side in the optical image capturing system. Table 2 shows the aspheric coefficients of the first embodiment, where k is the cone coefficient in the aspheric surface equation, and $A_1$-$A_{20}$ are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
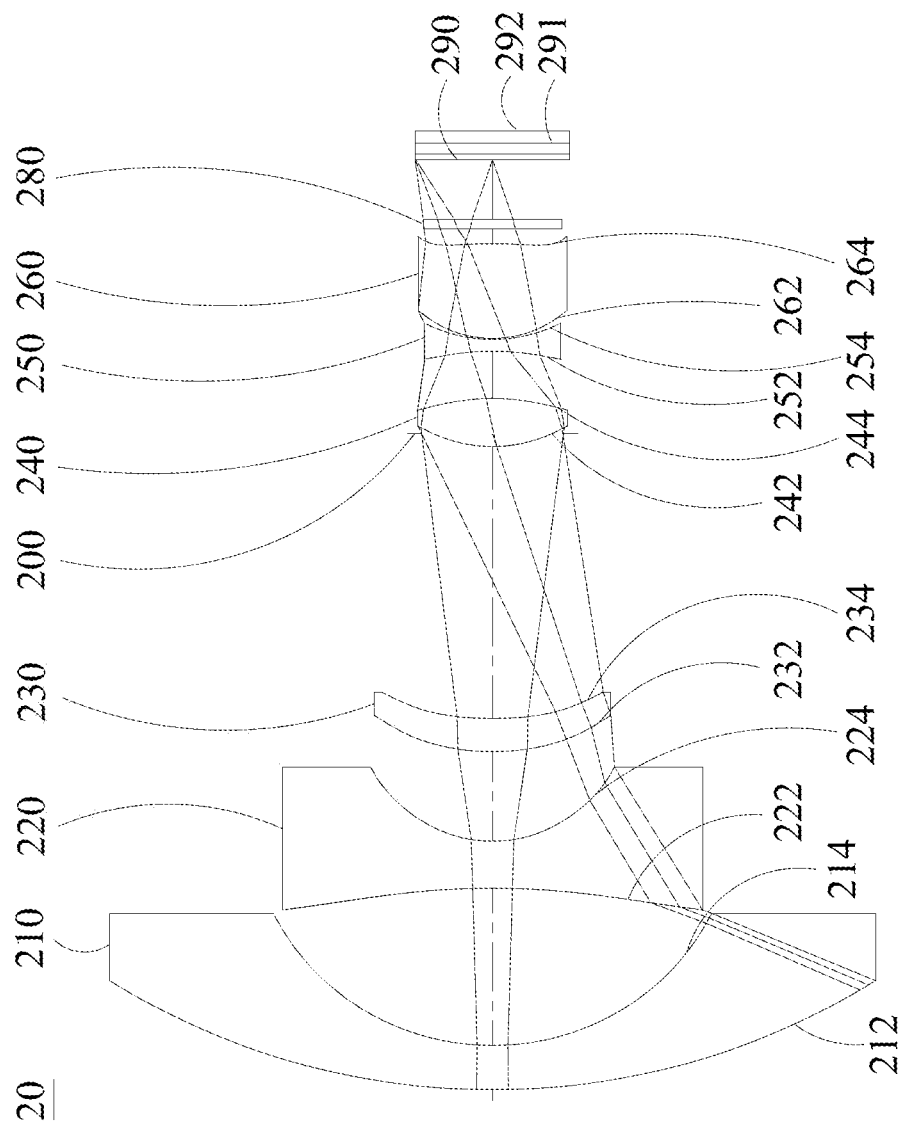
FIG. 2A is a schematic view of the optical image capturing system according to the second embodiment of the present invention.
Figure 2B:
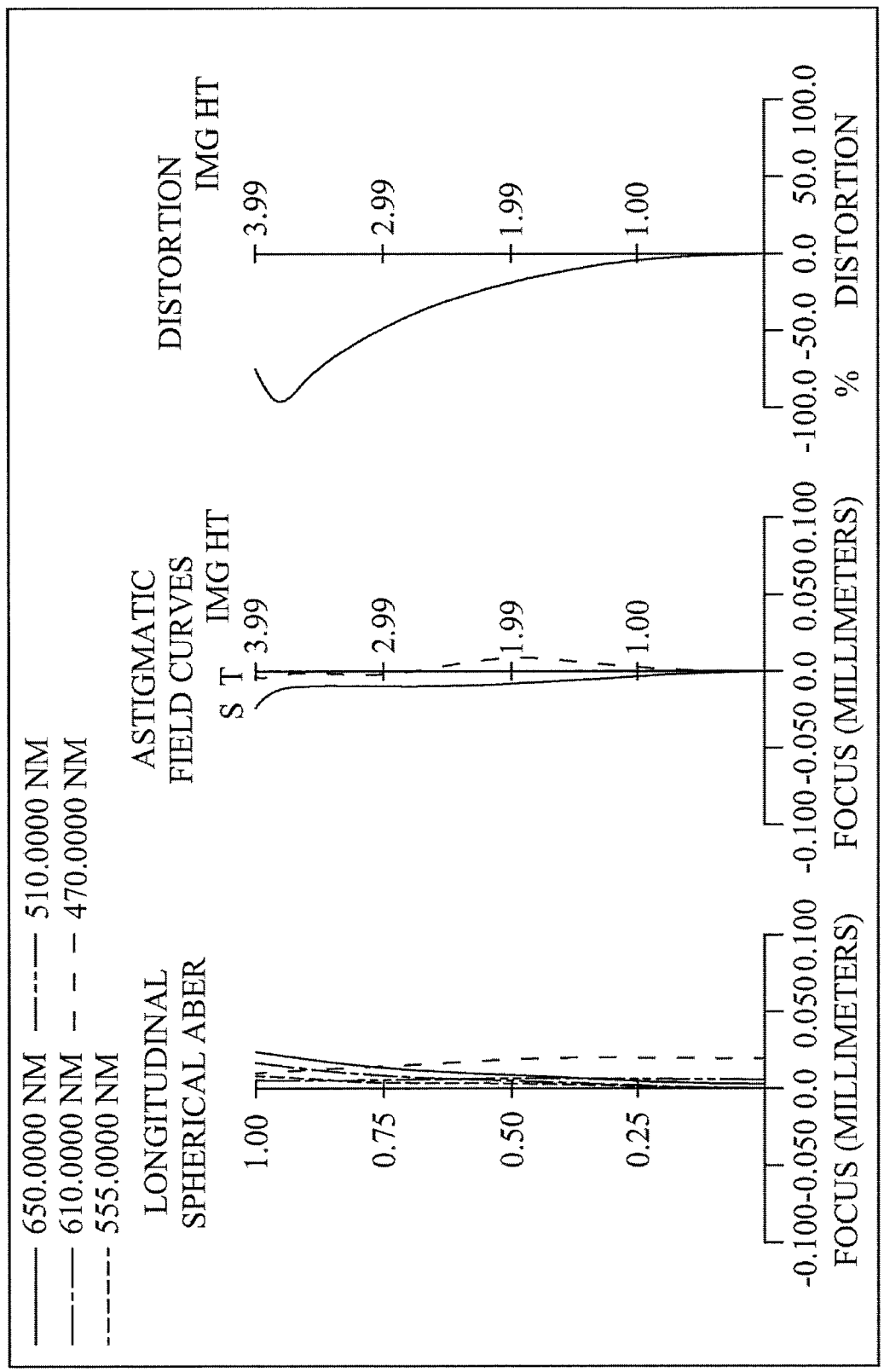
FIG. 2B shows the longitudinal spherical aberration curves, astigmatic field curves, and optical distortion curve of the optical image capturing system in the order from left to right according to the second embodiment of the present invention.
Figure 2C:
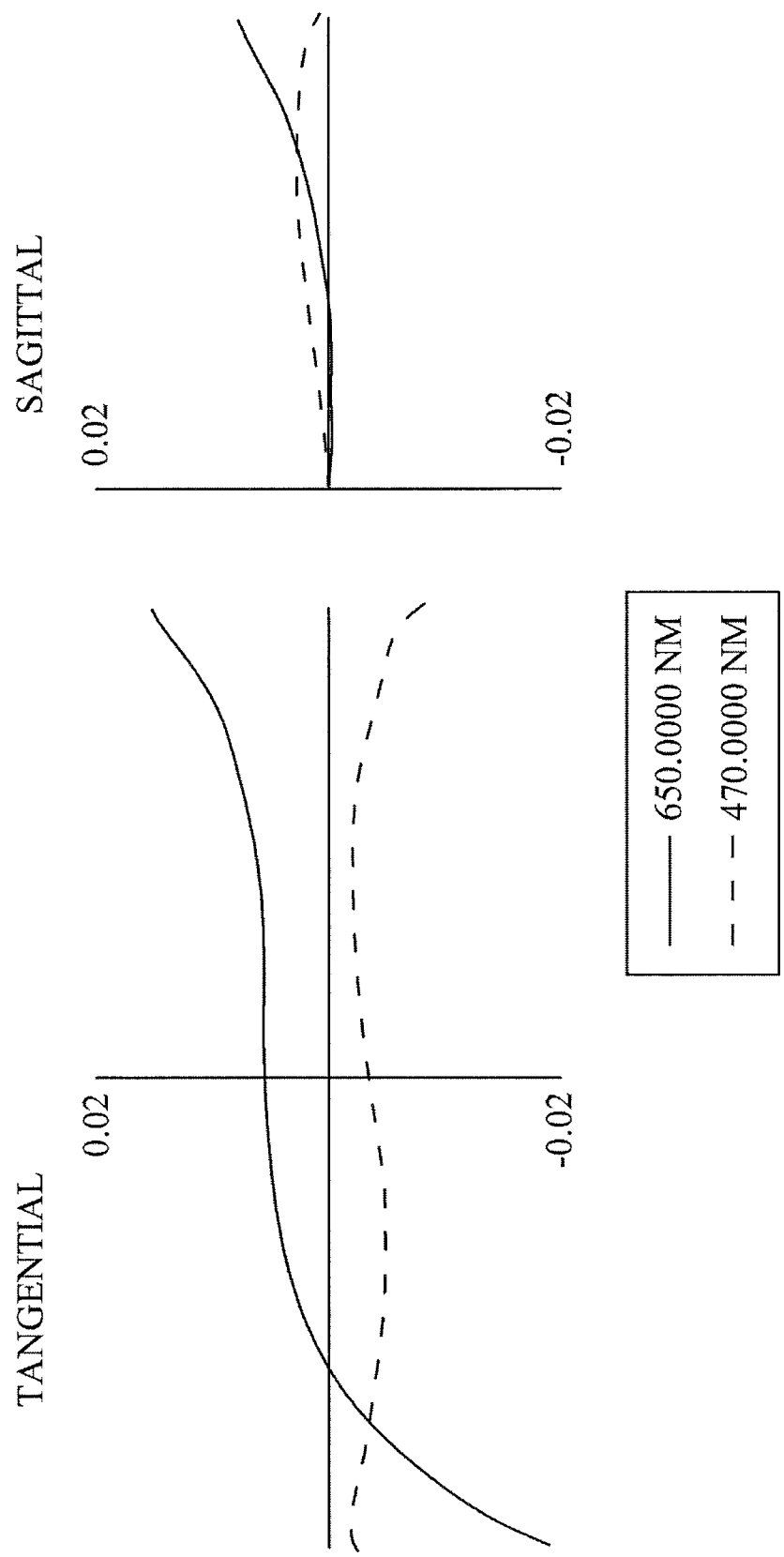
FIG. 2C shows the sagittal fan and the tangential fan of the optical image capturing system and the lateral aberration diagram of the longest operation wavelength and the shortest operation wavelength passing thorough the margin of the aperture at 0.7 field of view according to the second embodiment of the present invention.
Figure 2D:
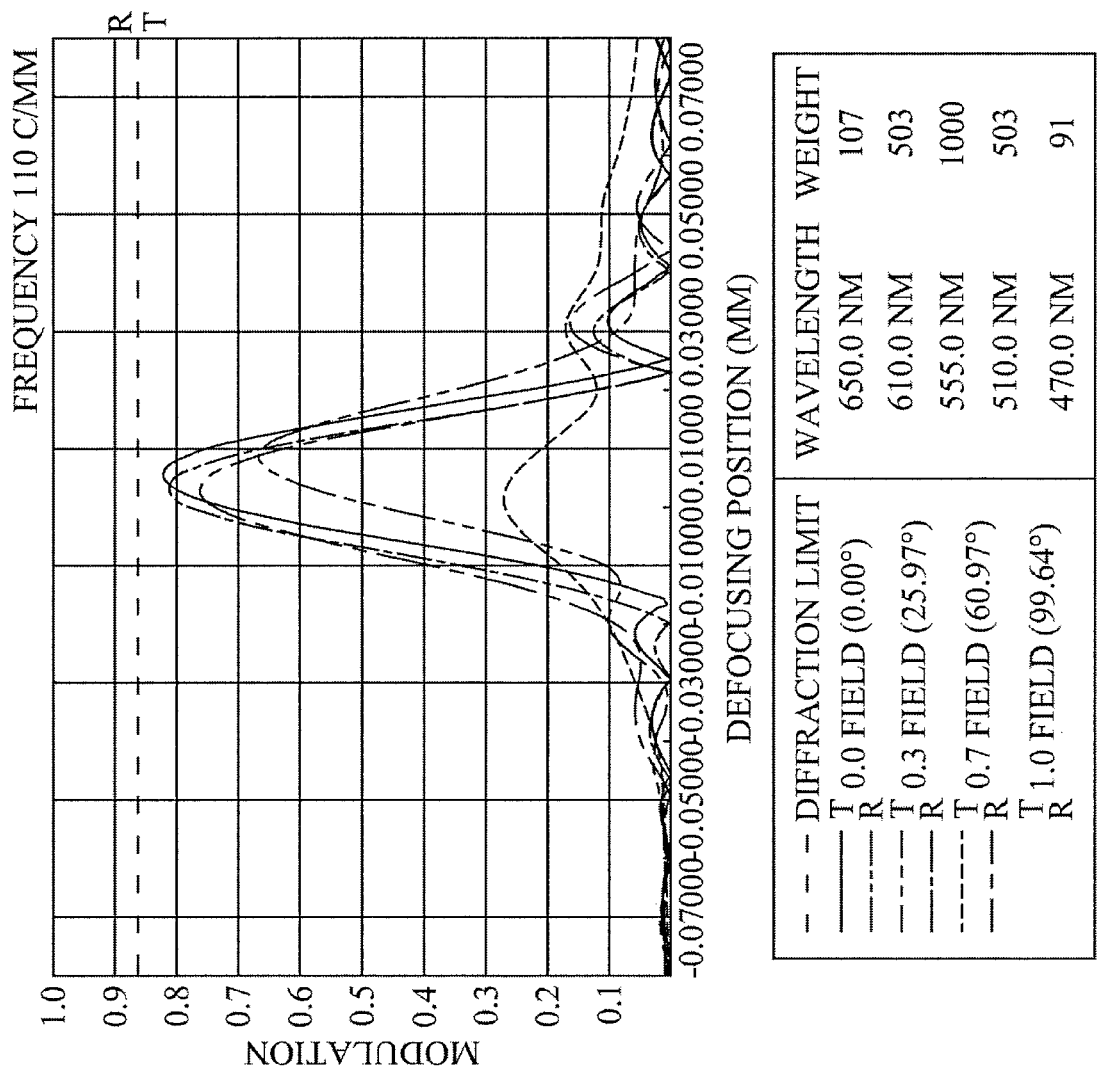
FIG. 2D is a diagram showing the through focus MTF values of the visible light spectrum at the central field of view, 0.3 field of view, and 0.7 field of view of the second embodiment of the present invention.
Figure 2E:
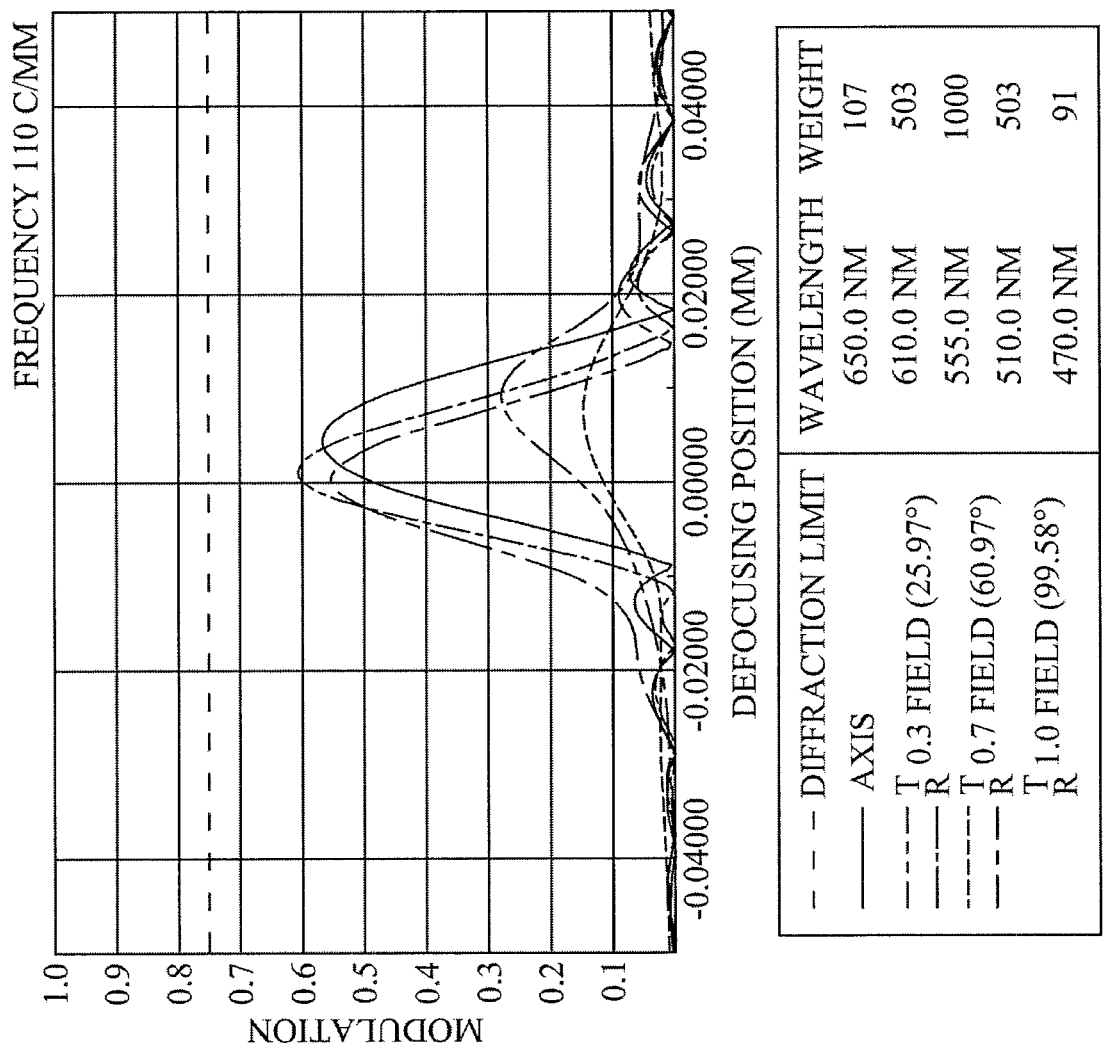
FIG. 2E is a diagram showing the through focus MTF values of the infrared light spectrum at the central field of view, 0.3 field of view, and 0.7 field of view of the second embodiment of the present invention.

Please refer to FIGS. 2A to 2E. FIG. 2A is a schematic view of the optical image capturing system according to the second embodiment of the present invention. FIG. 2B shows the longitudinal spherical aberration curves, astigmatic field curves, and optical distortion curve of the optical image capturing system in the order from left to right according to the second embodiment of the present invention. FIG. 2C shows the lateral aberration diagram of the the optical image capturing system at 0.7 field of view according to the second embodiment of the present invention. FIG. 2D is a diagram showing the through focus MTF values of the visible light spectrum at the central field of view, 0.3 field of view, and 0.7 field of view of the second embodiment of the present invention. FIG. 2E is a diagram showing the through focus MTF values of the infrared light spectrum at the central field of view, 0.3 field of view, and 0.7 field of view of the second embodiment of the present invention.

As shown in FIG. 2A, in the order from the object side to the image side, the optical image capturing system 20 includes a first lens 210, a second lens 220, a third lens 230, an aperture 200, a fourth lens 240, a fifth lens 250, a sixth lens 260, an IR-bandstop filter 280, a first image plane 290, a second image plane 291 and an image sensing device 292.

The first lens 210 has negative refractive power and is made of glass material. The object side 212 of the first lens 210 is a convex surface and the image side 214 of the first lens 210 is a concave surface, and both of the object-side 212 and the image-side 214 are spherical.

The second lens 220 has negative refractive power and is made of plastic material. The object side 222 of the second lens 220 is a concave surface and the image side 224 of the second lens 220 is a concave surface, and both of the object side 222 and an image side 224 are aspheric. Both the image side 224 and the object side 222 thereof have one inflection point.

The third lens 230 has positive refractive power and is made of plastic material. The object side 232 of the third lens 230 is a convex surface and the image side 234 of the third lens 230 is a concave surface, and both of the object side 232 and an image side 234 are aspheric. The image-side 234 and the object-side 232 thereof each has one inflection point.

The fourth lens 240 has positive refractive power and is made of plastic material. The object side 242 of the fourth lens 240 is a convex surface and the image side 244 of the fourth lens 240 is a convex surface, and both of the object side 242 and an image-side 244 are aspheric.

The fifth lens 250 has negative refractive power and is made of plastic material. The object side 252 of the fifth lens 250 is a concave surface and the image-side 254 of the fifth lens 250 is a concave surface, and both of the object side 252 and an image side 254 are aspheric.

The sixth lens 260 has positive refractive power and is made of plastic material. The object side 262 of the sixth lens 260 is a convex surface and the image side 264 of the sixth lens 260 is a convex surface, and both of the object side 262 and an image side 264 are aspheric. Hereby, this configuration is beneficial to shorten the back focal distance of the optical image capturing system so as to keep its miniaturization. Besides, the incident angle of the off-axis rays can be reduced effectively, thereby further correcting the off-axis aberration.

The IR-bandstop filter 280 may be made of glass material and is disposed between the sixth lens 260 and the first image plane 290. The IR-bandstop filter 280 does not affect the focal length of the optical image capturing system.

Table 3 and Table 4 below should be incorporated into the reference of the present embodiment In the second embodiment, the presentation of the aspheric surface equation is similar to that in the first embodiment. Besides, the definitions of parameters in following tables are similar to those in the first embodiment, so the repetitive details will not be given here.

The following values for the conditions can be obtained from the data in Table 3 and Table 4.

TABLE 3

Lens Parameters for the Second Embodiment
f(focal length) = 2.623 mm; f/HEP = 1.6; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 36.44771223 | 2.370 | Glass | 1.639 | 44.87 | −31.138 |
| 2 | | 12.58010262 | 8.454 | | | | |
| 3 | Lens 2 | −37.52140975 | 2.534 | Plastic | 1.565 | 58.00 | −9.343 |
| 4 | | 6.316043699 | 4.813 | | | | |
| 5 | Lens 3 | 12.09007476 | 1.781 | Plastic | 1.661 | 20.40 | 59.150 |
| 6 | | 16.40680594 | 15.298 | | | | |
| 7 | Aperture | 1E+18 | −0.674 | | | | |
| 8 | Fourth Lens | 6.982413435 | 2.582 | Plastic | 1.565 | 58.00 | 7.513 |
| 9 | | −9.454920289 | 2.532 | | | | |
| 10 | Fifth Lens | −13.97737253 | 0.650 | Plastic | 1.661 | 20.40 | −6.835 |
| 11 | | 6.888085033 | 0.050 | | | | |
| 12 | Sixth Lens | 5.583123157 | 5.095 | Plastic | 1.565 | 58.00 | 7.893 |
| 13 | | −15.0826815 | 0.800 | | | | |
| 14 | IR-bandstop Filter | 1E+18 | 0.500 | BK_7 | 1.517 | 64.13 | |
| 15 | | 1E+18 | 3.215 | | | | |
| 16 | Image Plane | 1E+18 | 0.001 | | | | |

Reference Wavelength = 555 nm; the second embodiment doesn't have any shield position.

TABLE 4

The Aspheric Coefficients of the Second Embodiment
Table 4: Aspheric Coefficients

| | Surface No | | | | | | |
|---|---|---|---|---|---|---|---|
| | 1 | 2 | 3 | 4 | 5 | 6 | 8 |
| k | 0.000000E+00 | 0.000000E+00 | 7.875086E−02 | −1.580207E−01 | 5.920569E−01 | 1.783900E+00 | −5.507205E−01 |
| A4 | 0.000000E+00 | 0.000000E+00 | 2.476672E−05 | −2.514514E−04 | 2.429537E−04 | 4.031117E−04 | 3.579713E−05 |
| A6 | 0.000000E+00 | 0.000000E+00 | 4.995792E−08 | −8.330178E−08 | 6.926740E−07 | 1.926526E−06 | 3.262387E−06 |
| A8 | 0.000000E+00 | 0.000000E+00 | 4.109146E−10 | −3.372052E−08 | −2.910423E−08 | −1.087557E−07 | −3.703268E−07 |
| A10 | 0.000000E+00 | 0.000000E+00 | −2.916730E−12 | −1.527116E−10 | −1.556833E−09 | −1.712295E−09 | 1.423515E−08 |

| | Surface No | | | | |
|---|---|---|---|---|---|
| | 9 | 10 | 11 | 12 | 13 |
| k | 6.736506E−02 | 7.667548E+00 | −4.984082E+00 | −2.194228E−01 | −1.855207E+01 |
| A4 | 1.187331E−03 | 6.021375E−05 | 4.928482E−04 | 2.864167E−04 | 2.173574E−03 |
| A6 | −3.027745E−05 | 4.606837E−05 | 3.522934E−05 | −8.089623E−06 | 6.144609E−05 |
| A8 | 8.594378E−07 | 9.361247E−07 | 5.482503E−07 | 4.684860E−08 | −9.891258E−08 |
| A10 | −7.789782E−09 | −6.568658E−08 | −7.713307E−08 | −3.771942E−09 | 2.004637E−07 |

| Second Embodiment (Primary Reference Wavelength = 587.5 nm) | | | | | |
|---|---|---|---|---|---|
| \|f/f1\| | \|f/f2\| | \|f/f3\| | \|f/f4\| | \|f/f5\| | \|f/f6\| |
| 0.08425 | 0.28079 | 0.04435 | 0.34917 | 0.38383 | 0.33236 |
| Σ PPR | Σ NPR | Σ PPR/\|Σ NPR\| | IN12/f | IN56/f | TP4/(IN34 + TP4 + IN45) |
| 0.86160 | 0.61315 | 1.40521 | 3.22245 | 0.01906 | 0.13083 |
| \|f1/f2\| | \|f2/f3\| | (TP1 + IN12)/TP2 | | (TP6 + IN56)/TP5 | |
| 3.33278 | 0.15795 | 4.27205 | | 7.91979 | |
| HOS | InTL | HOS/HOI | InS/HOS | ODT % | TDT % |
| 49.99640 | 45.48420 | 12.49910 | 0.29495 | −127.69600 | 99.21520 |
| HVT51 | HVT52 | HVT61 | HVT62 | HVT62/HOI | HVT62/HOS |
| 0 | 0 | 0.00000 | 2.27271 | 0.56818 | 0.04546 |
| TP2/TP3 | TP3/TP4 | InRS61 | InRS62 | \|InRS61\|/TP6 | \|InRS62\|/TP6 |
| 1.42257 | 0.68974 | 1.50761 | 0.12980 | 0.29590 | 0.02548 |

| Second Embodiment (Primary Reference Wavelength = 587.5 nm) | | | | | |
|---|---|---|---|---|---|
| PSTA | PLTA | NSTA | NLTA | SSTA | SLTA |
| −0.009 mm | 0.016 mm | −0.003 mm | −0.020 mm | 0.001 mm | 0.008 mm |
| VSFS0 | VSFS3 | VSFS7 | VTFS0 | VTFS3 | VTFS7 |
| 0.010 | 0.000 | 0.000 | 0.010 | 0.010 | 0.000 |
| VSMTF0 | VSMTF3 | VSMTF7 | VTMTF0 | VTMTF3 | VTMTF7 |
| 0.751 | 0.777 | 0.737 | 0.751 | 0.662 | 0.269 |
| ISFS0 | ISFS3 | ISFS7 | ITFS0 | ITFS3 | ITFS7 |
| 0.050 | 0.050 | 0.050 | 0.050 | 0.050 | 0.070 |
| ISMTF0 | ISMTF3 | ISMTF7 | ITMTF0 | ITMTF3 | ITMTF7 |
| 0.651 | 0.590 | 0.469 | 0.651 | 0.564 | 0.386 |
| FS | AIFS | | AVFS | | AFS |
| 0.040 | 0.053 | | 0.005 | | 0.048 |

The following values about the length of the outline curve can be obtained from the data in Table 3 and Table 4.

| Second Embodiment (Primary Reference Wavelength = 587.5 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.821 | 0.821 | −0.00025 | 99.97% | 2.370 | 34.64% |
| 12 | 0.821 | 0.822 | 0.00026 | 100.03% | 2.370 | 34.66% |
| 21 | 0.821 | 0.821 | −0.00026 | 99.97% | 2.534 | 32.41% |
| 22 | 0.821 | 0.823 | 0.00199 | 100.24% | 2.534 | 32.49% |
| 31 | 0.821 | 0.822 | 0.00032 | 100.04% | 1.781 | 46.13% |
| 32 | 0.821 | 0.821 | 0.00003 | 100.00% | 1.781 | 46.12% |
| 41 | 0.821 | 0.823 | 0.00158 | 100.19% | 2.582 | 31.87% |
| 42 | 0.821 | 0.822 | 0.00068 | 100.08% | 2.582 | 31.83% |
| 51 | 0.821 | 0.821 | 0.00016 | 100.02% | 0.650 | 126.45% |
| 52 | 0.821 | 0.823 | 0.00158 | 100.19% | 0.650 | 126.67% |
| 61 | 0.821 | 0.824 | 0.00267 | 100.33% | 5.095 | 16.17% |
| 62 | 0.821 | 0.821 | 0.00003 | 100.00% | 5.095 | 16.12% |
| ARS | EHD | ARS value | ARS − EHD | (ARS/EHD) % | TP | ARS/TP (%) |
| 11 | 19.919 | 21.073 | 1.154 | 105.79% | 2.370 | 888.95% |
| 12 | 11.331 | 14.107 | 2.776 | 124.50% | 2.370 | 595.12% |
| 21 | 10.888 | 10.963 | 0.075 | 100.69% | 2.534 | 432.69% |
| 22 | 6.304 | 7.838 | 1.534 | 124.33% | 2.534 | 309.35% |
| 31 | 6.118 | 6.535 | 0.417 | 106.81% | 1.781 | 366.89% |
| 32 | 5.754 | 6.002 | 0.248 | 104.31% | 1.781 | 336.97% |
| 41 | 3.871 | 4.082 | 0.211 | 105.45% | 2.582 | 158.09% |
| 42 | 3.880 | 3.942 | 0.062 | 101.59% | 2.582 | 152.64% |
| 51 | 3.508 | 3.542 | 0.034 | 100.96% | 0.650 | 545.17% |
| 52 | 3.526 | 3.667 | 0.141 | 104.00% | 0.650 | 564.55% |
| 61 | 3.841 | 4.221 | 0.380 | 109.90% | 5.095 | 82.85% |
| 62 | 3.457 | 3.490 | 0.033 | 100.96% | 5.095 | 68.50% |

The following values for the conditions can be obtained from the data in Table 3 and Table 4.

| Values Related to Inflection Point of Second Embodiment (Primary Reference Wavelength = 555 nm) | | | | | | | |
|---|---|---|---|---|---|---|---|
| HIF211 | 8.2619 | HIF211/HOI | 2.0655 | SGI211 | −0.7859 | \|SGI211\|/(\|SGI211\| + TP2) | 0.2368 |
| HIF311 | 5.9819 | HIF311/HOI | 1.4955 | SGI311 | 1.8654 | \|SGI311\|/(\|SGI311\| + TP3) | 0.5116 |
| HIF321 | 5.5330 | HIF321/HOI | 1.3832 | SGI321 | 1.3130 | \|SGI321\|/(\|SGI321\| + TP3) | 0.4244 |
| HIF621 | 1.3557 | HIF621/HOI | 0.3389 | SGI621 | −0.0512 | \|SGI621\|/(\|SGI621\| + TP6) | 0.0099 |

Third Embodiment

Figure 3A:
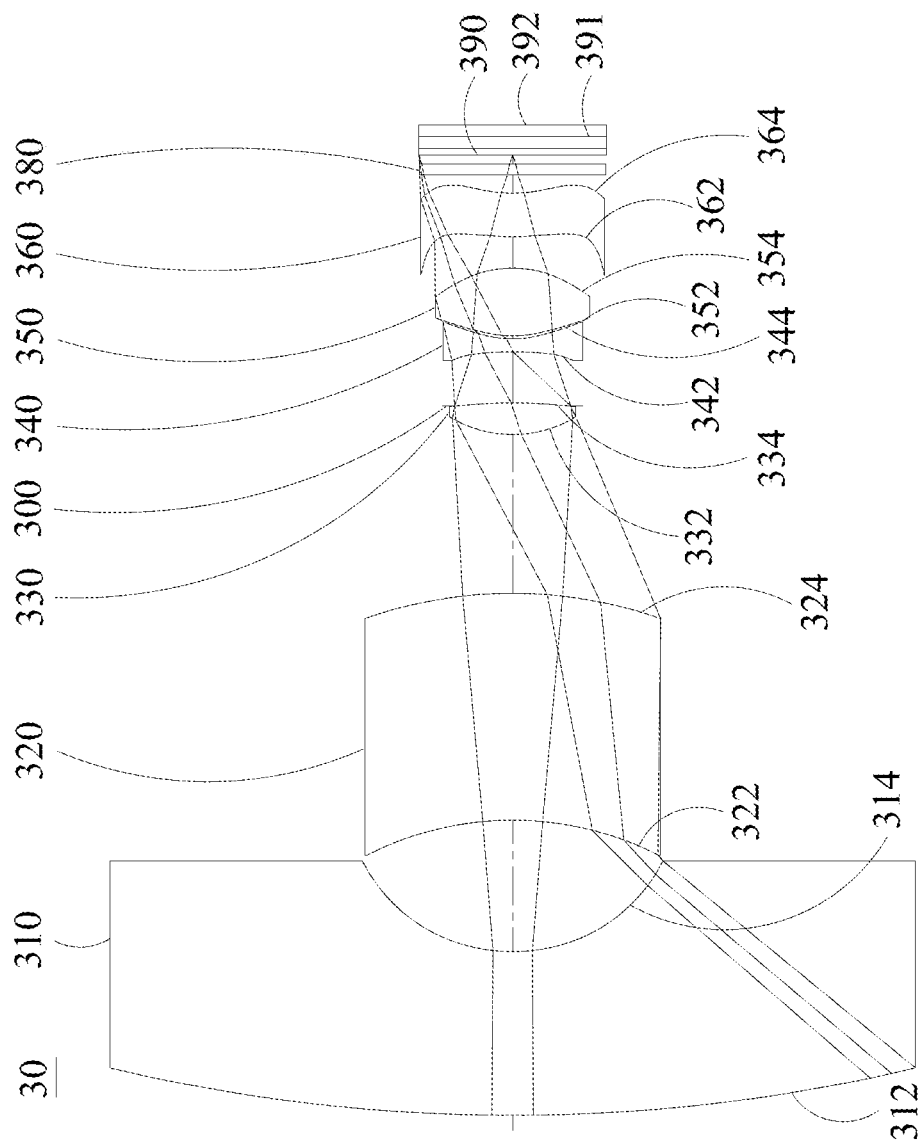
FIG. 3A is a schematic view of the optical image capturing system according to the third embodiment of the present invention.
Figure 3B:
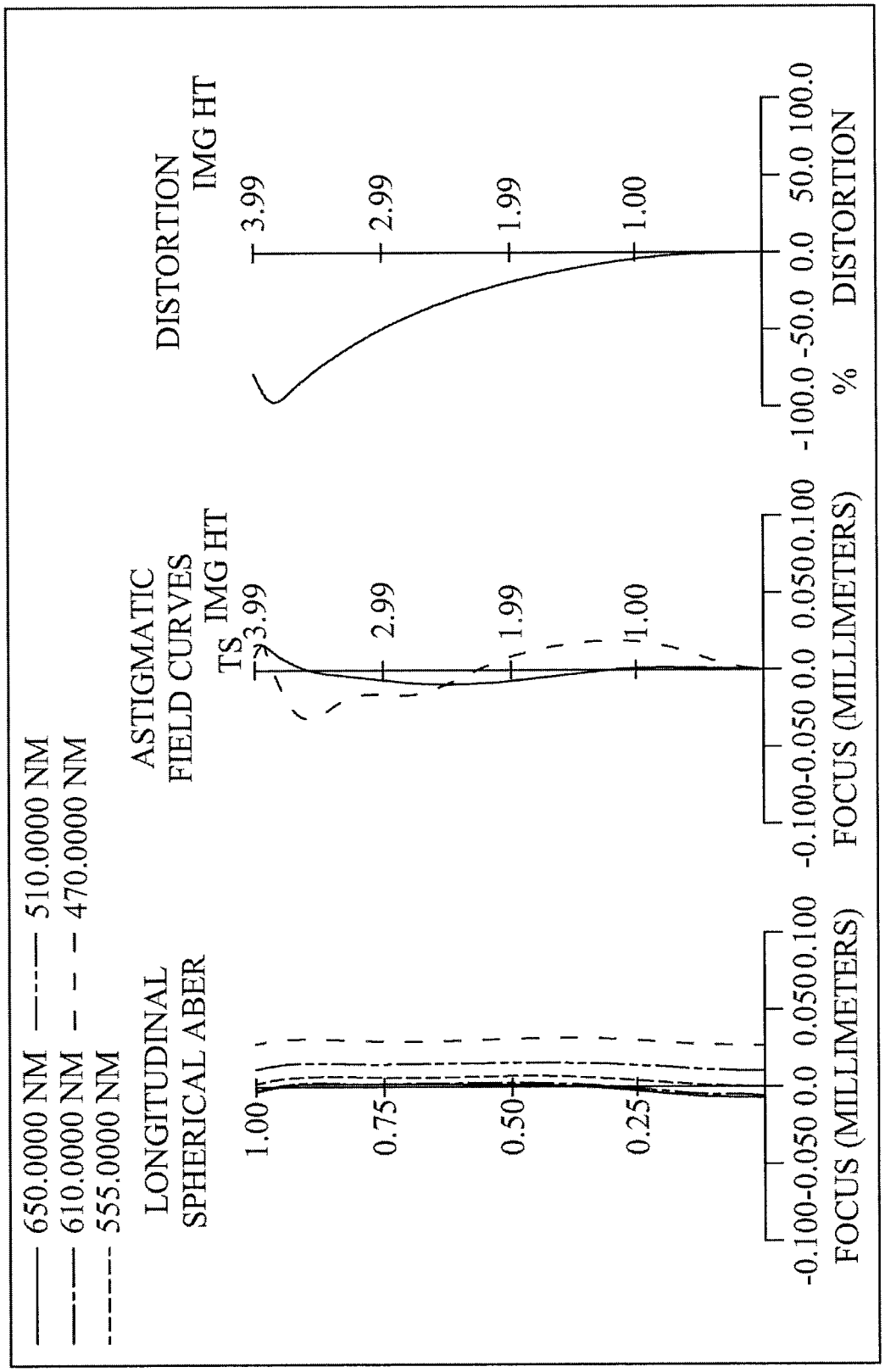
FIG. 3B shows the longitudinal spherical aberration curves, astigmatic field curves, and optical distortion curve of the optical image capturing system in the order from left to right according to the third embodiment of the present invention.
Figure 3C:
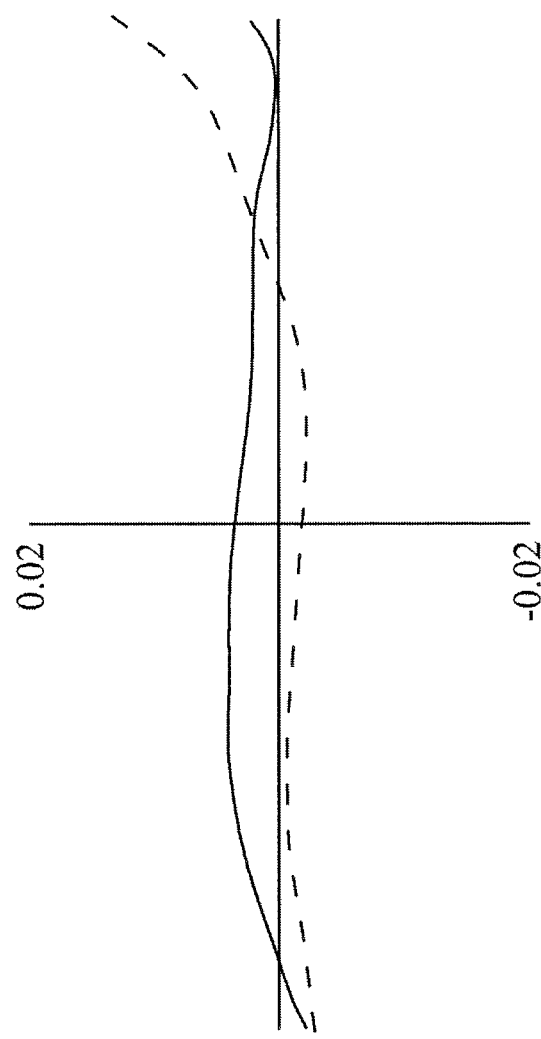
FIG. 3C shows the sagittal fan and the tangential fan of the optical image capturing system and the lateral aberration diagram of the longest operation wavelength and the shortest operation wavelength passing thorough the margin of the aperture at 0.7 field of view according to the third embodiment of the present invention.
Figure 3D:
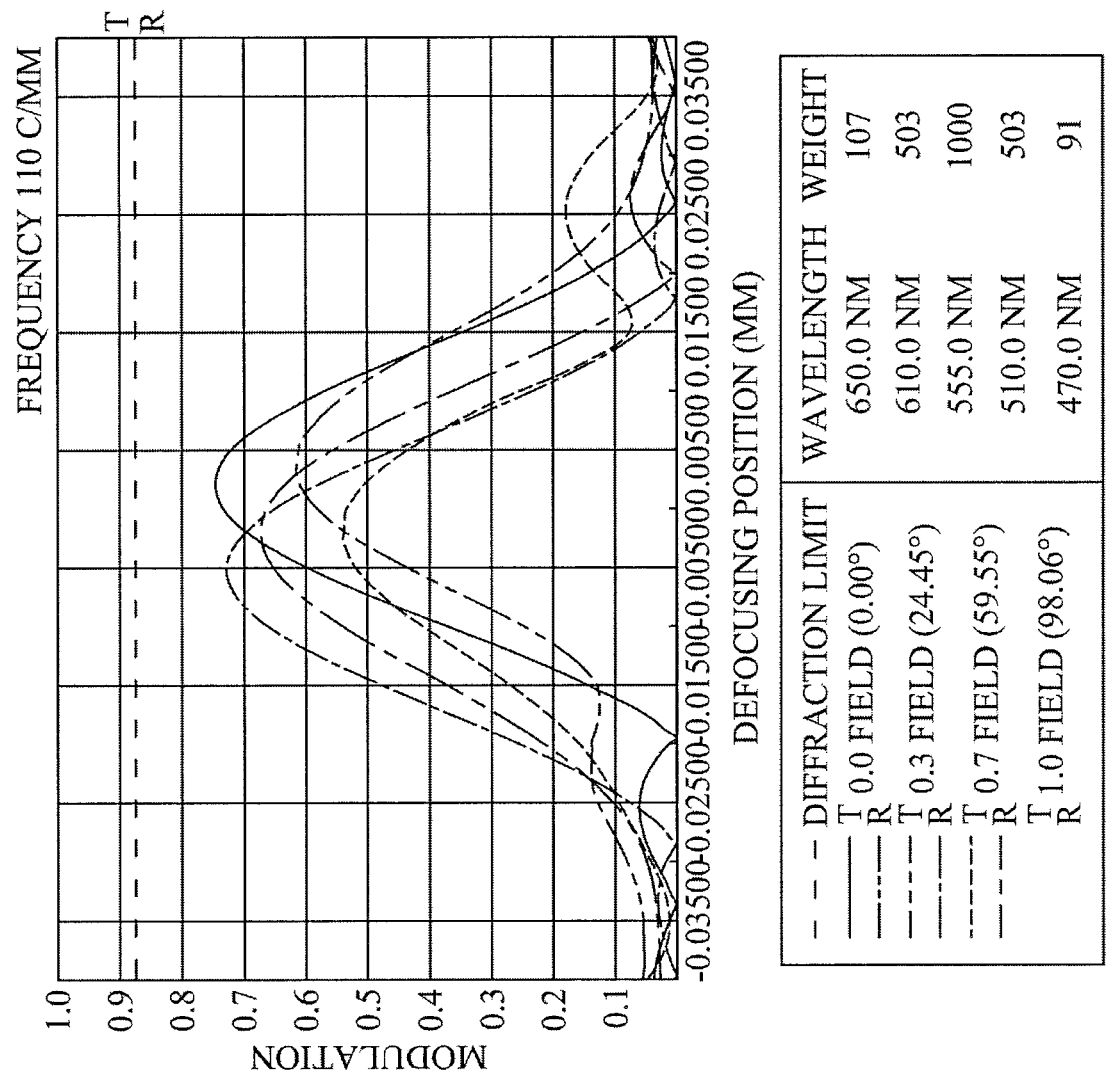
FIG. 3D is a diagram showing the through focus MTF values of the visible light spectrum at the central field of view, 0.3 field of view, and 0.7 field of view of the third embodiment of the present invention.
Figure 3E:
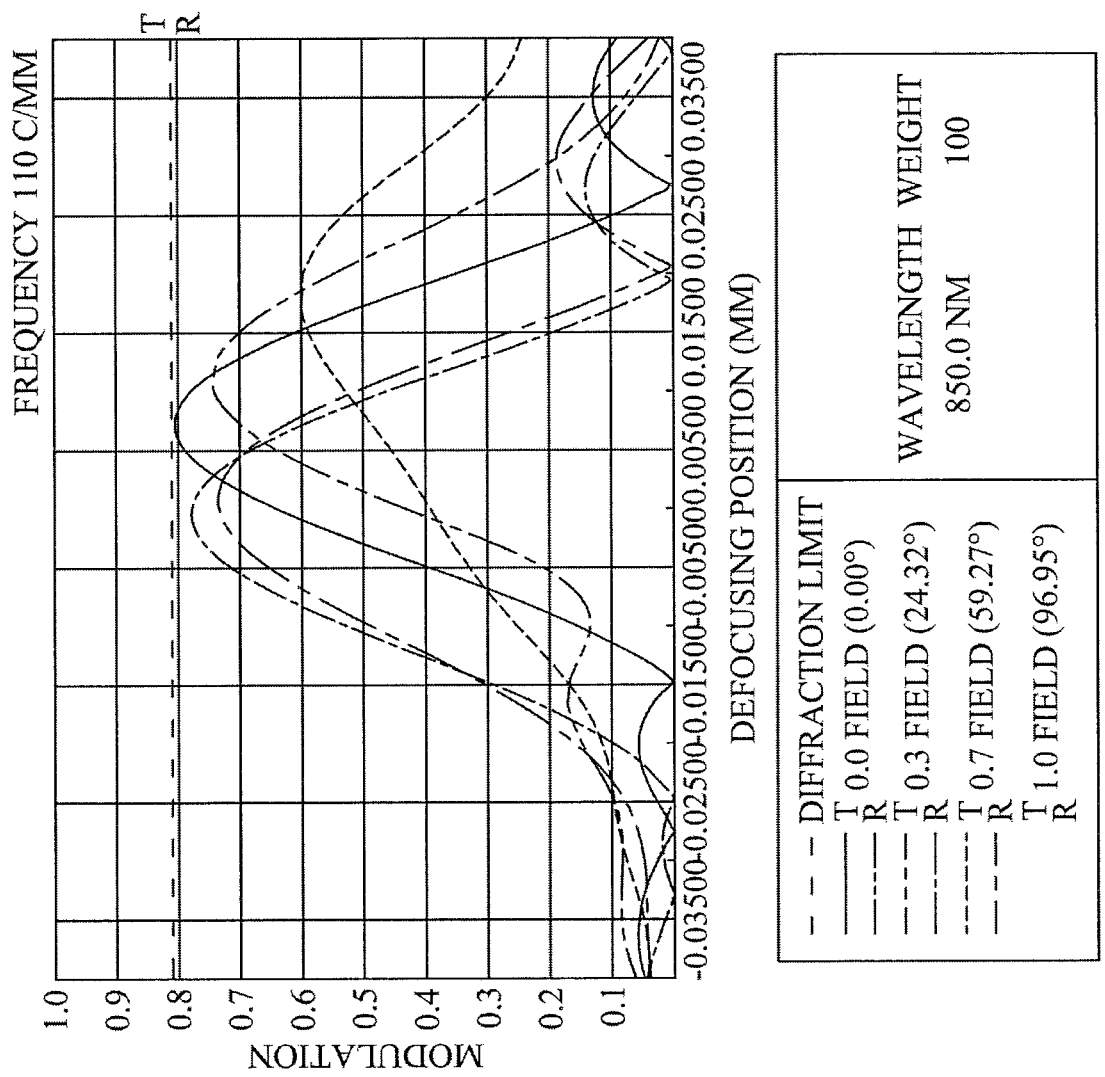
FIG. 3E is a diagram showing the through focus MTF values of the infrared light spectrum at the central field of view, 0.3 field of view, and 0.7 field of view of the third embodiment of the present invention.

Please refer to FIGS. 3A to 3E. FIG. 3A is a schematic view of the optical image capturing system according to the third embodiment of the present invention. FIG. 3B shows the longitudinal spherical aberration curves, astigmatic field curves, and optical distortion curve of the optical image capturing system, in the order from left to right, according to the third embodiment of the present invention. FIG. 3C shows the lateral aberration diagram of the the optical image capturing system at 0.7 field of view according to the third embodiment of the present invention. FIG. 3D is a diagram showing the through focus MTF values of the visible light spectrum at the central field of view, 0.3 field of view, and 0.7 field of view of the third embodiment of the present invention. FIG. 3E is a diagram showing the through focus MTF values of the infrared light spectrum at the central field of view, 0.3 field of view, and 0.7 field of view of the third embodiment of the present invention.

As shown in FIG. 3A, in the order from the object side to the image side, the optical image capturing system 30 includes a first lens 310, a second lens 320, a third lens 330, an aperture 300, a fourth lens 340, a fifth lens 350, a sixth lens 360, an IR-bandstop filter 380, a first image plane 390, a second image plane 391 and an image sensing device 392.

The first lens 310 has negative refractive power and is made of glass material. The object side 312 of the first lens 310 is a convex surface and the image side 314 of the first lens 310 is a concave surface, and both of the object side 312 and the image side 314 are spherical.

The second lens 320 has negative refractive power and is made of glass material. The object side 322 of the second lens 320 is a concave surface and the image side 324 of the second lens 320 is a convex surface, and both of the object side 322 and the image side 324 are spherical.

The third lens 330 has positive refractive power and is made of plastic material. The object side 332 of the third lens 330 is a convex surface and the image side 334 of the third lens 330 is a convex surface, and both of the object side 332 and the image side 334 are aspheric. The image side 334 thereof has one inflection point.

The fourth lens 340 has negative refractive power and is made of plastic material. The object side 342 of the fourth lens 340 is a concave surface and the image side 344 of the fourth lens 340 is a concave surface, and both of the object side 342 and the image side 344 are aspheric. The image side 344 thereof has one inflection point.

The fifth lens 350 has positive refractive power and is made of plastic material. The object side 352 of the fifth lens 350 is a convex surface and the image side 354 of the fifth lens 350 is a convex surface, and both of the object side 352 and an image side 354 are aspheric.

The sixth lens element 360 has positive refractive power and is made of plastic material. The object side 362 of the sixth lens 360 is a convex surface and the image side 364 of the sixth lens 360 is a concave surface, and both of the object side 362 and the image side 364 are aspheric. The image side 364 and the image side 364 thereof each has one inflection point. Hereby, this configuration is beneficial to shorten the back focal distance of the optical image capturing system so as to keep its miniaturization. Besides, the incident angle of the off-axis rays can be reduced effectively, thereby further correcting the off-axis aberration.

The IR-bandstop filter 380 is made of glass material and is disposed between the sixth lens 360 and the first image plane 390, without affecting the focal length of the optical image capturing system.

Table 5 and Table 6 below should be incorporated into the reference of the present embodiment.

TABLE 5

Lens Parameters for the Third Embodiment
f(focal length) = 2.808 mm; f/HEP = 1.6; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens1 | 71.398124 | 7.214 | Glass | 1.702 | 41.15 | −11.765 |
| 2 | | 7.117272355 | 5.788 | | | | |
| 3 | Lens 2 | −13.29213699 | 10.000 | Glass | 2.003 | 19.32 | −4537.460 |
| 4 | | −18.37509887 | 7.005 | | | | |
| 5 | Lens 3 | 5.039114804 | 1.398 | Plastic | 1.514 | 56.80 | 7.553 |
| 6 | | −15.53136631 | −0.140 | | | | |
| 1 | Aperture | 1E+18 | 2.378 | | | | |
| 8 | Lens 4 | −18.68613609 | 0.577 | Plastic | 1.661 | 20.40 | −4.978 |
| 9 | | 4.086545927 | 0.141 | | | | |
| 10 | Lens 5 | 4.927609282 | 2.974 | Plastic | 1.565 | 58.00 | 4.709 |
| 11 | | −4.551946605 | 1.389 | | | | |
| 12 | Lens 6 | 9.184876531 | 1.916 | Plastic | 1.514 | 56.80 | −23.405 |
| 13 | | 4.845500046 | 0.800 | | | | |
| 14 | IR-bandstop Filter | 1E+18 | 0.500 | BK_7 | 1.517 | 64.13 | |
| 15 | | 1E+18 | 0.371 | | | | |
| 16 | Image Plane | 1E+18 | 0.005 | | | | |

Reference Wavelength = 555 nm; the third embodiment doesn't have any shield position.

TABLE 6

The Aspheric Coefficients of the Third Embodiment
Table 6: Aspheric Coefficients

| | Surface No | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | 1.318519E−01 | 3.120384E+00 | −1.494442E+01 |
| A4 | 0.000000E+00 | 0.000000E+00 | 0.000000E+00 | 0.000000E+00 | 6.405246E−05 | 2.103942E−03 | −1.598286E−03 |
| A6 | 0.000000E+00 | 0.000000E+00 | 0.000000E+00 | 0.000000E+00 | 2.278341E−05 | −1.050629E−04 | −9.177115E−04 |
| A8 | 0.000000E+00 | 0.000000E+00 | 0.000000E+00 | 0.000000E+00 | −3.672908E−06 | 6.168906E−06 | 1.011405E−04 |
| A10 | 0.000000E+00 | 0.000000E+00 | 0.000000E+00 | 0.000000E+00 | 3.748457E−07 | −1.224682E−07 | −4.919835E−06 |

| | Surface No | | | | |
|---|---|---|---|---|---|
| | 9 | 10 | 11 | 12 | 13 |
| k | 2.744228E−02 | −7.864013E+00 | −2.263702E+00 | −4.206923E+01 | −7.030803E+00 |
| A4 | −7.291825E−03 | 1.405243E−04 | −3.919567E−03 | −1.679499E−03 | −2.640099E−03 |
| A6 | 9.730714E−05 | 1.837602E−04 | 2.683449E−04 | −3.518520E−04 | −4.507651E−05 |
| A8 | 1.101816E−06 | −2.173368E−05 | −1.229452E−05 | 5.047353E−05 | −2.600391E−05 |
| A10 | −6.849076E−07 | 7.328496E−07 | 4.222621E−07 | −3.851055E−06 | 1.161811E−06 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

Third Embodiment (Primary Reference Wavelength = 555 nm)

| |f/f1| | |f/f2| | |f/f3| | |f/f4| | |f/f5| | |f/f6| |
|---|---|---|---|---|---|
| 0.23865 | 0.00062 | 0.37172 | 0.56396 | 0.59621 | 0.11996 |

| Σ PPR | Σ NPR | Σ PPR/|Σ NPR| | IN12/f | IN56/f | TP4/(IN34 + TP4 + IN45) |
|---|---|---|---|---|---|
| 1.77054 | 0.12058 | 14.68400 | 2.06169 | 0.49464 | 0.19512 |

| |f1/f2| | |f2/f3| | (TP1 + IN12)/TP2 | | (TP6 + IN56)/TP5 | |
|---|---|---|---|---|---|
| 0.00259 | 600.74778 | 1.30023 | | 1.11131 | |

| HOS | InTL | HOS/HOI | InS/HOS | ODT % | TDT % |
|---|---|---|---|---|---|
| 42.31580 | 40.63970 | 10.57895 | 0.26115 | −122.32700 | 93.33510 |

| HVT51 | HVT52 | HVT61 | HVT62 | HVT62/HOI | HVT62/HOS |
|---|---|---|---|---|---|
| 0 | 0 | 2.22299 | 2.60561 | 0.65140 | 0.06158 |

-continued

Third Embodiment (Primary Reference Wavelength = 555 nm)

| TP2/TP3 | TP3/TP4 | InRS61 | InRS62 | |InRS61|/TP6 | |InRS62|/TP6 |
|---|---|---|---|---|---|
| 7.15374 | 2.42321 | −0.20807 | −0.24978 | 0.10861 | 0.13038 |

| PSTA | PLTA | NSTA | NLTA | SSTA | SLTA |
|---|---|---|---|---|---|
| 0.014 mm | 0.002 mm | −0.003 mm | −0.002 mm | 0.011 mm | −0.001 mm |

| VSFS0 | VSFS3 | VSFS7 | VTFS0 | VTFS3 | VTFS7 |
|---|---|---|---|---|---|
| −0.000 | −0.005 | −0.000 | −0.000 | 0.005 | −0.000 |

| VSMTF0 | VSMTF3 | VSMTF7 | VTMTF0 | VTMTF3 | VTMTF7 |
|---|---|---|---|---|---|
| 0.733 | 0.728 | 0.663 | 0.733 | 0.613 | 0.534 |

| ISFS0 | ISFS3 | ISFS7 | ITFS0 | ITFS3 | ITFS7 |
|---|---|---|---|---|---|
| 0.005 | −0.000 | −0.000 | 0.005 | 0.010 | 0.020 |

| ISMTF0 | ISMTF3 | ISMTF7 | ITMTF0 | ITMTF3 | ITMTF7 |
|---|---|---|---|---|---|
| 0.788 | 0.777 | 0.734 | 0.788 | 0.740 | 0.597 |

| FS | | AIFS | | AVFS | AFS |
|---|---|---|---|---|---|
| 0.005 | | 0.007 | | −0.000 | 0.007 |

The following values about the length of the outline curve can be obtained from the data in Table 5 and Table 6.

Third Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |

-continued

Third Embodiment (Primary Reference Wavelength = 555 nm)

| 62 | 0.877 | 0.881 | 0.00368 | 100.42% | 1.916 | 45.99% |
|---|---|---|---|---|---|---|

| ARS | EHD | ARS value | ARS − EHD | (ARS/EHD) % | TP | ARS/TP (%) |
|---|---|---|---|---|---|---|
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The following values for the conditional expressions can be obtained from the data in Table 5 and Table 6.

Values Related to Inflection Point of Third Embodiment
(Primary Reference Wavelength = 555 nm)

| HIF321 | 2.0367 | HIF321/HOI | 0.5092 | SGI321 | −0.1056 | \|SGI321\|/(\|SGI321\| + TP3) | 0.0702 |
| HIF421 | 2.4635 | HIF421/HOI | 0.6159 | SGI421 | 0.5780 | \|SGI421\|/(\|SGI421\| + TP4) | 0.5005 |
| HIF611 | 1.2364 | HIF611/HOI | 0.3091 | SGI611 | 0.0668 | \|SGI611\|/(\|SGI611\| + TP6) | 0.0337 |
| HIF621 | 1.5488 | HIF621/HOI | 0.3872 | SGI621 | 0.2014 | \|SGI621\|/(\|SGI621\| + TP6) | 0.0951 |

Fourth Embodiment

Figure 4A:
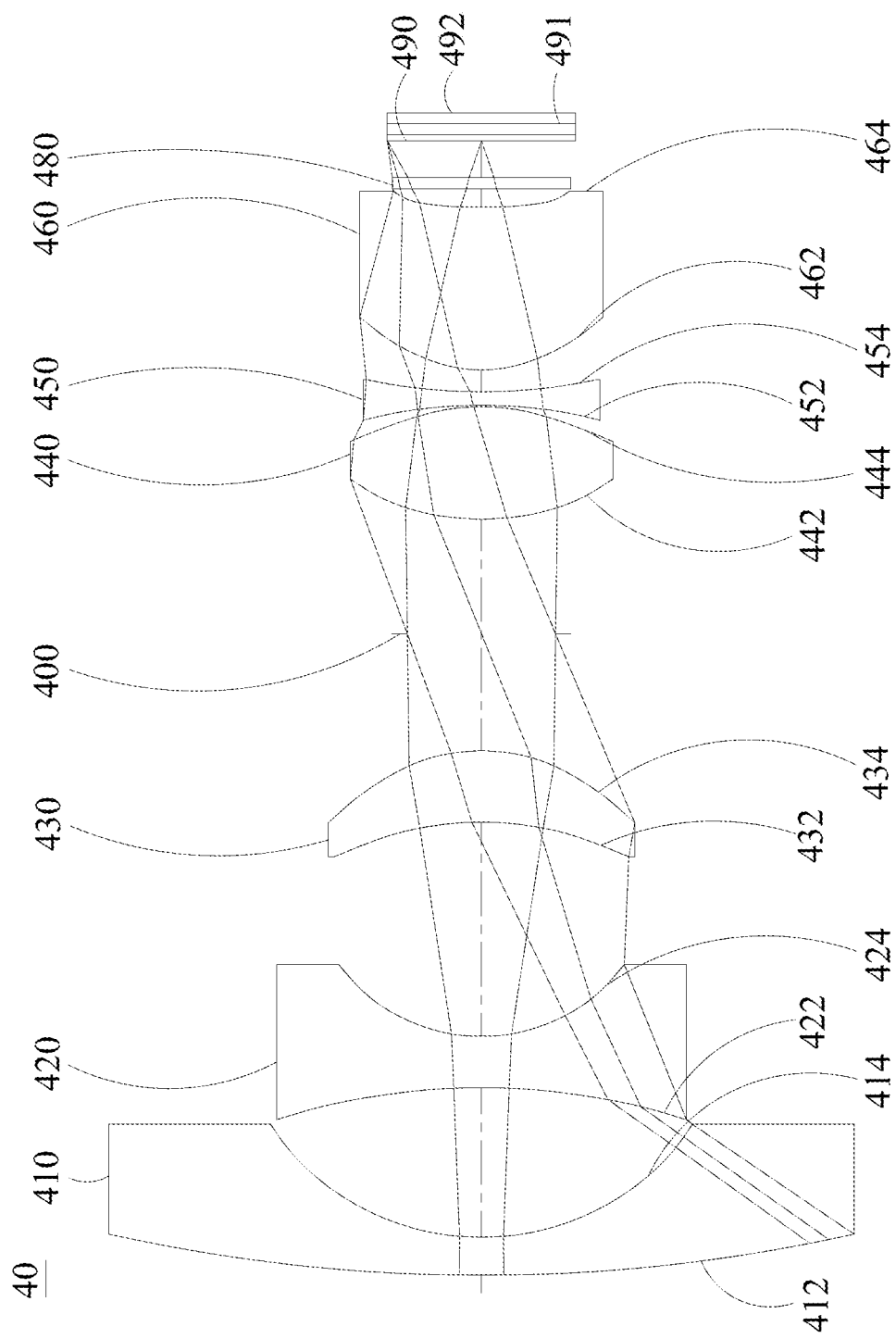
FIG. 4A is a schematic view of the optical image capturing system according to the fourth embodiment of the present invention.
Figure 4B:
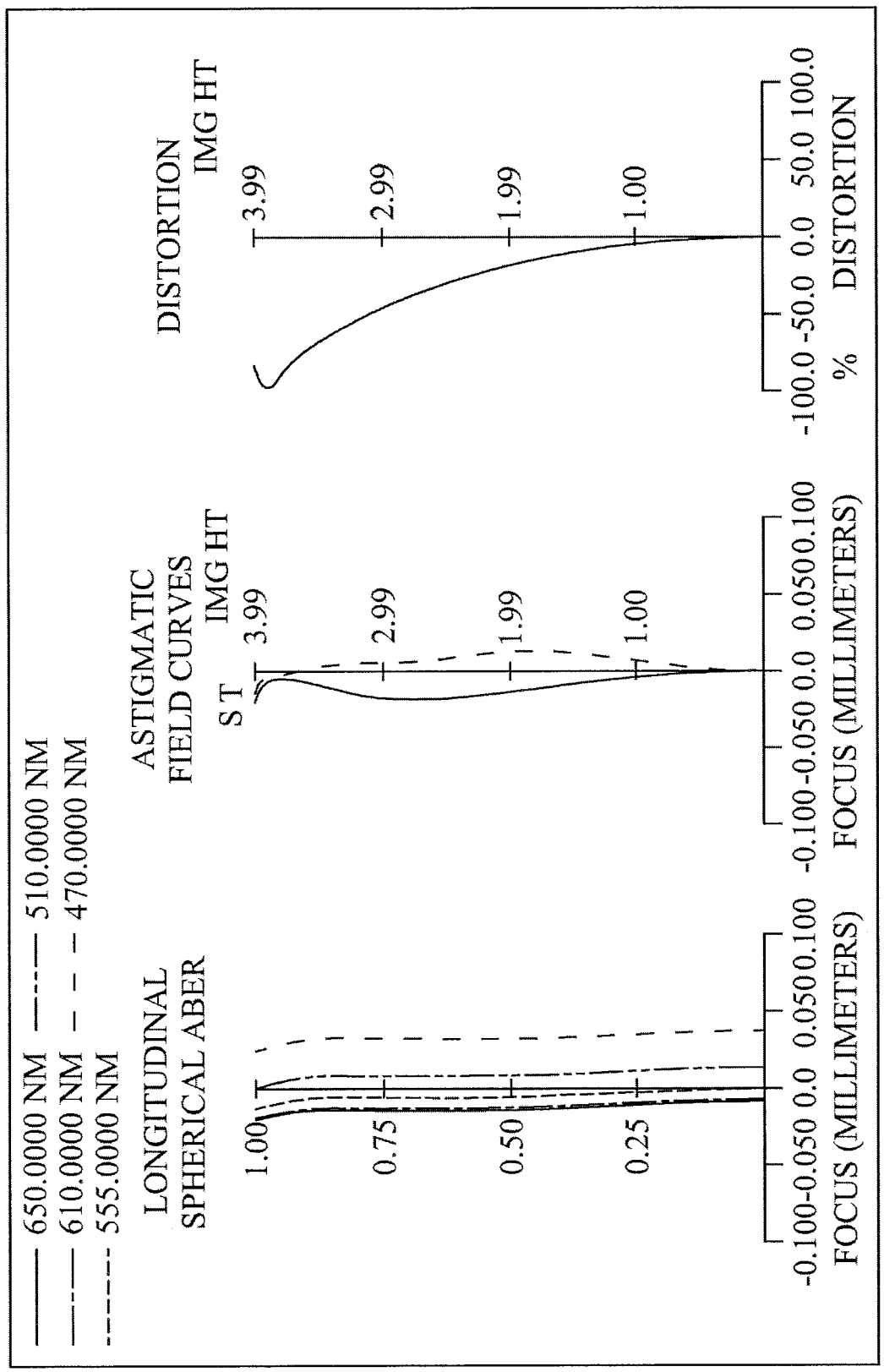
FIG. 4B shows the longitudinal spherical aberration curves, astigmatic field curves, and optical distortion curve of the optical image capturing system in the order from left to right according to the fourth embodiment of the present invention.
Figure 4C:
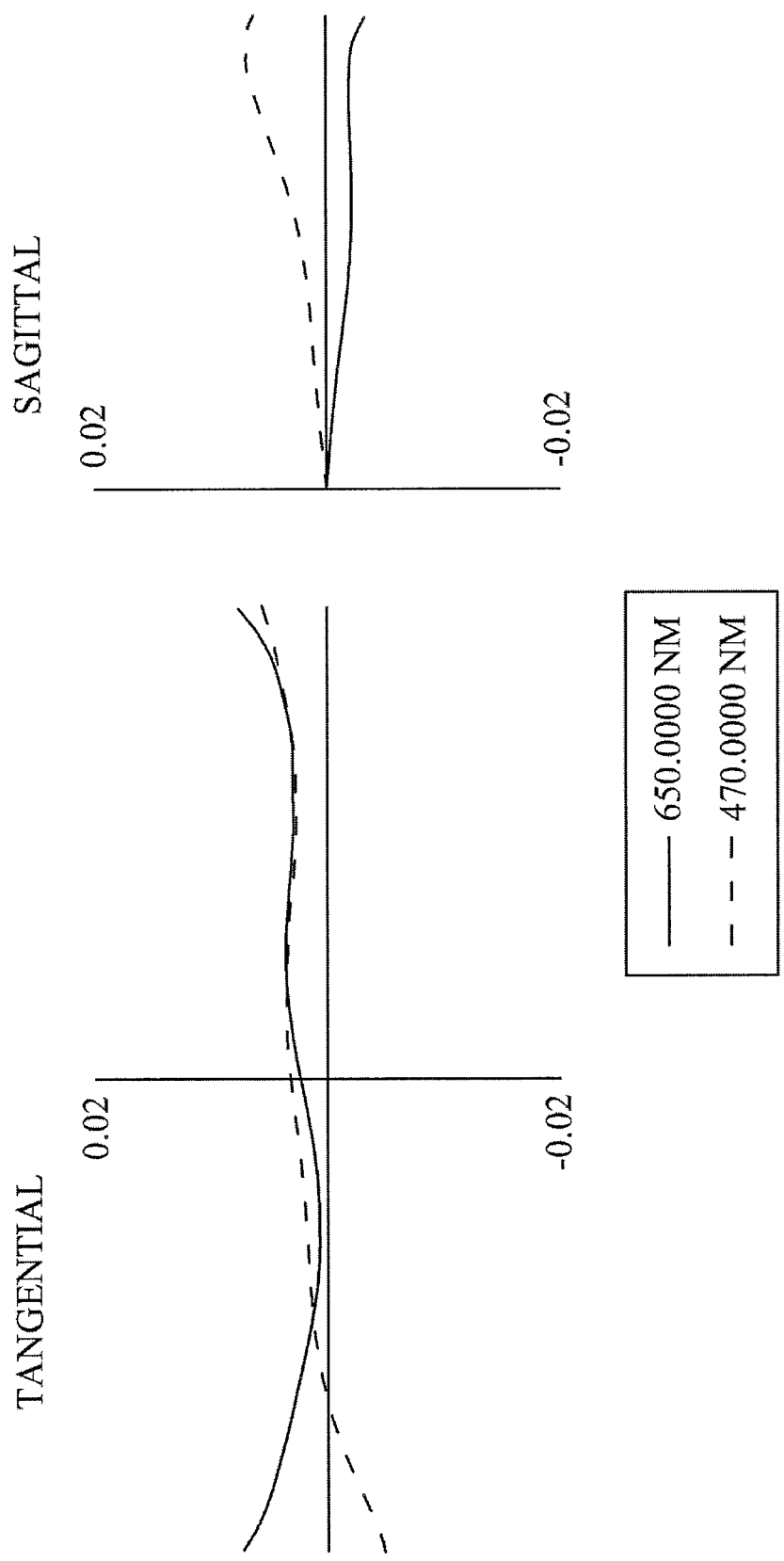
FIG. 4C shows the sagittal fan and the tangential fan of the optical image capturing system and the lateral aberration diagram of the longest operation wavelength and the shortest operation wavelength passing thorough the margin of the aperture at 0.7 field of view according to the fourth embodiment of the present invention.
Figure 4D:
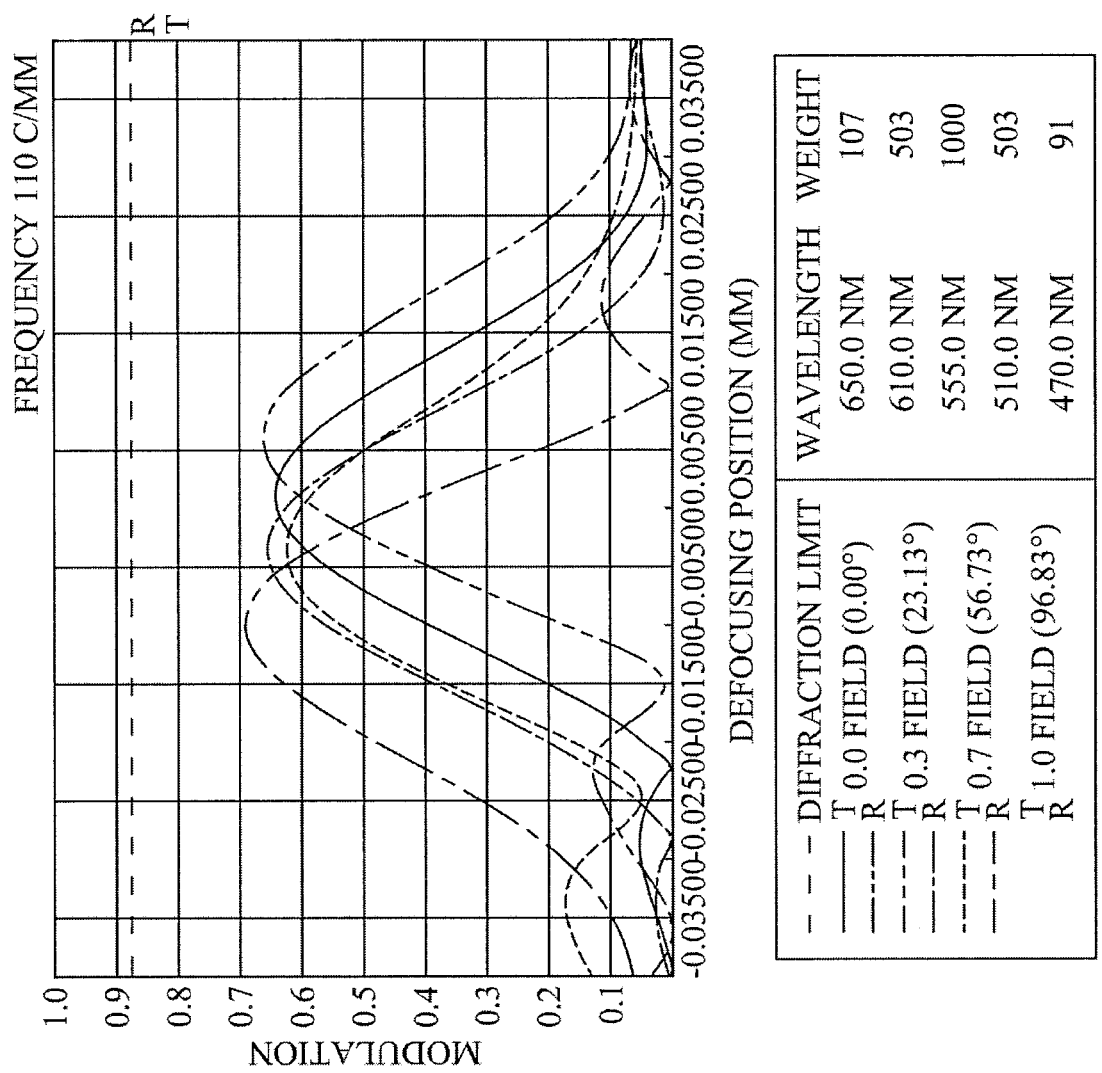
FIG. 4D is a diagram showing the through focus MTF values of the visible light spectrum at the central field of view, 0.3 field of view, and 0.7 field of view of the fourth embodiment of the present invention.
Figure 4E:
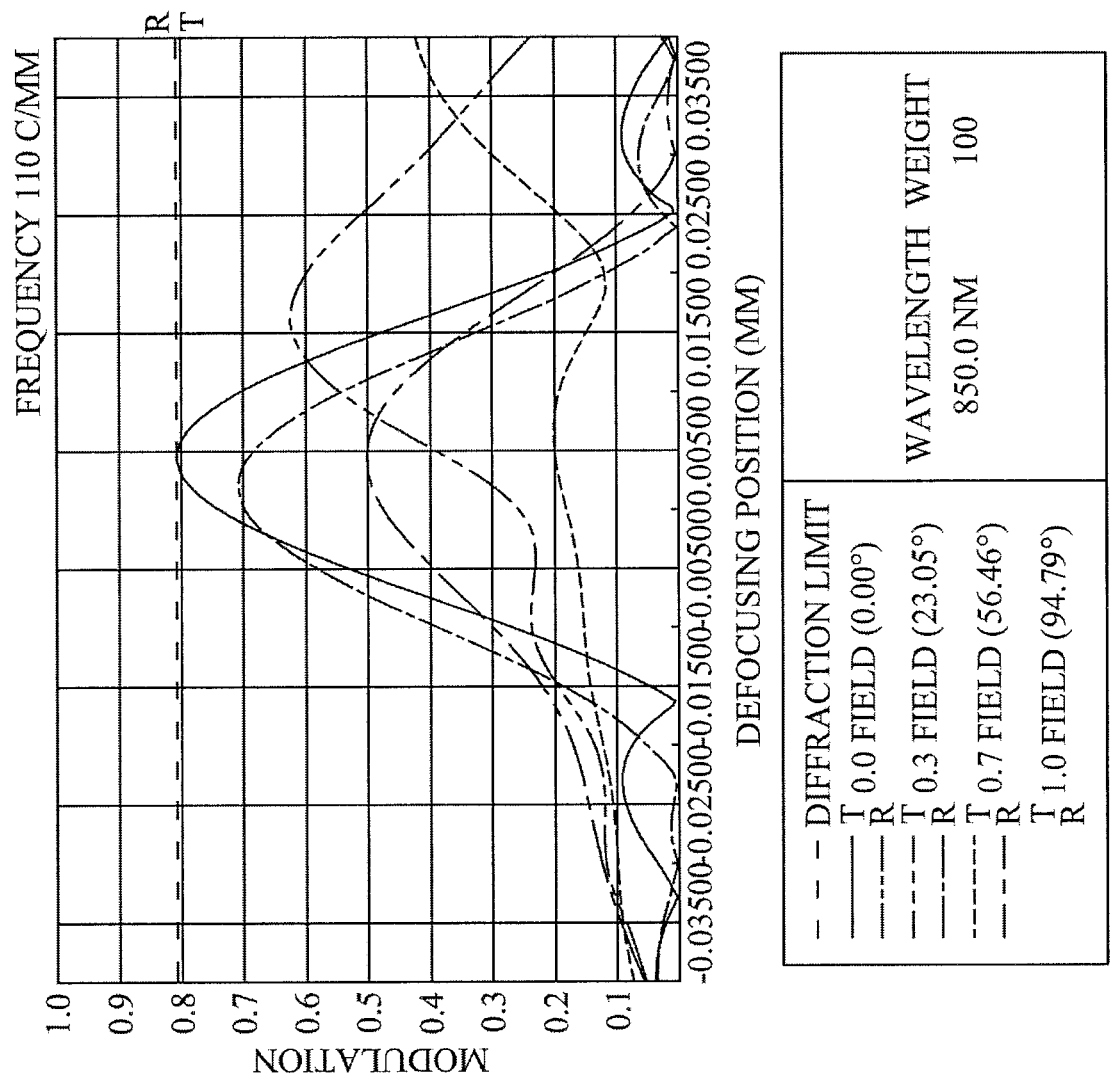
FIG. 4E is a diagram showing the through focus MTF values of the infrared light spectrum at the central field of view, 0.3 field of view, and 0.7 field of view of the fourth embodiment of the present invention.

Please refer to FIGS. 4A to 4E. FIG. 4A is a schematic view of the optical image capturing system according to the fourth embodiment of the present invention. FIG. 4B shows the longitudinal spherical aberration curves, astigmatic field curves, and optical distortion curve of the optical image capturing system, in the order from left to right, according to the fourth embodiment of the present invention. FIG. 4C shows the lateral aberration diagram of the the optical image capturing system at 0.7 field of view according to the fourth embodiment of the present invention. FIG. 4D is a diagram showing the through focus MTF values of the visible light spectrum at the central field of view, 0.3 field of view, and 0.7 field of view of the fourth embodiment of the present invention. FIG. 4E is a diagram showing the through focus MTF values of the infrared light spectrum at the central field of view, 0.3 field of view, and 0.7 field of view of the fourth embodiment of the present invention.

As shown in FIG. 4A, in the order from the object side to the image side, the optical image capturing system 40 includes a first lens 410, a second lens 420, a third lens 430, an aperture 400, a fourth lens 440, a fifth lens 450, a sixth lens 460, an IR-bandstop filter 480, a first image plane 490, a second image plane 491 and an image sensing device 492.

The first lens 410 has negative refractive power and is made of glass material. The object side 412 of the first lens 410 is a convex surface and the image side 414 of the first lens 410 is a concave surface, and both of the object side 412 and the image side 414 are spherical.

The second lens 420 has negative refractive power and is made of glass material. The object side 422 of the second lens 420 is a concave surface and the image side 424 of the second lens 420 is a concave surface, and both of the object side 422 and an image-side 424 are spherical.

The third lens 430 has positive refractive power and is made of plastic material. The object side 432 of the third lens 430 is a concave surface and the image side 434 of the third lens 430 is a convex surface, and both of the object-side 432 and the image-side 434 are aspheric. The object-side 432 thereof has one inflection point.

The fourth lens 440 has positive refractive power and is made of plastic material. The object side 442 of the fourth lens 440 is a convex surface and the image side 444 of the fourth lens 440 is a convex surface, and both of the object side 442 and an image-side 444 are aspheric. The image-side 444 thereof has one inflection point.

The fifth lens 450 has negative refractive power and is made of glass material. The object side 452 of the fifth lens 450 is a concave surface and the image side 454 of the fifth lens 450 is a concave surface, and both of the object side 452 and the image side 454 are spherical.

The sixth lens 460 has positive refractive power and is made of plastic material. The object side 462 of the sixth lens 460 is a convex surface and the image side 464 of the sixth lens 460 is a concave surface, and both of the object side 462 and an image side 464 are aspheric. Hereby, this configuration is beneficial to shorten the back focal distance of the optical image capturing system so as to keep its miniaturization. Besides, the incident angle of the off-axis rays can be reduced effectively, thereby further correcting the off-axis aberration.

The IR-bandstop filter 480 is made of glass material and is disposed between the sixth lens 460 and the first image plane 490. The IR-bandstop filter 480 does not affect the focal length of the optical image capturing system.

Table 7 and Table 8 below should be incorporated into the reference of the present embodiment.

TABLE 7

Lens Parameters for the Fourth Embodiment
f(focal length) = 2.986 mm; f/HEP = 1.6; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 69.96675718 | 1.665 | Glass | 1.497 | 81.61 | −25.061 |
| 2 | | 10.5093881 | 6.575 | | | | |
| 3 | Lens 2 | −27.70099483 | 2.291 | Glass | 1.497 | 81.61 | −11.464 |
| 4 | | 7.390674271 | 9.411 | | | | |
| 5 | Lens 3 | 13.94084306 | 3.157 | Plastic | 1.565 | 54.50 | 21.035 |
| 6 | | 6.953616863 | 5.135 | | | | |
| 7 | Aperture | 1E+18 | 5.061 | | | | |
| 8 | Lens 4 | 10.98857864 | 4.962 | Plastic | 1.565 | 58.00 | 9.174 |
| 9 | | 8.258575727 | 0.050 | | | | |
| 10 | Lens 5 | 19.78096855 | 0.600 | Glass | 2.003 | 19.32 | −10.300 |
| 11 | | 22.36794013 | 0.970 | | | | |
| 12 | Lens 6 | 5.71369207 | 7.162 | Plastic | 1.565 | 58.00 | 11.521 |
| 13 | | 24.99080813 | 0.800 | | | | |
| 14 | IR-bandstop Filter | 1E+18 | 0.500 | BK_7 | 1.517 | 64.13 | |
| 15 | | 1E+18 | 1.628 | | | | |
| 16 | Image Plane | 1E+18 | −0.007 | | | | |

Reference Wavelength = 555 nm

TABLE 8

The Aspheric Coefficients of the Fourth Embodiment
Table 8: Aspheric Coefficients

| | Surface No | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | 2.201053E+00 | −5.671165E−01 | 1.093057E+00 |
| A4 | 0.000000E+00 | 0.000000E+00 | 0.000000E+00 | 0.000000E+00 | −1.025087E−04 | 6.462574E−05 | 3.305221E−04 |
| A6 | 0.000000E+00 | 0.000000E+00 | 0.000000E+00 | 0.000000E+00 | 5.543081E−06 | 1.063283E−06 | −1.167939E−05 |
| A8 | 0.000000E+00 | 0.000000E+00 | 0.000000E+00 | 0.000000E+00 | −5.329506E−08 | −3.184592E−08 | 2.263338E−07 |
| A10 | 0.000000E+00 | 0.000000E+00 | 0.000000E+00 | 0.000000E+00 | 2.043098E−09 | 7.122709E−10 | −2.541516E−09 |

| | Surface No | | | | |
|---|---|---|---|---|---|
| | 9 | 10 | 11 | 12 | 13 |
| k | −7.664800E−02 | 0.000000E+00 | 0.000000E+00 | −8.677931E−01 | 3.995253E+01 |
| A4 | 5.419894E−04 | 0.000000E+00 | 0.000000E+00 | −2.049715E−04 | 6.052648E−04 |
| A6 | 1.068100E−07 | 0.000000E+00 | 0.000000E+00 | 2.885104E−06 | 2.897162E−05 |
| A8 | 1.045972E−07 | 0.000000E+00 | 0.000000E+00 | 1.804421E−07 | 2.091877E−07 |
| A10 | −1.121303E−09 | 0.000000E+00 | 0.000000E+00 | −4.577777E−09 | 1.584700E−07 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.11916 | 0.26050 | 0.14197 | 0.32550 | 0.28994 | 0.25921 |

| Σ PPR | Σ NPR | Σ PPR/\|Σ NPR\| | IN12/f | IN56/f | TP4/(IN34 + TP4 + IN45) |
|---|---|---|---|---|---|
| 0.87657 | 0.51971 | 1.68665 | 2.20185 | 0.32472 | 0.32625 |

| Fourth Embodiment (Primary Reference Wavelength = 555 nm) | | | |
|---|---|---|---|
| \|f1/f2\| | \|f2/f3\| | (TP1 + IN12)/TP2 | (TP6 + IN56)/TP5 |
| 2.18612 | 0.54499 | 3.59739 | 13.55020 |

| HOS | InTL | HOS/HOI | InS/HOS | ODT % | TDT % |
|---|---|---|---|---|---|
| 49.96050 | 47.03900 | 12.49013 | 0.43487 | −115.99400 | 88.64900 |

| HVT51 | HVT52 | HVT61 | HVT62 | HVT62/HOI | HVT62/HOS |
|---|---|---|---|---|---|
| 0 | 0 | 0.00000 | 0.00000 | 0.00000 | 0.00000 |

| TP2/TP3 | TP3/TP4 | InRS61 | InRS62 | \|InRS61\|/TP6 | \|InRS62\|/TP6 |
|---|---|---|---|---|---|
| 0.72551 | 0.63633 | 2.31941 | 0.70857 | 0.32385 | 0.09894 |

-continued

| Fourth Embodiment (Primary Reference Wavelength = 555 nm) | | | | | |
|---|---|---|---|---|---|
| PSTA | PLTA | NSTA | NLTA | SSTA | SLTA |
| 0.006 mm | 0.008 mm | −0.005 mm | 0.008 mm | 0.007 mm | −0.004 mm |
| VSFS0 | VSFS3 | VSFS7 | VTFS0 | VTFS3 | VTFS7 |
| −0.000 | −0.005 | −0.010 | −0.000 | 0.005 | −0.005 |
| VSMTF0 | VSMTF3 | VSMTF7 | VTMTF0 | VTMTF3 | VTMTF7 |
| 0.640 | 0.650 | 0.691 | 0.640 | 0.659 | 0.621 |
| ISFS0 | ISFS3 | ISFS7 | ITFS0 | ITFS3 | ITFS7 |
| 0.005 | −0.000 | 0.005 | 0.005 | 0.015 | 0.035 |
| ISMTF0 | ISMTF3 | ISMTF7 | ITMTF0 | ITMTF3 | ITMTF7 |
| 0.807 | 0.698 | 0.501 | 0.807 | 0.621 | 0.379 |
| FS | | AIFS | | AVFS | AFS |
| 0.005 | | 0.011 | | −0.003 | 0.013 |

The following values about the length of the outline curve can be obtained from the data in Table 7 and Table 8.

| Fourth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.933 | 0.933 | −0.00018 | 99.98% | 1.665 | 56.05% |
| 12 | 0.933 | 0.934 | 0.00102 | 100.11% | 1.665 | 56.12% |
| 21 | 0.933 | 0.933 | −0.00004 | 100.00% | 2.291 | 40.74% |
| 22 | 0.933 | 0.935 | 0.00228 | 100.24% | 2.291 | 40.84% |
| 31 | 0.933 | 0.934 | 0.00049 | 100.05% | 3.157 | 29.57% |
| 32 | 0.933 | 0.936 | 0.00259 | 100.28% | 3.157 | 29.64% |
| 41 | 0.933 | 0.934 | 0.00093 | 100.10% | 4.962 | 18.83% |
| 42 | 0.933 | 0.935 | 0.00175 | 100.19% | 4.962 | 18.84% |
| 51 | 0.933 | 0.933 | 0.00013 | 100.01% | 0.600 | 155.53% |
| 52 | 0.933 | 0.933 | 0.00006 | 100.01% | 0.600 | 155.52% |
| 61 | 0.933 | 0.937 | 0.00391 | 100.42% | 7.162 | 13.08% |
| 62 | 0.933 | 0.933 | 0.00003 | 100.00% | 7.162 | 13.03% |
| ARS | EHD | ARS value | ARS − EHD | (ARS/EHD) % | TP | ARS/TP (%) |
| 11 | 15.934 | 16.075 | 0.141 | 100.88% | 1.665 | 965.60% |
| 12 | 8.959 | 10.725 | 1.766 | 119.72% | 1.665 | 644.24% |
| 21 | 8.778 | 8.932 | 0.154 | 101.75% | 2.291 | 389.94% |
| 22 | 6.095 | 7.165 | 1.070 | 117.55% | 2.291 | 312.79% |
| 31 | 6.262 | 6.501 | 0.239 | 103.81% | 3.157 | 205.91% |
| 32 | 6.505 | 7.459 | 0.954 | 114.66% | 3.157 | 236.25% |
| 41 | 5.652 | 6.062 | 0.410 | 107.25% | 4.962 | 122.18% |
| 42 | 5.506 | 5.755 | 0.249 | 104.52% | 4.962 | 115.98% |
| 51 | 5.095 | 5.153 | 0.058 | 101.14% | 0.600 | 858.68% |
| 52 | 4.969 | 5.010 | 0.041 | 100.82% | 0.600 | 834.80% |
| 61 | 5.204 | 5.859 | 0.655 | 112.59% | 7.162 | 81.81% |
| 62 | 3.759 | 3.914 | 0.155 | 104.12% | 7.162 | 54.65% |

The following values for the conditional expressions can be obtained from the data in Table 7 and Table 8.

| Values Related to Inflection Point of Fourth Embodiment (Primary Reference Wavelength = 555 nm) | | | | | | |
|---|---|---|---|---|---|---|
| HIF311 | 5.6188 | HIF311/HOI | 1.4047 | SGI311 | −1.2544 | \|SGI311\|/(\|SGI311\| + TP3) | 0.2843 |
| HIF421 | 5.1958 | HIF421/HOI | 1.2990 | SGI421 | −1.3829 | \|SGI421\|/(\|SGI421\| + TP4) | 0.2180 |

Fifth Embodiment

Figure 5A:
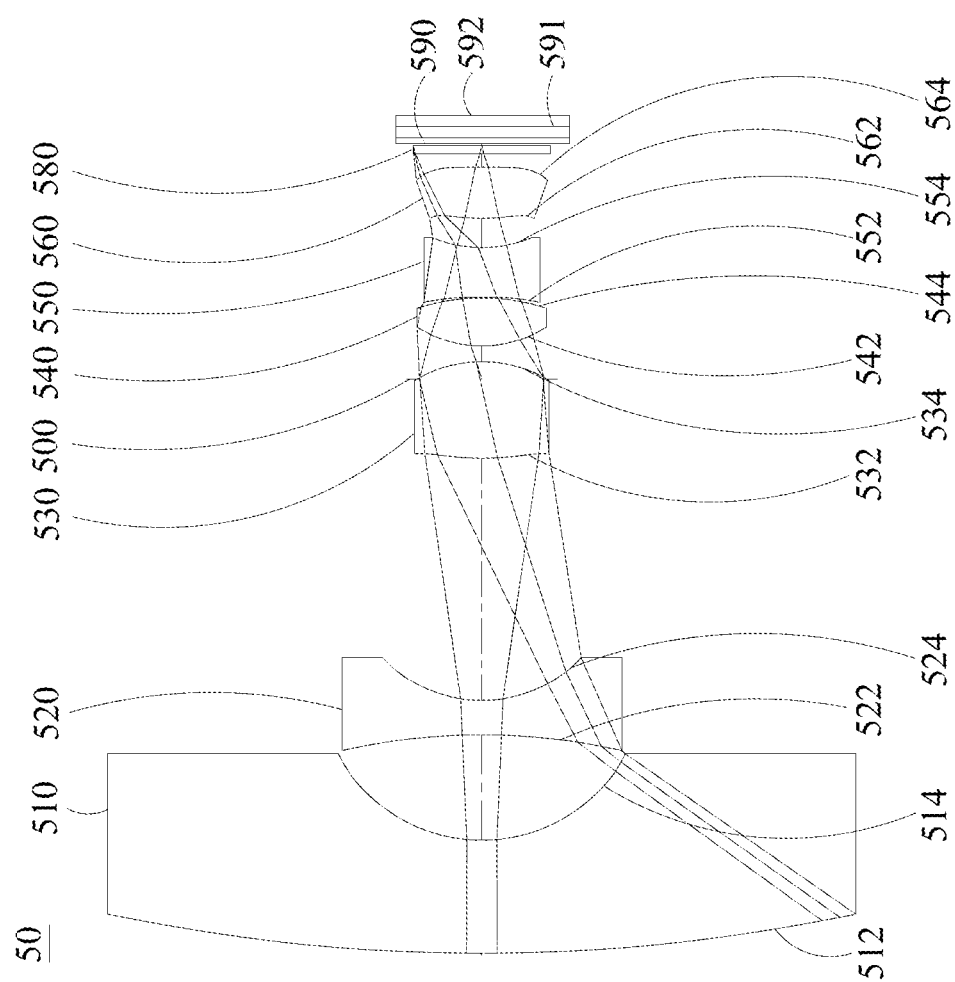
FIG. 5A is a schematic view of the optical image capturing system according to the fifth embodiment of the present invention.
Figure 5B:
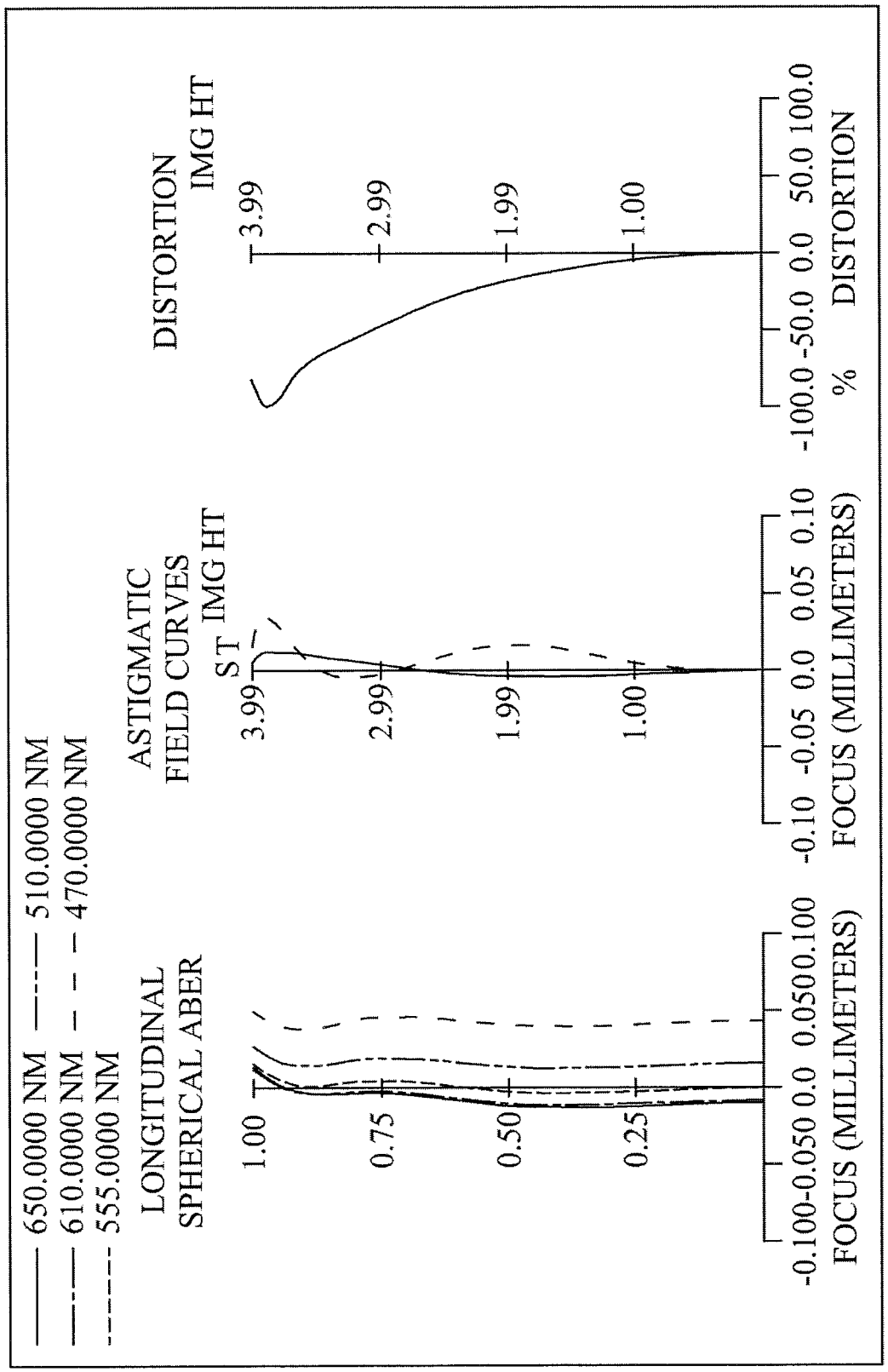
FIG. 5B shows the longitudinal spherical aberration curves, astigmatic field curves, and optical distortion curve of the optical image capturing system in the order from left to right according to the fifth embodiment of the present invention.
Figure 5C:
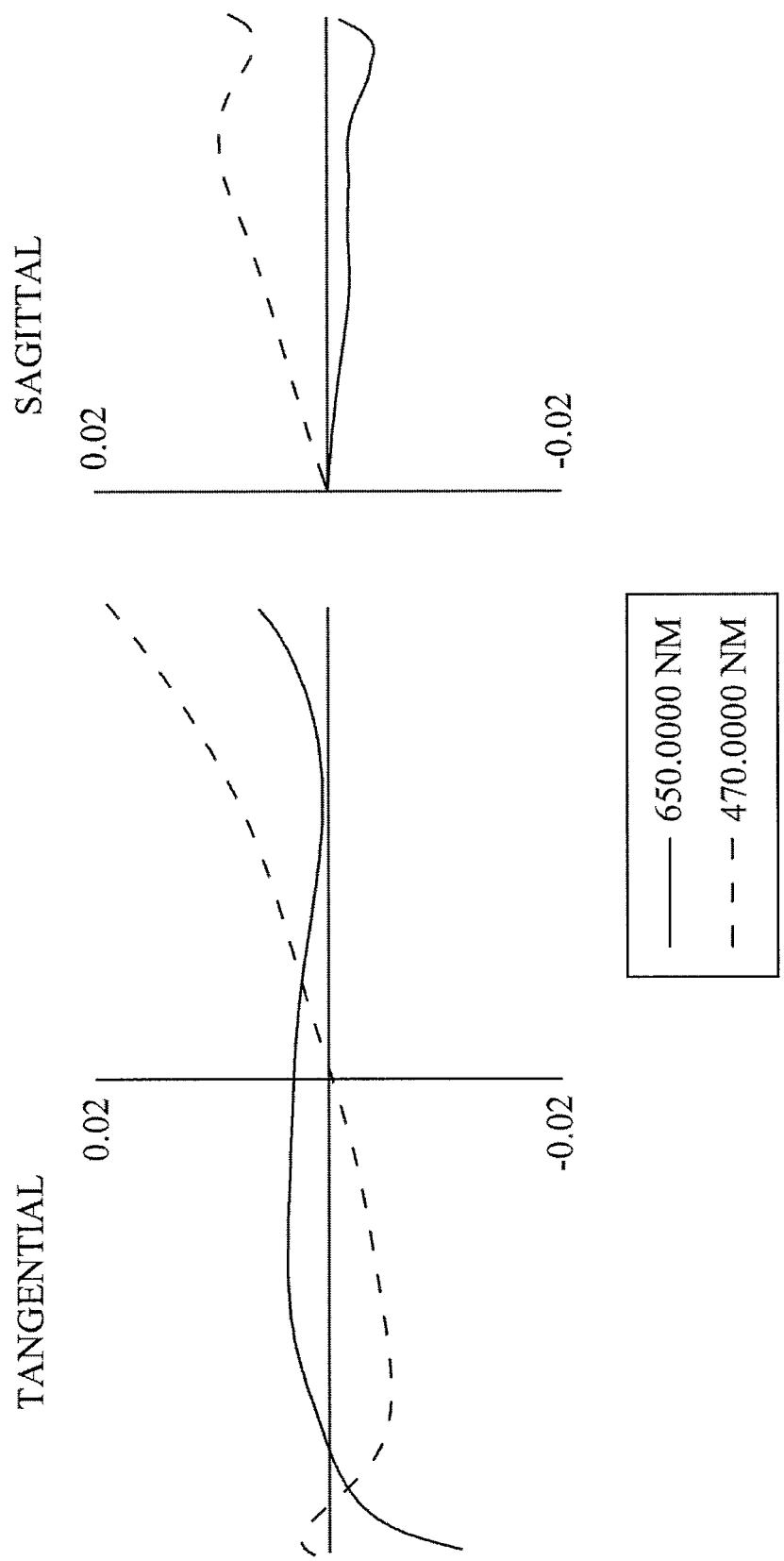
FIG. 5C shows the sagittal fan and the tangential fan of the optical image capturing system and the lateral aberration diagram of the longest operation wavelength and the shortest operation wavelength passing thorough the margin of the stop at 0.7 field of view according to the fifth embodiment of the present invention.
Figure 5D:
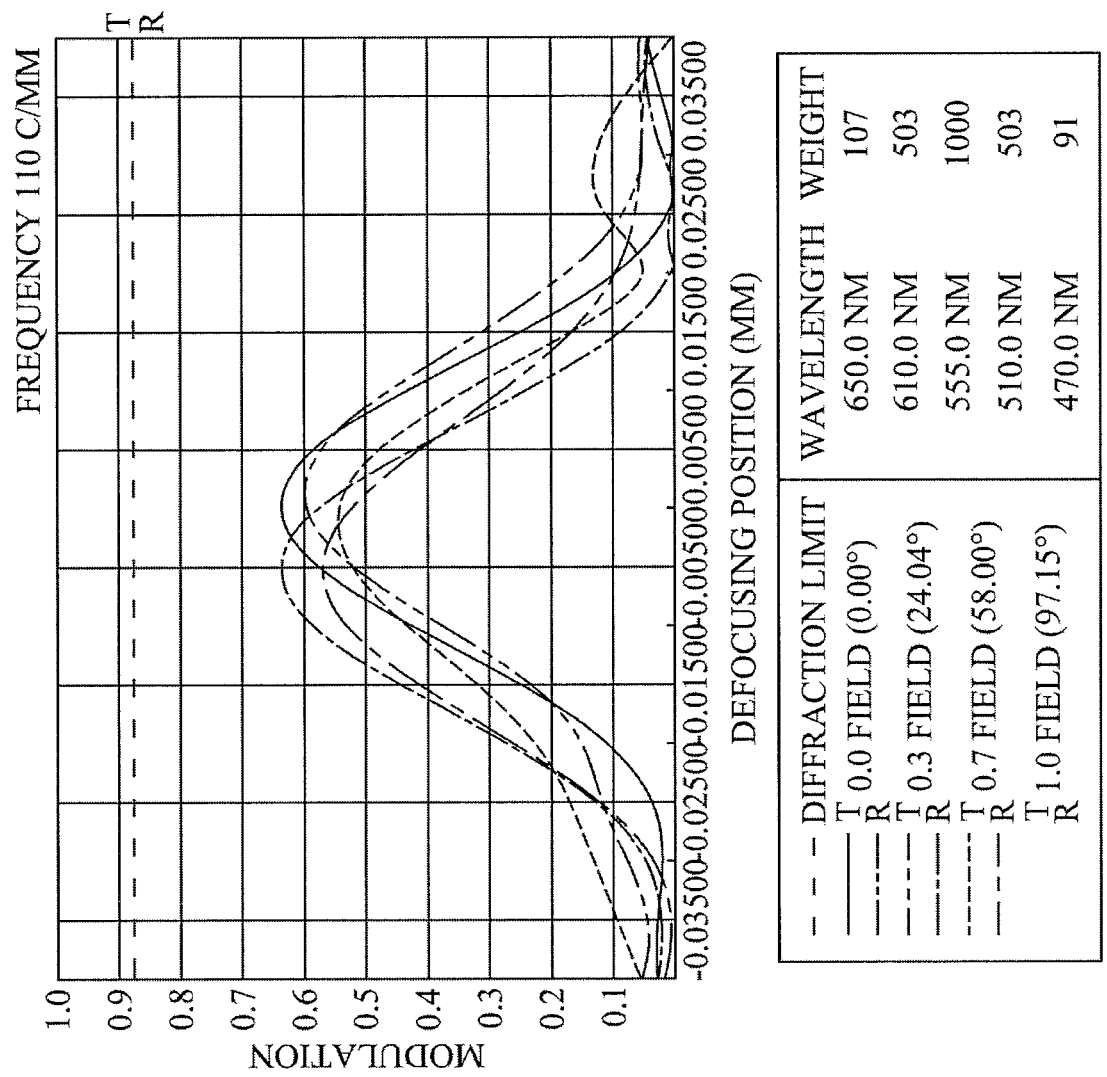
FIG. 5D is a diagram showing the through focus MTF values of the visible light spectrum at the central field of view, 0.3 field of view, and 0.7 field of view of the fifth embodiment of the present invention.
Figure 5E:
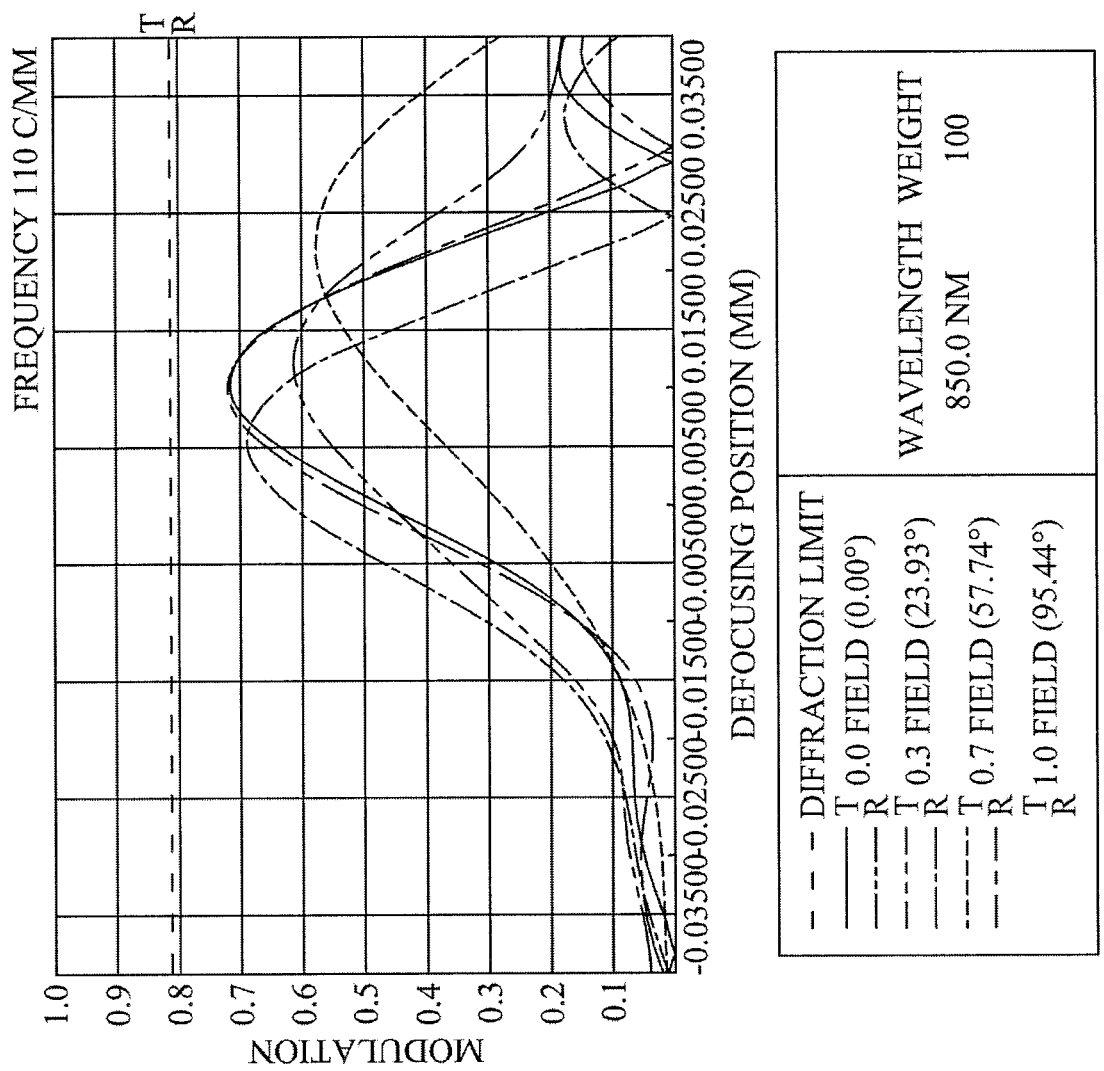
FIG. 5E is a diagram showing the through focus MTF values of the infrared light spectrum at the central field of view, 0.3 field of view, and 0.7 field of view of the fifth embodiment of the present disclosure.

Please refer to FIGS. 5A to 5E. FIG. 5A is a schematic view of the optical image capturing system according to the fifth embodiment of the present invention. FIG. 5B shows the longitudinal spherical aberration curves, astigmatic field curves, and optical distortion curve of the optical image capturing system, in the order from left to right, according to the fifth embodiment of the present invention. FIG. 5C shows the lateral aberration diagram of the the optical image capturing system at 0.7 field of view according to the fifth embodiment of the present invention. FIG. 5D is a diagram showing the through focus MTF values of the visible light spectrum at the central field of view, 0.3 field of view and 0.7 field of view of the fifth embodiment of the present invention. FIG. 5E is a diagram showing the through focus MTF values of the infrared light spectrum at the central field of view, 0.3 field of view, and 0.7 field of view of the fifth embodiment of the present invention.

As shown in FIG. 5A, in the order from an object side to an image side, the optical image capturing system 50 includes a first lens 510, a second lens 520, a third lens 530, an aperture 500, a fourth lens 540, a fifth lens 550, a sixth lens 560, an IR-bandstop filter 580, a first image plane 590, a second image plane 591, and an image sensing device 592.

The first lens 510 has negative refractive power and is made of glass material. The object side 512 of the first lens 510 is a convex surface and the image side 514 of the first lens 510 is a concave surface, and both of the object side 512 and the image-side 514 are spherical.

The second lens 520 has positive refractive power and is made of glass material. The object side 522 of the second lens 520 is a concave surface and the image side 524 of the second lens 520 is a concave surface, and both of the object side 522 and the image side 524 are spherical.

The third lens 530 has positive refractive power and is made of plastic material. The object side 532 of the third lens 530 is a convex surface and the image side 534 of the third lens 530 is a convex surface, and both object side 532 and image side 534 are aspheric. The object side 534 thereof has one inflection point.

The fourth lens 540 has positive refractive power and is made of glass material. The object side 542 of the fourth lens 540 is a convex surface and the image side 544 of the fourth lens 540 is a convex surface, and both object side 542 and image-side 544 are spherical.

The fifth lens 550 has negative refractive power and is made of glass material. The object side 552 of the fifth lens 550 is a concave surface and the image side 554 of the fifth lens 550 is a concave surface, and both object side 552 and image side 554 are spherical.

The sixth lens 560 has positive refractive power and is made of plastic material. The object side 562 of the sixth lens 560 is a convex surface and the image side 564 of the sixth lens 560 is a convex surface, and both object side 562 and image side 564 are aspheric. Hereby, this configuration is beneficial to shorten the back focal distance of the optical image capturing system so as to keep its miniaturization. Besides, the incident angle of the off-axis rays can be reduced effectively, thereby further correcting the off-axis aberration.

The IR-bandstop filter 580 is made of glass material and is disposed between the sixth lens element 560 and the first image plane 590 without affecting the focal length of the optical image capturing system.

Table 9 and Table 10 below should be incorporated into the reference of the present embodiment.

TABLE 9

Lens Parameters for the Fifth Embodiment
f(focal length) = 2.856 mm; f/HEP = 1.6; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 101.6590332 | 6.845 | Glass | 1.497 | 81.61 | −21.128 |
| 2 | | 9.323378283 | 6.375 | | | | |
| 3 | Lens 2 | −35.12974147 | 2.095 | Glass | 1.497 | 81.61 | −12.596 |
| 4 | | 7.79031713 | 14.654 | | | | |
| 5 | Lens 3 | 14.56844242 | 5.834 | Plastic | 1.565 | 58.00 | 9.509 |
| 6 | | −7.314881266 | −1.050 | | | | |
| 7 | Aperture | 1E+18 | 2.016 | | | | |
| 8 | Lens 4 | 6.735765976 | 2.898 | Glass | 1.517 | 64.20 | 8.780 |
| 9 | | −11.96388133 | 0.059 | | | | |
| 10 | Lens 5 | −18.49414222 | 3.004 | Glass | 2.003 | 19.32 | −4.870 |
| 11 | | 7.267793195 | 1.764 | | | | |
| 12 | Lens 6 | 10.27041163 | 3.105 | Plastic | 1.565 | 58.00 | 15.663 |
| 13 | | −58.29395728 | 0.800 | | | | |
| 14 | IR-bandstop Filter | 1E+18 | 0.500 | BK_7 | 1.517 | 64.13 | |
| 15 | | 1E+18 | −0.002 | | | | |
| 16 | Image Plane | 1E+18 | 0.002 | | | | |

Reference Wavelength = 555 nm; the fifth embodiment doesn't have any shield position.

TABLE 10

The Aspheric Coefficients of the Fifth Embodiment
Table 10: Aspheric Coefficients

| | Surface No | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | −2.135118E+01 | 6.375422E−01 | 0.000000E+00 |
| A4 | 0.000000E+00 | 0.000000E+00 | 0.000000E+00 | 0.000000E+00 | 1.601261E−04 | 2.842179E−04 | 0.000000E+00 |
| A6 | 0.000000E+00 | 0.000000E+00 | 0.000000E+00 | 0.000000E+00 | −5.602887E−05 | 3.788177E−06 | 0.000000E+00 |
| A8 | 0.000000E+00 | 0.000000E+00 | 0.000000E+00 | 0.000000E+00 | 1.532181E−06 | −3.993838E−07 | 0.000000E+00 |
| A10 | 0.000000E+00 | 0.000000E+00 | 0.000000E+00 | 0.000000E+00 | −6.230794E−08 | 2.233592E−08 | 0.000000E+00 |

| | Surface No | | | | |
|---|---|---|---|---|---|
| | 9 | 10 | 11 | 12 | 13 |
| k | 0.000000E+00 | 0.000000E+00 | 0.000000E+00 | 6.983461E+00 | 4.810603E+01 |
| A4 | 0.000000E+00 | 0.000000E+00 | 0.000000E+00 | −3.331122E−03 | −5.550626E−04 |

TABLE 10-continued

The Aspheric Coefficients of the Fifth Embodiment
Table 10: Aspheric Coefficients

| | | | | |
|---|---|---|---|---|
| A6 | 0.000000E+00 | 0.000000E+00 | 0.000000E+00 | −2.359219E−04 | −1.001153E−04 |
| A8 | 0.000000E+00 | 0.000000E+00 | 0.000000E+00 | 1.047502E−05 | −2.060758E−05 |
| A10 | 0.000000E+00 | 0.000000E+00 | 0.000000E+00 | −3.208896E−06 | 1.038766E−06 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

Fifth Embodiment (Primary Reference Wavelength = 555 nm)

| |f/f1| | |f/f2| | |f/f3| | |f/f4| | |f/f5| | |f/f6| |
|---|---|---|---|---|---|
| 0.13516 | 0.22670 | 0.30030 | 0.32526 | 0.58636 | 0.18232 |

| Σ PPR | Σ NPR | Σ PPR/Σ NPR | IN12/f | IN56/f | TP4/(IN34 + TP4 + IN45) |
|---|---|---|---|---|---|
| 1.04677 | 0.70932 | 1.47575 | 2.23249 | 0.61776 | 0.73869 |

| |f1/f2| | |f2/f3| | (TP1 + IN12)/TP2 | (TP6 + IN56)/TP5 |
|---|---|---|---|
| 1.67730 | 1.32467 | 6.30981 | 1.62072 |

| HOS | InTL | HOS/HOI | InS/HOS | ODT % | TDT % |
|---|---|---|---|---|---|
| 48.89960 | 47.59960 | 12.22490 | 0.28929 | −117.50300 | 90.35110 |

| HVT51 | HVT52 | HVT61 | HVT62 | HVT62/HOI | HVT62/HOS |
|---|---|---|---|---|---|
| 0 | 0 | 2.31922 | 0.00000 | 0.00000 | 0.00000 |

Fifth Embodiment (Primary Reference Wavelength = 555 nm)

| TP2/TP3 | TP3/TP4 | InRS61 | InRS62 | |InRS61|/TP6 | |InRS62|/TP6 |
|---|---|---|---|---|---|
| 0.35912 | 2.01339 | −0.02232 | −0.80335 | 0.00719 | 0.25871 |

| PSTA | PLTA | NSTA | NLTA | SSTA | SLTA |
|---|---|---|---|---|---|
| 0.020 mm | 0.006 mm | 0.001 mm | −0.012 mm | 0.009 mm | −0.001 mm |

| VSFS0 | VSFS3 | VSFS7 | VTFS0 | VTFS3 | VTFS7 |
|---|---|---|---|---|---|
| −0.000 | −0.005 | −0.005 | −0.000 | −0.000 | −0.000 |

| VSMTF0 | VSMTF3 | VSMTF7 | VTMTF0 | VTMTF3 | VTMTF7 |
|---|---|---|---|---|---|
| 0.637 | 0.637 | 0.570 | 0.637 | 0.596 | 0.543 |

| ISFS0 | ISFS3 | ISFS7 | ITFS0 | ITFS3 | ITFS7 |
|---|---|---|---|---|---|
| 0.010 | 0.005 | 0.010 | 0.010 | 0.010 | 0.020 |

| ISMTF0 | ISMTF3 | ISMTF7 | ITMTF0 | ITMTF3 | ITMTF7 |
|---|---|---|---|---|---|
| 0.715 | 0.688 | 0.719 | 0.715 | 0.606 | 0.572 |

| FS | AIFS | AVFS | AFS |
|---|---|---|---|
| 0.010 | 0.011 | −0.002 | 0.013 |

The following values about the length of the outline curve can be obtained from the data in Table 9 and Table 10.

Fifth Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.892 | 0.892 | −0.00036 | 99.96% | 6.845 | 13.03% |
| 12 | 0.892 | 0.893 | 0.00099 | 100.11% | 6.845 | 13.05% |
| 21 | 0.892 | 0.892 | −0.00028 | 99.97% | 2.095 | 42.58% |
| 22 | 0.892 | 0.894 | 0.00159 | 100.18% | 2.095 | 42.67% |
| 31 | 0.892 | 0.893 | 0.00016 | 100.02% | 5.834 | 15.30% |
| 32 | 0.892 | 0.894 | 0.00185 | 100.21% | 5.834 | 15.33% |
| 41 | 0.892 | 0.895 | 0.00226 | 100.25% | 2.898 | 30.87% |
| 42 | 0.892 | 0.893 | 0.00046 | 100.05% | 2.898 | 30.81% |
| 51 | 0.892 | 0.892 | −0.00003 | 100.00% | 3.004 | 29.70% |
| 52 | 0.892 | 0.894 | 0.00188 | 100.21% | 3.004 | 29.76% |
| 61 | 0.892 | 0.893 | 0.00064 | 100.07% | 3.105 | 28.76% |
| 62 | 0.892 | 0.892 | −0.00033 | 99.96% | 3.105 | 28.73% |

| ARS | EHD | ARS value | ARS − EHD | (ARS/EHD) % | TP | ARS/TP (%) |
|---|---|---|---|---|---|---|
| 11 | 22.082 | 22.258 | 0.177 | 100.80% | 6.845 | 325.18% |
| 12 | 8.405 | 10.470 | 2.065 | 124.57% | 6.845 | 152.96% |
| 21 | 8.294 | 8.372 | 0.078 | 100.95% | 2.095 | 399.59% |
| 22 | 5.841 | 6.603 | 0.762 | 113.04% | 2.095 | 315.13% |
| 31 | 3.952 | 3.964 | 0.013 | 100.32% | 5.834 | 67.95% |
| 32 | 3.920 | 4.136 | 0.216 | 105.52% | 5.834 | 70.89% |
| 41 | 4.001 | 4.284 | 0.283 | 107.06% | 2.898 | 147.84% |
| 42 | 3.785 | 3.851 | 0.066 | 101.75% | 2.898 | 132.91% |
| 51 | 3.573 | 3.595 | 0.022 | 100.62% | 3.004 | 119.64% |
| 52 | 2.932 | 3.017 | 0.085 | 102.91% | 3.004 | 100.41% |
| 61 | 3.066 | 3.115 | 0.049 | 101.61% | 3.105 | 100.33% |
| 62 | 3.860 | 4.066 | 0.205 | 105.32% | 3.105 | 130.93% |

The following values for the conditional expressions can be obtained from the data in Table 9 and Table 10.

Values Related to Inflection Point of Fifth Embodiment
(Primary Reference Wavelength = 555 nm)

| HIF311 | 2.4127 | HIF311/HOI | 0.6032 | SGI311 | 0.1734 | \|SGI311\|/(\|SGI311\| + TP3) | 0.0289 |
|---|---|---|---|---|---|---|---|
| HIF611 | 1.5132 | HIF611/HOI | 0.3783 | SGI611 | 0.0966 | \|SGI611\|/(\|SGI611\| + TP6) | 0.0302 |

Sixth Embodiment

Figure 6A:
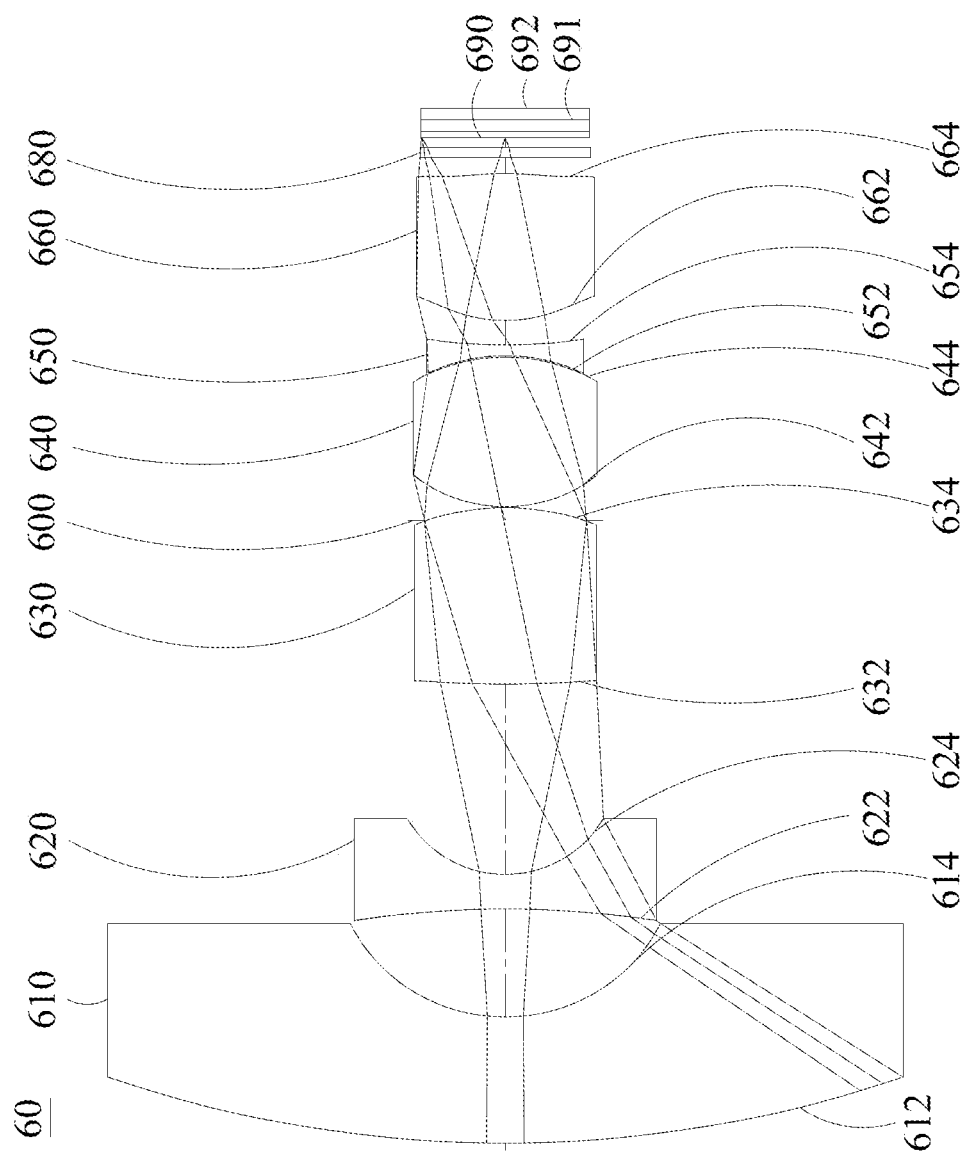
FIG. 6A is a schematic view of the optical image capturing system according to the sixth embodiment of the present invention.
Figure 6B:
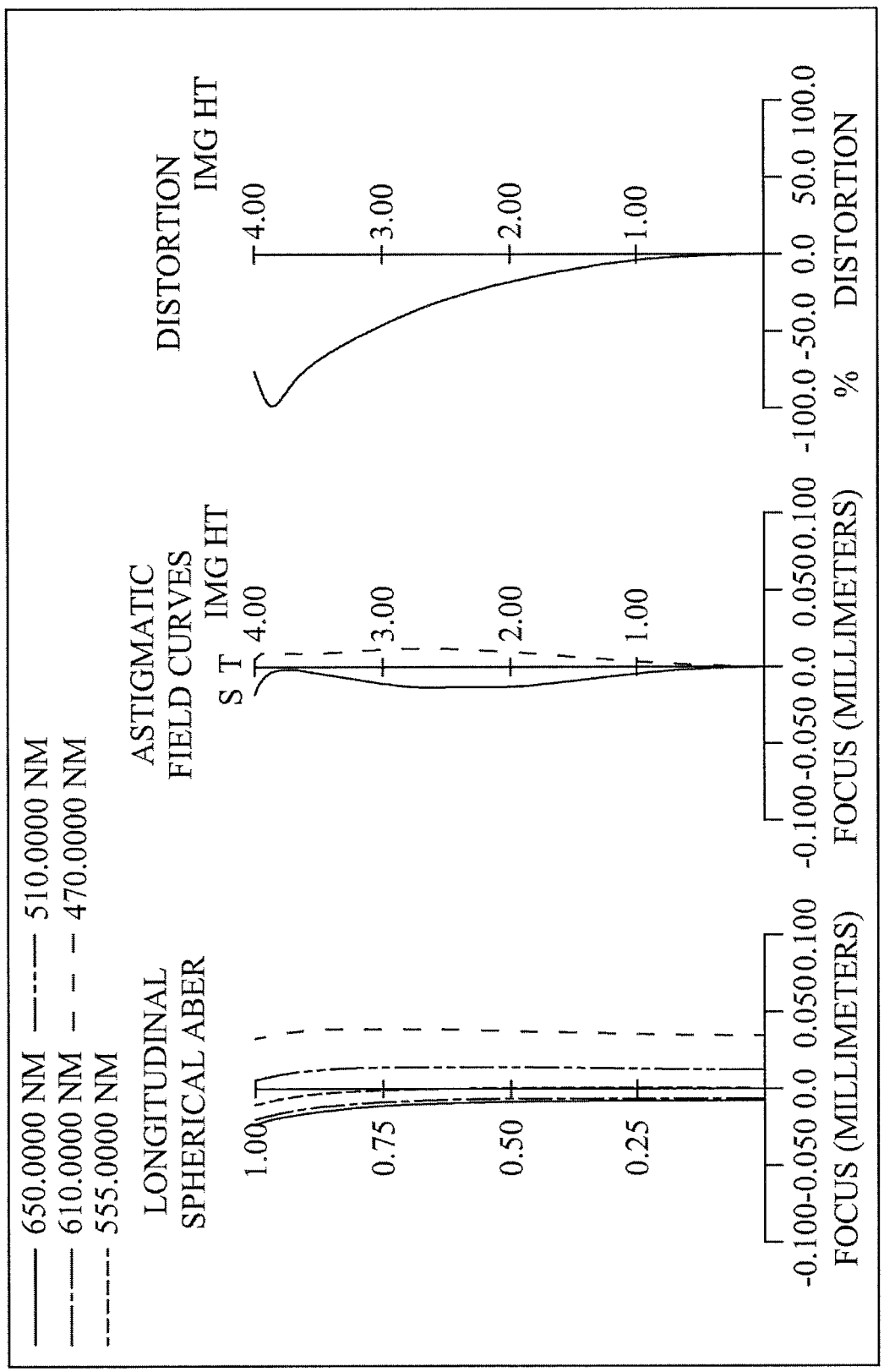
FIG. 6B shows the longitudinal spherical aberration curves, astigmatic field curves, and optical distortion curve of the optical image capturing system in the order from left to right according to the sixth embodiment of the present invention.
Figure 6C:
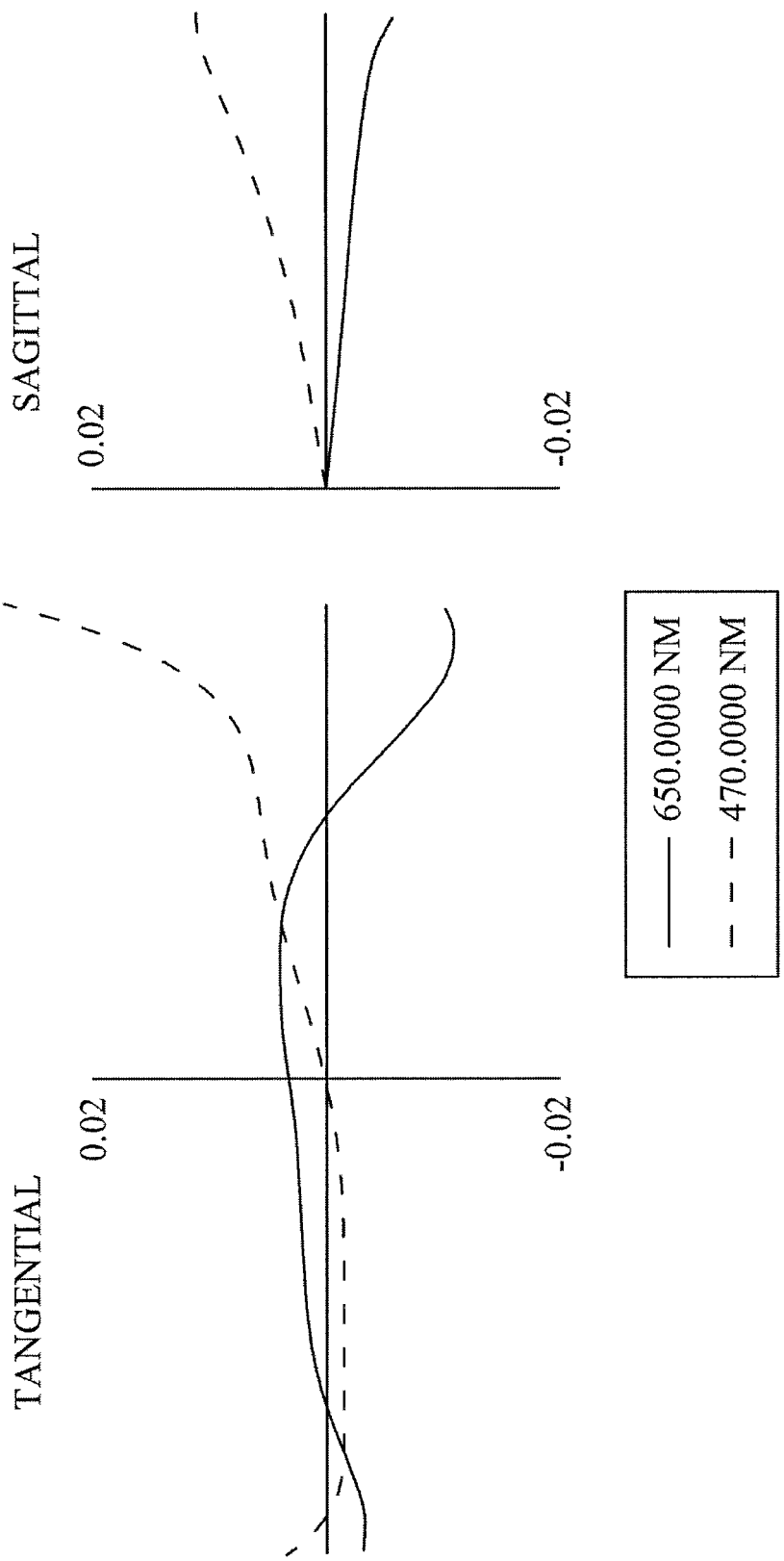
FIG. 6C shows the sagittal fan and the tangential fan of the optical image capturing system and the lateral aberration diagram of the longest operation wavelength and the shortest operation wavelength passing thorough the margin of the aperture at 0.7 field of view according to the sixth embodiment of the present invention.
Figure 6D:
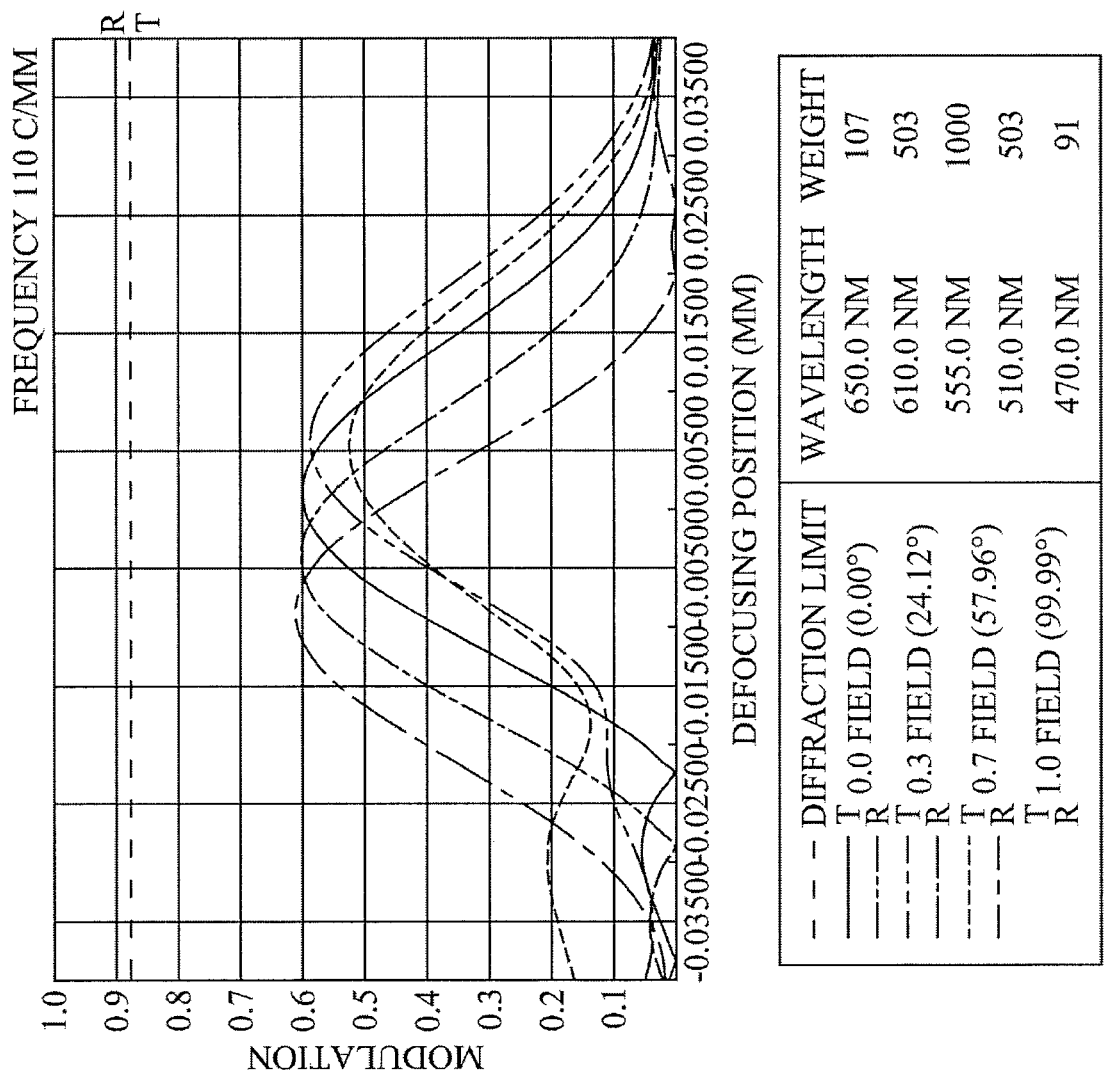
FIG. 6D is a diagram showing the through focus MTF values of the visible light spectrum at the central field of view, 0.3 field of view, and 0.7 field of view of the sixth embodiment of the present invention.
Figure 6E:
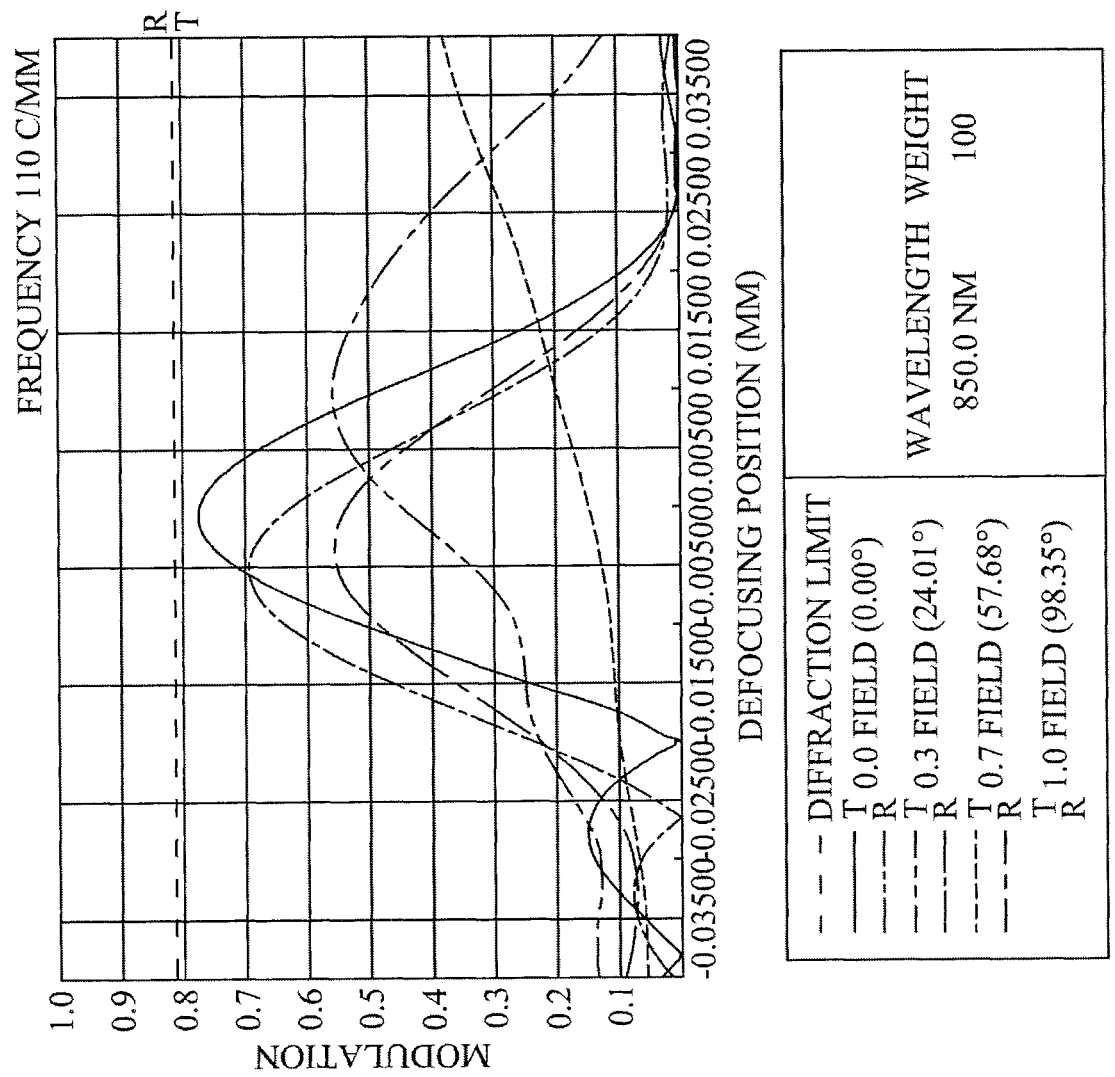
FIG. 6E is a diagram showing the through focus MTF values of the infrared light spectrum at the central field of view, 0.3 field of view, and 0.7 field of view of the sixth embodiment of the present disclosure.

Please refer to FIGS. 6A to 6E. FIG. 6A is a schematic view of the optical image capturing system according to the sixth embodiment of the present invention. FIG. 6B shows the longitudinal spherical aberration curves, astigmatic field curves, and optical distortion curve of the optical image capturing system, in the order from left to right, according to the sixth embodiment of the present invention. FIG. 6C shows the lateral aberration diagram of the the optical image capturing system at 0.7 field of view according to the sixth embodiment of the present invention. FIG. 6D is a diagram showing the through focus MTF values of the visible light spectrum at the central field of view, 0.3 field of view, and 0.7 field of view of the sixth embodiment of the present invention. FIG. 6E is a diagram showing the through focus MTF values of the infrared light spectrum at the central field of view, 0.3 field of view, and 0.7 field of view of the sixth embodiment of the present invention.

As shown in FIG. 6A, in the order from an object side to an image side, the optical image capturing system 60 includes a first lens 610, a second lens 620, an aperture 600, a third lens 630, a fourth lens 640, a fifth lens 650, a sixth lens 660, an IR-bandstop filter 680, a first image plane 690, a second image plane 691 and an image sensing device 692.

The first lens 610 has negative refractive power and is made of plastic material. The object side 612 of the first lens 610 is a convex surface and the image side 614 of the first lens 610 is a concave surface, and both object side 612 and image side 614 are aspheric. The object-side 612 thereof has one inflection point.

The second lens 620 has positive refractive power and is made of plastic material. The object side 622 of the second lens 620 is a convex surface and the image side 624 of the second lens 620 is a convex surface, and both object side 622 and image side 624 are aspheric.

The third lens 630 has negative refractive power and is made of plastic material. The object side 632 of the third lens 630 is a convex surface and the image side 634 of the third lens 630 is a concave surface, and both object side 632 and image side 634 are aspheric. The object side 632 and image side 634 each has one inflection point.

The fourth lens 640 has positive refractive power and is made of plastic material. The object side 642 of the fourth lens 640 is a convex surface and the image side 644 of the fourth lens 640 is a convex surface, and both object side 642 and image side 644 are aspheric. The image side 644 thereof has one inflection point.

The fifth lens 650 has positive refractive power and is made of plastic material. The object side 652 of the fifth lens 650 is a convex surface and the image side 654 of the fifth lens 650 is a convex surface, and both object side 652 and image side 654 are aspheric. The object-side 652 thereof has one inflection point.

The sixth lens 660 has negative refractive power and is made of plastic material. The object side 662 of the sixth lens 660 is a concave surface and the image side 664 of the sixth lens 660 is a convex surface, and both object side 662 and image side 664 are aspheric. The image side 664 thereof has two inflection points. Hereby, this configuration is beneficial to shorten the back focal distance of the optical image capturing system so as to keep its miniaturization. Besides, the incident angle of the off-axis rays can be reduced effectively, thereby further correcting the off-axis aberration.

The IR-bandstop filter 680 is made of glass material and is disposed between the sixth lens 660 and the first image plane 690, without affecting the focal length of the optical image capturing system.

Table 11 and Table 12 below should be incorporated into the reference of the present embodiment.

TABLE 11

Lens Parameters for the Sixth Embodiment
f(focal length) = 2.855 mm; f/HEP = 1.6; HAF(half of angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 56.23844631 | 6.273 | Glass | 1.639 | 44.87 | −15.808 |
| 2 | | 8.221048079 | 5.354 | | | | |
| 3 | Lens 2 | −46.51362775 | 1.739 | Glass | 1.497 | 81.61 | −9.483 |
| 4 | | 5.322993263 | 9.457 | | | | |
| 5 | Lens 3 | 57.21627912 | 8.777 | Glass | 1.639 | 44.87 | 15.455 |
| 6 | | −11.28176743 | −0.626 | | | | |
| 7 | Aperture | 1E+18 | 0.676 | | | | |
| 8 | Lens 4 | 6.882336686 | 7.430 | Glass | 1.497 | 81.61 | 9.086 |
| 9 | | −8.474933928 | 0.064 | | | | |
| 10 | Lens 5 | −8.331350283 | 0.551 | Glass | 2.003 | 19.32 | −6.107 |
| 11 | | 24.72557979 | 1.212 | | | | |
| 12 | Lens 6 | 6.443730017 | 7.300 | Plastic | 1.565 | 58.00 | 8.872 |
| 13 | | −13.51157637 | 0.800 | | | | |

TABLE 11-continued

Lens Parameters for the Sixth Embodiment
f(focal length) = 2.855 mm; f/HEP = 1.6; HAF(half of angle of view) = 100 deg

| Surface No | | Curvature Radius | Thickness (mm) | Material | Refractive Index | Coefficient of Dispersion | Focal Length |
|---|---|---|---|---|---|---|---|
| 14 | IR-bandstop filter | 1E+18 | 0.500 | BK_7 | 1.517 | 64.13 | |
| 15 | | 1E+18 | 0.495 | | | | |
| 16 | Image Plane | 1E+18 | −0.003 | | | | |

Reference Wavelength = 555 nm; the sixth embodiment doesn't have any shield position.

TABLE 12

The Aspheric Coefficients of the Sixth Embodiment
Table 12: Aspheric Coefficients

| | Surface No | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| | Surface No | | | | |
|---|---|---|---|---|---|
| | 9 | 10 | 11 | 12 | 13 |
| k | 0.000000E+00 | 0.000000E+00 | 0.000000E+00 | −4.575855E+00 | −3.496281E+01 |
| A4 | 0.000000E+00 | 0.000000E+00 | 0.000000E+00 | 1.264085E−03 | 1.432606E−03 |
| A6 | 0.000000E+00 | 0.000000E+00 | 0.000000E+00 | −6.536424E−05 | 8.152553E−06 |
| A8 | 0.000000E+00 | 0.000000E+00 | 0.000000E+00 | 2.537458E−06 | −2.088992E−06 |
| A10 | 0.000000E+00 | 0.000000E+00 | 0.000000E+00 | −7.782257E−08 | −2.009944E−08 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12:

Sixth Embodiment (Primary Reference Wavelength = 555 nm)

| |f/f1| | |f/f2| | |f/f3| | |f/f4| | |f/f5| | |f/f6| |
|---|---|---|---|---|---|
| 0.18060 | 0.30106 | 0.18472 | 0.31420 | 0.46752 | 0.32179 |

| Σ PPR | Σ NPR | Σ PPR/|Σ NPR| | IN12/f | IN56/f | TP4/(IN34 + TP4 + IN45) |
|---|---|---|---|---|---|
| 0.96232 | 0.80757 | 1.19163 | 1.87533 | 0.42470 | 0.98491 |

| |f1/f2| | |f2/f3| | (TP1 + IN12)/TP2 | | (TP6 + IN56)/TP5 | |
|---|---|---|---|---|---|
| 1.66693 | 0.61358 | 6.68645 | | 15.44124 | |

| HOS | InTL | HOS/HOI | InS/HOS | ODT % | TDT % |
|---|---|---|---|---|---|
| 49.99980 | 48.20780 | 12.49995 | 0.38051 | −123.41600 | 96.58950 |

| HVT51 | HVT52 | HVT61 | HVT62 | HVT62/HOI | HVT62/HOS |
|---|---|---|---|---|---|
| 0 | 0 | 0.00000 | 0.00000 | 0.00000 | 0.00000 |

-continued

Sixth Embodiment (Primary Reference Wavelength = 555 nm)

| TP2/TP3 | TP3/TP4 | InRS61 | InRS62 | |InRS61|/TP6 | |InRS62|/TP6 |
|---|---|---|---|---|---|
| 0.19812 | 1.18138 | 1.21821 | −0.16460 | 0.16687 | 0.02255 |

| PSTA | PLTA | NSTA | NLTA | SSTA | SLTA |
|---|---|---|---|---|---|
| 0.030 mm | −0.011 mm | 0.004 mm | −0.003 mm | 0.012 mm | −0.006 mm |

| VSFS0 | VSFS3 | VSFS7 | VTFS0 | VTFS3 | VTFS7 |
|---|---|---|---|---|---|
| −0.000 | −0.005 | −0.010 | −0.000 | 0.005 | 0.005 |

| VSMTF0 | VSMTF3 | VSMTF7 | VTMTF0 | VTMTF3 | VTMTF7 |
|---|---|---|---|---|---|
| 0.596 | 0.602 | 0.609 | 0.596 | 0.586 | 0.525 |

| ISFS0 | ISFS3 | ISFS7 | ITFS0 | ITFS3 | ITFS7 |
|---|---|---|---|---|---|
| −0.000 | −0.005 | −0.005 | −0.000 | 0.010 | 0.035 |

| ISMTF0 | ISMTF3 | ISMTF7 | ITMTF0 | ITMTF3 | ITMTF7 |
|---|---|---|---|---|---|
| 0.773 | 0.694 | 0.552 | 0.773 | 0.558 | 0.353 |

| FS | | AIFS | | AVFS | AFS |
|---|---|---|---|---|---|
| 0.000 | | 0.006 | | −0.001 | 0.007 |

The following values about the length of the outline curve can be obtained from the data in Table 11 and Table 12.

Sixth Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.892 | 0.892 | −0.00013 | 99.99% | 6.273 | 14.22% |
| 12 | 0.892 | 0.894 | 0.00159 | 100.18% | 6.273 | 14.25% |
| 21 | 0.892 | 0.892 | −0.00011 | 99.99% | 1.739 | 51.30% |
| 22 | 0.892 | 0.896 | 0.00406 | 100.46% | 1.739 | 51.54% |
| 31 | 0.892 | 0.892 | −0.00013 | 99.99% | 8.777 | 10.16% |
| 32 | 0.892 | 0.893 | 0.00076 | 100.09% | 8.777 | 10.17% |
| 41 | 0.892 | 0.895 | 0.00235 | 100.26% | 7.430 | 12.04% |
| 42 | 0.892 | 0.894 | 0.00149 | 100.17% | 7.430 | 12.03% |
| 51 | 0.892 | 0.894 | 0.00154 | 100.17% | 0.551 | 162.11% |
| 52 | 0.892 | 0.892 | 0.00002 | 100.00% | 0.551 | 161.83% |
| 61 | 0.892 | 0.895 | 0.00264 | 100.30% | 7.300 | 12.26% |
| 62 | 0.892 | 0.893 | 0.00038 | 100.04% | 7.300 | 12.23% |

| ARS | EHD | ARS value | ARS − EHD | (ARS/EHD) % | TP | ARS/TP (%) |
|---|---|---|---|---|---|---|
| 11 | 19.271 | 19.669 | 0.398 | 102.06% | 6.273 | 313.53% |
| 12 | 7.432 | 9.280 | 1.848 | 124.87% | 6.273 | 147.93% |
| 21 | 7.349 | 7.379 | 0.030 | 100.41% | 1.739 | 424.34% |
| 22 | 4.705 | 5.769 | 1.064 | 122.62% | 1.739 | 331.74% |
| 31 | 4.304 | 4.308 | 0.004 | 100.09% | 8.777 | 49.08% |
| 32 | 3.872 | 3.951 | 0.079 | 102.05% | 8.777 | 45.02% |
| 41 | 4.327 | 4.678 | 0.351 | 108.12% | 7.430 | 62.96% |
| 42 | 3.709 | 3.839 | 0.130 | 103.50% | 7.430 | 51.67% |
| 51 | 3.676 | 3.807 | 0.131 | 103.56% | 0.551 | 690.57% |
| 52 | 3.737 | 3.751 | 0.014 | 100.37% | 0.551 | 680.46% |
| 61 | 4.227 | 4.438 | 0.211 | 105.00% | 7.300 | 60.79% |
| 62 | 4.153 | 4.158 | 0.005 | 100.11% | 7.300 | 56.96% |

The following values for the conditional expressions can be obtained from the data in Table 11 and Table 12:

Values Related to Inflection Point of Sixth Embodiment (Primary Reference Wavelength = 555 nm)

| HIF611 | 3.7274 | HIF611/HOI | 0.9318 | SGI611 | 0.9916 | |SGI611|/(|SGI611| + TP6) | 0.1196 |
|---|---|---|---|---|---|---|---|
| HIF621 | 1.5697 | HIF621/HOI | 0.3924 | SGI621 | −0.0739 | |SGI621|/(|SGI621| + TP6) | 0.0100 |
| HIF622 | 3.4217 | HIF622/HOI | 0.8554 | SGI622 | −0.1456 | |SGI622|/(|SGI622| + TP6) | 0.0196 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
a first lens with refractive power;
a second lens with refractive power;
a third lens with refractive power;
a fourth lens with refractive power;
a fifth lens with refractive power;
a sixth lens with refractive power;
a first image plane, which is an image plane specifically for visible light and perpendicular to an optical axis, and a through focus modulation transfer rate (MTF) of central field of view of the first image plane having a maximum value at a first spatial frequency; and
a second image plane, which is an image plane specifically for infrared light and perpendicular to the optical axis, and a through focus modulation transfer rate (MTF) of central of field of view of the second image plane having a maximum value at the first spatial frequency;
wherein the optical image capturing system has six lenses with refractive powers, and the optical image capturing system has a maximum image height HOI on the first image plane, there is at least one lens having positive refractive power among the second lens to the sixth lens, focal lengths of the six lenses are respectively f1, f2, f3, f4, f5 and f6, and a focal length of the optical image capturing system is f, and an entrance pupil diameter of the optical image capturing system is HEP, there is a distance HOS on the optical axis from an object side of the first lens to the first image plane, there is a distance InTL on the optical axis from the object side of the first lens to an image side of the sixth lens, a half maximum angle of view of the optical image capturing system is HAF, a distance on the optical axis between the first image plane and the second image plane is FS, there is at least one lens made of the plastic material and there is at least one lens made of the glass material among the first lens to the sixth lens, a point on the any surface of any one of the six lenses which crosses the optical axis is defined as a starting point, a point on the surface that has a vertical height of a half entrance pupil diameter (½HEP) of the optical image capturing system from the optical axis is defined as a coordinate point, a length of an outline curve from the starting point to the coordinate point along an outline of the surface is ARE, and the optical image capturing system meets the following conditions: 1.0≤f/HEP≤10.0, 0 deg<HAF≤150 deg, |FS|≤60 μm, and 0.9≤2(ARE/HEP)≤2.0;

wherein the refractive powers of the first lens to the sixth lens are −+−++− or −−+−++ in sequence.

2. The optical image capturing system of claim 1, wherein a wavelength of the infrared light is from 700 nm to 1300 nm, and the first spatial frequency is expressed as SP1, the following condition is satisfied: SP1≤440 cycles/mm.

3. The optical image capturing system of claim 1, wherein at least two lenses among the first lens to the sixth lens are made of the plastic material.

4. The optical image capturing system of claim 1, wherein a half maximum vertical angle of view of the optical image capturing system is VHAF, the optical image capturing system meets the following condition: VHAF≥10 deg.

5. The optical image capturing system of claim 1, wherein the optical image capturing system meets the following condition: HOS/HOI≥1.2.

6. The optical image capturing system of claim 1, wherein a first point on an object side of the sixth lens which crosses the optical axis is defined as a first starting point, a point on the object side of the sixth lens that has a vertical height of the half entrance pupil diameter (½HEP) of the optical image capturing system from the optical axis is defined as a first coordinate point, a length of an outline curve from the first starting point to the first coordinate point along an outline of the surface is expressed as ARE61, and a second point on the image side of the sixth lens which crosses the optical axis defined as a second starting point, a point on the image side of the sixth lens that has a vertical height of the half entrance pupil diameter from the optical axis is defined as a second coordinate point, a length of an outline curve from the second starting point to the second coordinate point along an outline of the surface is expressed as ARE62, a thickness of the sixth lens on the optical axis is TP6, the following conditions are satisfied: 0.05≤ARE61/TP6≤35; and 0.05≤ARE62/TP6≤35.

7. The optical image capturing system of claim 1, wherein TV distortion of the optical image capturing system when forming image is TDT, there is a maximum image height HOI of the optical image capturing system on the first image plane which is vertical to the optical axis, a lateral aberration of a longest operation wavelength of a visible light of a positive direction tangential fan of the optical image capturing system passing through a margin of the entrance pupil and striking on the image plane by 0.7 HOI is expressed as PLTA, and a lateral aberration of a shortest operation wavelength of a visible light of the positive direction tangential fan of the optical image capturing system passing through the margin of the entrance pupil and striking on the image plane by 0.7 HOI is expressed as PSTA, a lateral aberration of the longest operation wavelength of a visible light of a negative direction tangential fan of the optical image capturing system passing through the margin of the entrance pupil and striking on the image plane by 0.7 HOI is expressed as NLTA, a lateral aberration of the shortest operation wavelength of a visible light of a negative direction tangential fan of the optical image capturing system passing through the margin of the entrance pupil and striking on the image plane by 0.7 HOI is expressed as NSTA, a lateral aberration of the longest operation wavelength of a visible light of a sagittal fan of the optical image capturing system passing through the margin of the entrance pupil and striking on the image plane by 0.7 HOI is expressed as SLTA, a lateral aberration of the shortest operation wavelength of a visible light of the sagittal fan of the optical image capturing system passing through the margin of the entrance pupil and striking on the image plane by 0.7 HOI is expressed as SSTA, the following conditions are satisfied: PLTA≤100 μm; PSTA≤100 μm; NLTA≤100 μm; NSTA≤100 μm; SLTA≤100 μm; and SSTA≤100 μm; |TDT|<250%.

8. The optical image capturing system of claim 1, further comprising an aperture, wherein a distance from the aperture to the first image plane on the optical axis is InS, the following condition is satisfied: 0.2≤InS/HOS≤1.1.

9. An optical image capturing system, from an object side to an image side, comprising:
 a first lens with refractive power;
 a second lens with refractive power;
 a third lens with refractive power;
 a fourth lens with refractive power;
 a fifth lens with refractive power;
 a sixth lens with refractive power;
 a first image plane, which is an image plane specifically for visible light and perpendicular to an optical axis, and a through focus modulation transfer rate (MTF) of central field of view of the first image plane having a maximum value at a first spatial frequency, and the first spatial frequency being 110 cycles/mm; and
 a second image plane, which is an image plane specifically for infrared light and perpendicular to the optical axis, and the through focus modulation transfer rate (MTF) of central field of view of the second image plane having a maximum value at the first spatial frequency, and the first spatial frequency being 110 cycles/mm;
 wherein the optical image capturing system has six lenses with refractive powers, the optical image capturing system has a maximum image height HOI on the first image plane that is perpendicular to the optical axis, there is at least one lens having positive refractive power among the second lens to the sixth lens, focal lengths of the six lenses are respectively f1, f2, f3, f4, f5 and f6, a focal length of the optical image capturing system is f, an entrance pupil diameter of the optical image capturing system is HEP; there is a distance HOS on an optical axis from an object side of the first lens to the first image plane, there is a distance InTL on the optical axis from the object side of the first lens to an image side of the sixth lens, a half maximum angle of view of the optical image capturing system is HAF, a distance on the optical axis between the first image plane and the second image plane is FS, a point on the any surface of any one of the six lenses which crosses the optical axis defined as a starting point, a point on the surface that has a vertical height of a half entrance pupil diameter (½HEP) of the optical image capturing system from the optical axis is defined as a coordinate point, a length of an outline curve from the starting point to the coordinate point along an outline of the surface is ARE, there is at least one lens made of the plastic material and there is at least one lens made of the glass material among the first lens to the sixth lens, there is an air gap between each lens among the six lenses, the following condition are satisfied: 1.0≤f/HEP≤10.0; 0 deg<HAF≤150 deg; |FS|≤40μs and 0.9≤2(ARE/HEP)≤2.0;

wherein the refractive powers of the first lens to the sixth lens are −+−++− or −−+−++ in sequence.

10. The optical image capturing system of claim 9, wherein an effective maximum radius of any surface of any lens among the six lenses is expressed as EHD, a first point on the any surface of any one of the six lenses which crosses the optical axis is defined as a first starting point and a point on a maximum effective half diameter position of the surface is defined as a first final point, a length of outline curve from the first starting point to the first final point along the outline of the surface is ARS, which meets the following condition: 0.9≤ARS/EHD≤2.0.

11. The optical image capturing system of claim 9, wherein there is the air gap between each lens among the six lenses.

12. The optical image capturing system of claim 9, wherein the thickness of the first lens to the sixth lens on the optical axis is TP1, TP2, TP3, TP4, TP5 and TP6, the sum of TP1 to TP6 is STP, the following conditions are satisfied: 0.1≤TP2/STP≤0.5; 0.02≤TP3/STP≤0.5.

13. The optical image capturing system of claim 9, wherein a half maximum vertical angle of view of the optical image capturing system is VHAF, the optical image capturing system meets the following condition: VHAF≥20 deg.

14. The optical image capturing system of claim 9, wherein the optical image capturing system meets the following condition: HOS/HOI≥1.4.

15. The optical image capturing system of claim 9, wherein at least one lens among the first lens, the second lens, the third lens, the fourth lens, the fifth lens and the sixth lens is a light filter element which filter light which is less than 500 nm.

16. The optical image capturing system of claim 9, a distance on the optical axis between the fifth lens and the sixth lens is IN56, and meets the following condition: 0<IN56/f≤3.0.

17. The optical image capturing system of claim 9, wherein a distance on the optical axis between the fifth lens and the sixth lens is IN56, and a thicknesses of the fifth lens and a thicknesses of the sixth lens on the optical axis are respectively TP5 and TP6, the following conditions is satisfied: 0.1≤(TP6+IN56)/TP5≤50.

18. The optical image capturing system of claim 9, wherein at least one lens among the first lens to the sixth lens has at least one inflection point on at least one surface thereof.

19. An optical image capturing system, from an object side to an image side, comprising:
a first lens with refractive power;
a second lens with refractive power;
a third lens with refractive power;
a fourth lens with refractive power;
a fifth lens with refractive power;
a sixth lens with refractive power;
a first average image plane, which is an image plane specifically for visible light and perpendicular to an optical axis, and the first average image plane sets up at an average position of a defocusing positions, where through focus modulation transfer rates (values of MTF) of the visible light at central field of view, 0.3 field of view, and 0.7 field of view of the optical image capturing system are respectively at corresponding maximum value at a first spatial frequency, the first spatial frequency being 110 cycles/mm; and a second average image plane, which is an image plane specifically for infrared light and perpendicular to the optical axis, and the second average image plane sets up at an average position of a defocusing positions, where through focus modulation transfer rates of the infrared light (values of MTF) at central field of view, 0.3 field of view, and 0.7 field of view of the optical image capturing system are at their respective maximum at the first spatial frequency, the first spatial frequency being 110 cycles/mm;

wherein the optical image capturing system has six lenses with refractive powers, the optical image capturing system has a maximum image height HOI on the first average image plane that is perpendicular to the optical axis, focal lengths of the six lenses are respectively f1, f2, f3, f4, f5 and f6, a focal length of the optical image capturing system is f, an entrance pupil diameter of the optical image capturing system is HEP, a half maximum angle of view of the optical image capturing system is HAF, there is a distance HOS on the optical axis from an object side of the first lens to the first average image plane, there is a distance InTL on the optical axis from the object side of the first lens to an image side of the sixth lens, a distance on the optical axis between the first average image plane and the second average image plane is AFS, with a point on the any surface of any one of the six lenses which crosses the optical axis defined as a starting point, a point on the surface that has a vertical height of a half entrance pupil diameter (½HEP) of the optical image capturing system from the optical axis is defined as a coordinate point, a length of an outline curve from the starting point to the coordinate point along an outline of the surface is ARE, there is at least one lens made of the plastic material and there is at least one lens made of the glass material among the first lens to the sixth lens, the following condition are satisfied: 1≤f/HEP≤10; 0 deg<HAF≤150 deg; |AFS|≤60μs and 0.9≤2(ARE/HEP)≤2.0;

wherein the refractive powers of the first lens to the sixth lens are −+−++− or −−+−++ in sequence.

20. The optical image capturing system of claim 19, wherein an effective maximum radius of any surface of any lens among the six lenses is expressed as EHD, with a first point on the any surface of any one of the six lenses which crosses the optical axis defined as a first starting point and a point on a maximum effective half diameter position of the surface defined as a first final point, a length of outline curve from the first starting point to the first final point along the outline of the surface is ARS, which meets the following condition: 0.9≤ARS/EHD≤2.0.

21. The optical image capturing system of claim 19, wherein there is an air gap between each lens among the six lenses.

22. The optical image capturing system of claim 19, wherein the optical image capturing system meets the following condition: HOS/HOI≥1.6.

23. The optical image capturing system of claim 19, wherein a linear magnification of an image formed by the optical image capturing system on the second average image plane is LM, the following condition is satisfied: LM≥0.0003.

24. The optical image capturing system of claim 19, further comprising an aperture and an image sensing device, wherein the image sensing device is disposed on the first average image plane and sets up at least 100 thousand pixels, there is a distance InS on the optical axis from the aperture to the first average image plane, the following condition is satisfied: $0.2 \leq InS/HOS \leq 1.1$.

* * * * *